(12) United States Patent
Judi et al.

(10) Patent No.: US 11,595,878 B2
(45) Date of Patent: Feb. 28, 2023

(54) SYSTEMS, DEVICES, AND METHODS FOR CONTROLLING OPERATION OF WEARABLE DISPLAYS DURING VEHICLE OPERATION

(71) Applicant: GOOGLE LLC, Mountain View, CA (US)

(72) Inventors: Terek Judi, Kitchener (CA); Adrian Klisz, Kitchener (CA); Gabriel Reyes, Dexter, MI (US); Daniel Perry, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 188 days.

(21) Appl. No.: 16/661,278

(22) Filed: Oct. 23, 2019

(65) Prior Publication Data
US 2020/0137665 A1    Apr. 30, 2020

Related U.S. Application Data

(60) Provisional application No. 62/750,060, filed on Oct. 24, 2018.

(51) Int. Cl.
| | | |
|---|---|---|
| G01R 31/08 | (2020.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04W 48/04 | (2009.01) | |
| G06F 1/16 | (2006.01) | |
| G06F 3/01 | (2006.01) | |
| H04L 9/40 | (2022.01) | |
| H04W 12/082 | (2021.01) | |

(Continued)

(52) U.S. Cl.
CPC ............ *H04W 48/04* (2013.01); *G06F 1/163* (2013.01); *G06F 3/013* (2013.01); *H04L 63/107* (2013.01); *H04W 12/082* (2021.01); *H04W 12/33* (2021.01); *H04W 12/63* (2021.01)

(58) Field of Classification Search
CPC ..... H04W 49/04; H04W 12/082; G06F 1/163; G06F 3/013; H04L 63/107
See application file for complete search history.

(56) References Cited

U.S. PATENT DOCUMENTS

| | | | | |
|---|---|---|---|---|
| 8,280,438 | B2 * | 10/2012 | Barbera | H04M 1/72454 |
| | | | | 455/557 |
| 8,994,492 | B2 * | 3/2015 | Farhan | G05B 23/0278 |
| | | | | 455/238.1 |

(Continued)

*Primary Examiner* — Stephen M D Agosta

(57) ABSTRACT

The present systems, devices, and methods generally relate to controlling wearable displays during vehicle operation, and particularly to detecting when a user is operating a vehicle and restricting operation of a wearable display to prevent the user from being distracted. At least one processor of a wearable display system receives user context data from at least one user context sensor, and determines whether the user is operating a vehicle based on the user context data. If the user is operating a vehicle, presentation of at least one user interface is restricted. Unrestricted access can be restored by inputting an unlock input to override the restriction, or by analysis of additional user context data at a later time.

18 Claims, 29 Drawing Sheets

(51) Int. Cl.
*H04W 12/33* (2021.01)
*H04W 12/63* (2021.01)

(56) References Cited

U.S. PATENT DOCUMENTS

| | | | |
|---|---|---|---|
| 9,213,178 B1* | 12/2015 | Giri | G02B 27/0172 |
| 9,405,120 B2* | 8/2016 | Graf | G02B 27/0101 |
| 10,233,679 B1* | 3/2019 | Chan | E05B 81/64 |
| 10,552,000 B2* | 2/2020 | Bhogal | G06F 3/0482 |
| 2002/0008625 A1* | 1/2002 | Adams | G08B 21/0247 |
| | | | 340/573.1 |
| 2004/0088084 A1* | 5/2004 | Geisler | B60R 16/0231 |
| | | | 701/1 |
| 2006/0220788 A1* | 10/2006 | Dietz | G06F 3/038 |
| | | | 340/5.74 |
| 2012/0176232 A1* | 7/2012 | Bantz | G07C 5/008 |
| | | | 701/1 |
| 2012/0196544 A1* | 8/2012 | Bolingbroke | H04W 48/04 |
| | | | 455/68 |
| 2012/0226413 A1* | 9/2012 | Chen | B60R 16/037 |
| | | | 701/36 |
| 2012/0252350 A1* | 10/2012 | Steinmetz | H04K 3/415 |
| | | | 455/418 |
| 2013/0172018 A1* | 7/2013 | Correale | H04M 1/72463 |
| | | | 455/456.4 |
| 2013/0198737 A1* | 8/2013 | Ricci | B60R 25/01 |
| | | | 717/174 |
| 2014/0043135 A1* | 2/2014 | Kotecha | G05B 19/0428 |
| | | | 340/3.1 |
| 2014/0098008 A1* | 4/2014 | Hatton | G02B 27/017 |
| | | | 345/8 |
| 2014/0336876 A1* | 11/2014 | Gieseke | G01C 21/365 |
| | | | 701/36 |
| 2015/0121506 A1* | 4/2015 | Cavanaugh | G06F 21/6218 |
| | | | 726/16 |
| 2015/0172450 A1* | 6/2015 | Singhal | H04M 1/72463 |
| | | | 455/419 |
| 2015/0244854 A1* | 8/2015 | Babel | H04M 1/66 |
| | | | 455/414.1 |
| 2016/0014263 A1* | 1/2016 | Carrico | H04M 1/04 |
| | | | 455/26.1 |
| 2016/0044575 A1* | 2/2016 | Rajeevalochana | H04W 8/245 |
| | | | 455/410 |
| 2017/0201619 A1* | 7/2017 | Cohen | H04M 1/72463 |
| 2017/0245200 A1* | 8/2017 | Langley | H04M 1/72454 |
| 2017/0265798 A1* | 9/2017 | Sales | A61B 7/04 |
| 2017/0334457 A1* | 11/2017 | Park | G06F 16/245 |
| 2018/0288215 A1* | 10/2018 | Rahman | H04M 1/72436 |
| 2018/0365787 A1* | 12/2018 | Gullickson, III | H04W 4/24 |
| 2019/0337528 A1* | 11/2019 | Baumer | G06F 3/041 |

\* cited by examiner

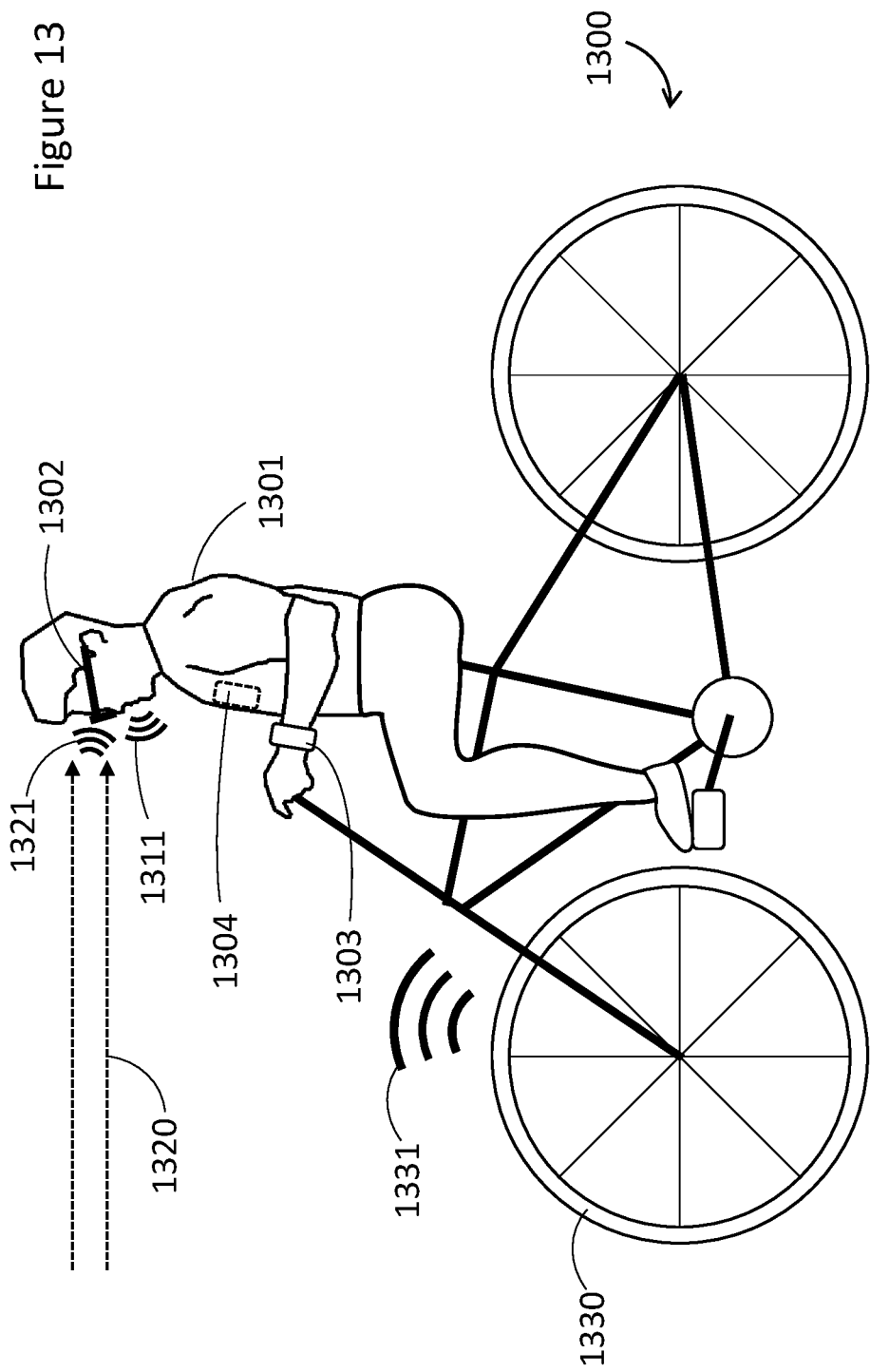

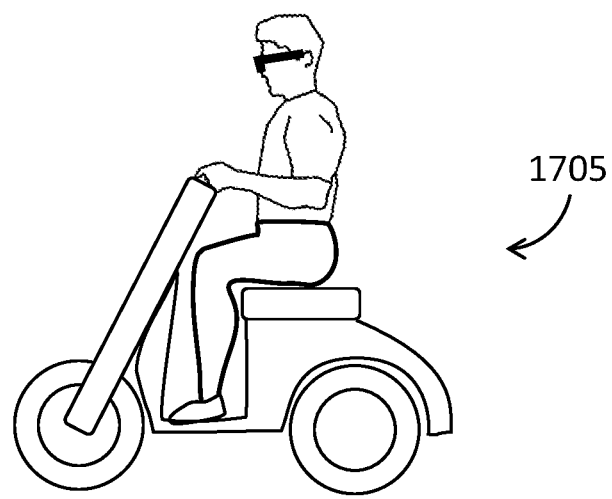
1705
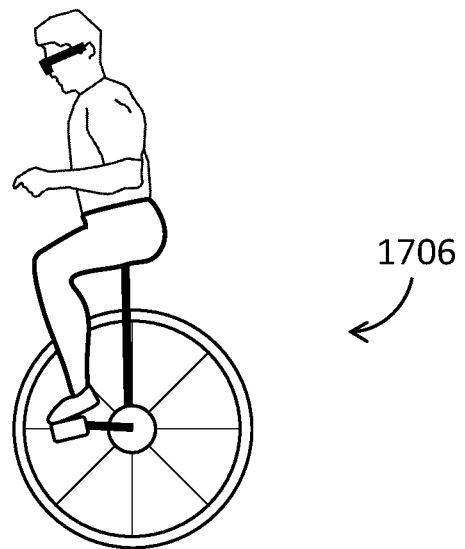
1706
Figure 17B

SYSTEMS, DEVICES, AND METHODS FOR CONTROLLING OPERATION OF WEARABLE DISPLAYS DURING VEHICLE OPERATION

CROSS-REFERENCE TO RELATED APPLICATIONS

This application claims the benefit of U.S. Provisional Application No. 62/750,060, filed Oct. 24, 2018, titled "Systems, Devices, and Methods for Controlling Operation of Wearable Heads-up Displays During Vehicle Operation", the content of which is incorporated herein in its entirety by reference.

BACKGROUND

Technical Field

The present systems, devices, and methods generally relate to controlling wearable displays during vehicle operation, and particularly to detecting when a user is operating a vehicle and restricting operation of a wearable display.

Description of the Related Art

Portable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other, non-portable electronic systems; however, a small and lightweight electronic device may still be considered portable even if it includes a wire-connection to a non-portable electronic system. For example, earphones may be considered a portable electronic device whether they are operated wirelessly or through a wire connection.

The convenience afforded by the portability of electronic devices has fostered a huge industry. Smartphones, audio players, laptop computers, tablet computers, and ebook readers are all examples of portable electronic devices. Further portable electronic devices enable us to be continuously connected to other's in the world through communication networks such as the Internet or cellular communication networks. This makes it easier for users to connect and interact with other remote users.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

Electronic Devices and Driving

Electronic devices are known to be distracting to a user while the user is operating a vehicle (i.e., driving). This can be very dangerous, because it takes a user's attention away from the road, and can result in collisions, property damage, injuries, and death. Many regions have implemented laws against "distracted driving", which prohibit people from using handheld electronic devices while they are operating a vehicle. With such laws in place, law enforcement is able to stop and punish people who still use their electronic devices while operating a vehicle.

Wearable heads-up displays can potentially cause similar distractions to user's while they are operating a vehicle. Wearable heads-up displays could even be potentially more distracting to users than handheld electronic devices, because the display is constantly in front of the user's eyes, and is thus difficult to ignore. Even people who normally diligently ignore their handheld electronic device while operating a vehicle could potentially de distracted by a wearable heads-up display. While a user with good vision might remove a distracting wearable heads-up display when operating a vehicle, some wearable heads-up displays also function as prescription eyeglasses which correct a user's poor vision. Users with poor vision are generally required to wear corrective eyewear while driving, and thus removing a distracting wearable heads-up display may not be an option for many users.

Further, it is generally desirable for operation of a wearable heads-up display to be discreet, such that a user is able to use their wearable heads-up display without drawing the attention of others around them. However, this would also impede law enforcement from being able to prevent user's from using wearable heads-up displays while driving, since such operation would generally go undetected. Thus, careless users may endanger themselves and others by using their wearable heads-up display while operating a vehicle, under the belief that they will not be caught. Even users who would not use a handheld electronic device while operating a vehicle may choose to use a wearable heads-up display while operating a vehicle, because the wearable heads-up display is more immediately accessible, and it can give users the feeling that they are still able to keep their eyes directed to the road, even though their attention is elsewhere.

Despite the above, there can be advantages to users utilizing at least some functionality on a wearable heads-up display while driving, such as providing driving assistance to the user to prevent erratic and unpredictable driving.

BRIEF SUMMARY

According to a broad aspect, the description describes a processor-based method of controlling user interaction with a system, the system comprising a wearable heads-up display ("WHUD") to present at least one user interface to a user of the system, at least one processor, a non-transitory processor-readable medium communicatively coupled to the at least one processor, and at least one user context sensor communicatively coupled to the at least one processor, wherein the non-transitory processor-readable medium stores processor-executable instructions that, when executed by the at least one processor, cause the system to perform the method, the method comprising: receiving, by the at least one processor, user context data from the at least one user context sensor; determining, by the at least one processor, that the user is operating a vehicle based on the user context data; and after determining, by the at least one processor, that the user is operating a vehicle, restricting, by the system, presentation of the at least one user interface to the user.

Receiving, by the at least one processor, user context data from the at least one user context sensor may include at least one of: receiving, by the at least one processor, captured audio data from a microphone included in the at least one user context sensor; receiving, by the at least one processor, captured visual data from a camera included in the at least one user context sensor; receiving, by the at least one processor, captured user eye data from a user eye-tracking system included in the at least one user context sensor; receiving, by the at least one processor, captured user motion data from an inertial measurement unit included in the at least one user context sensor; or receiving, by the at least one processor, user location data from a location sensor included in the at least one user context sensor.

The at least one user context sensor may include at least one microphone. Further, receiving, by the at least one processor, user context data from the at least one user context sensor may comprise receiving, by the at least one processor, captured audio data from the at least one microphone; and determining, by the at least one processor, that the user is operating a vehicle based on the user context data may comprise: analyzing, by the at least one processor, at least one of a volume spectrum of the captured audio data, a volume pattern in the captured audio data, a frequency spectrum of the captured audio data, a frequency pattern in the captured audio data, or content of the captured audio data; and determining, by the at least one processor, that the user is operating a vehicle based on one or a combination of the volume spectrum of the captured audio data, a volume pattern in the captured audio data, a frequency spectrum of the captured audio data, a frequency pattern in the captured audio data, or content of the captured audio data.

Analyzing, by the at least one processor, at least one of a volume spectrum of the captured audio data, a volume pattern in the captured audio data, a frequency spectrum of the captured audio data, a frequency pattern in the captured audio data, or content of the captured audio data may include identifying, by the at least one processor, a representation of at least one of vehicle engine noise, air resistance noise, vehicle wheel noise, or traffic noise.

The at least one user context sensor may include at least one camera. Further, receiving, by the at least one processor, user context data from the at least one user context sensor may comprise receiving, by the at least one processor, captured visual data from the at least one camera; and determining, by the at least one processor, that the user of the system is operating a vehicle based on the user context data may comprise: identifying, by the at least one processor, representations of vehicle features, vehicle accessories, or vehicle infrastructure in the captured visual data; and determining, by the at least one processor, that the user is operating a vehicle based on the identified vehicle features, vehicle accessories, or vehicle infrastructure.

Identifying, by the at least one processor, representations of vehicle features, vehicle accessories, or vehicle infrastructure in the captured visual data may include identifying, by the at least one processor, a representation of at least one of a steering wheel, a rear-view mirror, a side-view mirror, an information indicator, a windshield, handlebars, a helmet, a visor, a road line, a traffic-light, a traffic sign, or another vehicle.

The at least one user context sensor may include at least one inertial measurement unit ("IMU"). Further, receiving, by the at least one processor, user context data from the at least one user context sensor may comprise receiving, by the at least one processor, captured user motion data from the at least one IMU; and determining, by the at least one processor, that the user of the system is operating a vehicle based on the user context data may comprise: identifying, by the at least one processor, at least one of a velocity of the user, an acceleration of the user, and head motions made by the user based on the captured user motion data; and determining, by the at least one processor, that the user of the system is operating a vehicle based on one or a combination of at least one of a velocity of the user, an acceleration of the user, and head motions made by the user.

Determining, by the at least one processor, that the user of the system is operating a vehicle based on one or a combination of at least one of a velocity of the user, an acceleration of the user, and head motions made by the user may include at least one of: determining, by the at least one processor, that a velocity of the user exceeds a velocity threshold; determining, by the at least one processor, that an acceleration of the user exceeds an acceleration threshold; determining, by the at least one processor, that the user's head is frequently directed towards at least one of straight ahead, towards a rear-view mirror of a vehicle, towards a side-view mirror of a vehicle, or towards a side window of a vehicle.

The at least one user context sensor may include a user eye-tracking system. Further, receiving, by the at least one processor, user context data from the at least one user context sensor may comprise receiving, by the at least one processor, captured user eye data from the user eye-tracking system; and determining, by the at least one processor, that the user is operating a vehicle based on the user context data may comprise: analyzing, by the at least one processor, at least one of movement patterns of at least one eye of the user, gaze direction of the user, and a blink frequency of the user based on the captured user eye data; and determining, by the at least one processor, that a user of the system is operating a vehicle based on one or a combination of the at least one of movement patterns of at least one eye of the user, gaze direction of the user, and blink frequency of the user based on the captured user eye data.

Analyzing, by the at least one processor, at least one of movement patterns of at least one eye of the user, gaze direction of the user, and a blink frequency of the user based on the captured user eye data may include identifying that the user's gaze is frequently directed towards at least one of straight ahead, towards a rear-view mirror of a vehicle, towards a side-view mirror of a vehicle, or towards a side window of a vehicle.

The at least one user context sensor may include at least one location sensor. Further, receiving, by the at least one processor, user context data from the at least one user context sensor may comprise receiving, by the at least one processor, captured user location data from the at least one location sensor; and determining, by the at least one processor, that the user of the system is operating a vehicle based on the user context data may comprise: determining, by the at least one processor, at least one of a velocity of the user or an acceleration of the user based on the captured user location data; and determining, by the at least one processor, that the user of the system is operating a vehicle based on one or a combination of at least one of a velocity of the user and an acceleration of the user.

Determining, by the at least one processor, that the user of the system is operating a vehicle based on one or a combination of at least one of a velocity of the user and an acceleration of the user may include at least one of: determining, by the at least one processor, that a velocity of the user exceeds a velocity threshold; or determining, by the at least one processor, that an acceleration of the user exceeds an acceleration threshold.

Receiving, by the at least one processor, user context data from the at least one user context sensor may comprise at least two of: receiving, by the at least one processor, captured audio data from a microphone included in the at least one user context sensor; receiving, by the at least one processor, captured visual data from a camera included in the at least one user context sensor; receiving, by the at least one processor, captured user eye data from a user eye-tracking system included in the at least one user context sensor; receiving, by the at least one processor, captured user motion data from an inertial measurement unit included in the at least one user context sensor; and receiving, by the at least one processor, captured user location data from a location sensor included in the at least one user context sensor.

Determining, by the at least one processor, that the user is operating a vehicle based on the user context data may further include: identifying, by the at least one processor, at least one recently used or currently used software application installed on the non-transitory processor-readable medium of the system; determining, by the at least one processor, that the at least one recently used or currently used software application is relevant to operating a vehicle.

Determining, by the at least one processor, that the at least one recently used or currently used software application is relevant to operating a vehicle may include determining, by the at least one processor, that the recently used or currently used software application is a mapping or directional guidance software application.

Determining, by the at least one processor, that the user is operating a vehicle based on the user context data may further include determining, by the at least one processor, that the system is in communication with at least one electronic device integrated with a vehicle.

Determining, by the at least one processor, that the user is operating a vehicle based on the user context data may include determining, by the at least one processor, that the user is operating a car, van, truck, bus, tractor, scooter, moped, motorcycle, airplane, helicopter, boat, ship, vessel, bicycle, or unicycle.

Determining, by the at least one processor, that the user is operating a vehicle based on the user context data may comprise determining, by the at least one processor, that the user is operating a vehicle including a car, van, bus, tractor, or truck, which may comprise: determining, by the at least one processor, a seat of the vehicle occupied by the user based on the user context data; determining, by the at least one processor, a global location of the system based on location data from a location sensor included in the system or based on location settings stored in the non-transitory processor-readable medium; determining, by the at least one processor, an expected seat to be occupied by a driver of the vehicle based on the global location of the system; and determining, by the at least one processor, that the seat of the vehicle occupied by the user corresponds to the expected seat to be occupied by a driver of the vehicle.

Determining, by the at least one processor, that the user is operating a vehicle based on the user context data may comprise determining, by the at least one processor, that the user is operating a vehicle including a bicycle or unicycle, which may comprise: receiving, by the at least one processor, user heart rate data or user breathing data from at least one user activity sensor; and determining, by the at least one processor, that a user has an elevated heart rate based on the user heart data or elevated breathing based on the user breathing data.

Determining, by the at least one processor, that the user is operating a vehicle based on the user context data may comprise: analyzing, by the at least one processor, the user context data to identify representations of features indicating that the user is not operating a vehicle; and determining, by the at least one processor, that a user is operating a vehicle if the user context data does not include representations of features indicating that the user is not operating a vehicle.

The processor-based method may further comprise continuously capturing, by the at least one user context sensor, the user context data.

The processor-based method may further comprise instantaneously capturing, by the at least one user context sensor, the user context data.

The processor-based method may further comprise periodically capturing, by the at least one user context sensor, the user context data as intermittent user context data samples.

The processor-based method may further comprise in response to the at least one processor receiving a user input, capturing, by the at least one user context sensor, the user context data.

Restricting, by the system, presentation of the at least one user interface to the user may comprise completely disabling presentation of the at least one user interface to the user.

Restricting, by the system, presentation of the at least one user interface to the user may comprise disabling, by the system, presentation of at least one user interface which is not related to presenting vehicle operation related information.

Restricting, by the system, presentation of the at least one user interface to the user may comprise disabling, by the system, presentation of at least one user interface which is not related to presenting at least one of: a map, directional guidance, travel information, speed information, acceleration information, fuel consumption information, toll information, traffic information, weather information, or a clock display.

Restricting, by the system, presentation of the at least one user interface to the user may comprise disabling, by the system, presentation of at least one user interface for at least one software application which is not related to presenting vehicle operation assistance information.

Restricting, by the system, presentation of the at least one user interface to the user may comprise disabling, by the system, presentation of at least one visual user interface.

Restricting, by the system, presentation of the at least one user interface to the user may comprise: generating, by the at least one processor, a summary of content of the at least one user interface; and presenting, by the system, the summary of content of the at least one user interface.

The at least one user interface may be a visual user interface, and restricting, by the system, presentation of the at least one user interface to the user may comprise reducing, by the system, a display size of the at least one user interface.

The at least one user interface may be a visual user interface, and restricting, by the system, presentation of the at least one user interface to the user may comprise modifying, by the system, a display position of the at least one user interface.

The at least one user interface may be a vibratory user interface, and restricting, by the system, presentation of the at least one user interface to the user may comprise reducing, by the system, a vibration intensity and/or a vibration duration of the at least one user interface.

The at least one user interface may be a vibratory user interface, and restricting, by the system, presentation of the at least one user interface to the user may comprise modifying, by the system, a vibration pattern and/or a vibration frequency of the at least one user interface.

The processor-based method may further comprise: after restricting, by the system, presentation of the at least one user interface to the user, receiving, by the at least one processor, an unlock input from a user; and after receiving, by the at least one processor, an unlock input from a user, unrestricting, by the system, presentation of the at least one user interface to the user.

The processor-based method may further comprise: after restricting, by the system, presentation of the at least one user interface to the user, receiving, by the at least one processor, additional user context data from the at least one user context sensor; determining, by the at least one processor, that the user is not operating a vehicle based on the additional user context data; after determining, by the at least one processor, that the user is no longer operating a vehicle, unrestricting, by the system, presentation of the at least one user interface to the user.

According to another broad aspect, the description describes a system for presenting at least one user interface to a user of the system, the system comprising: a wearable heads-up display ("WHUD"); at least one processor; at least one user context sensor communicatively coupled to the at least one processor; and a non-transitory processor-readable medium communicatively coupled to the at least one processor, wherein the non-transitory processor-readable medium stores processor-executable instructions that, when executed by the at least one processor, cause the system to: receive, by the at least one processor, user context data from the at least one user context sensor; determine, by the at least one processor, that the user is operating a vehicle based on the user context data; and after the at least one processor determines that the user is operating a vehicle, restrict, by the system, presentation of the at least one user interface to the user.

The user context data from the at least one user context sensor may include at least one of: captured audio data from a microphone included in the at least one user context sensor; captured visual data from a camera included in the at least one user context sensor; captured user eye data from a user eye-tracking system included in the at least one user context sensor; captured user motion data from an inertial measurement unit included in the at least one user context sensor; or user location data from a location sensor included in the at least one user context sensor.

The at least one user context sensor may include at least one microphone, the user context data may include captured audio data from the at least one microphone, and the processor-executable instructions which when executed by the at least one processor cause the at least one processor to determine that a user is operating a vehicle based on the user context data may cause the at least one processor to: analyze at least one of a volume spectrum of the captured audio data, a volume pattern in the captured audio data, a frequency spectrum of the captured audio data, a frequency pattern in the captured audio data, or content of the captured audio data; and determine that the user is operating a vehicle based on one or a combination of the volume spectrum of the captured audio data, a volume pattern in the captured audio data, a frequency spectrum of the captured audio data, a frequency pattern in the captured audio data, or content of the captured audio data.

The processor-executable instructions which when executed by the at least one processor cause the at least one processor to analyze at least one of a volume spectrum of the captured audio data, a volume pattern in the captured audio data, a frequency spectrum of the captured audio data, a frequency pattern in the captured audio data, or content of the captured audio data may cause the at least one processor to identify a representation of at least one of vehicle engine noise, air resistance noise, vehicle wheel noise, or traffic noise.

The at least one user context sensor may include at least one camera, the user context data may include captured visual data from the at least one camera, and the processor-executable instructions which when executed by the at least one processor cause the at least one processor to determine that the user of the system is operating a vehicle based on the user context data may cause the at least one processor to: identify representations of vehicle features, vehicle accessories, or vehicle infrastructure in the captured visual data; and determine that the user is operating a vehicle based on the identified vehicle features, vehicle accessories, or vehicle infrastructure.

The processor-executable instructions which when executed by the at least one processor cause the at least one processor to identify representations of vehicle features, vehicle accessories, or vehicle infrastructure in the captured visual data may cause the at least one processor to identify a representation of at least one of a steering wheel, a rear-view mirror, a side-view mirror, an information indicator, a windshield, handlebars, a helmet, a visor, a road line, a traffic-light, a traffic sign, or another vehicle.

The at least one user context sensor may include at least one inertial measurement unit ("IMU"), the user context data may include captured user motion data from the at least one IMU, and the processor-executable instructions which when executed by the at least one processor cause the at least one processor to determine that the user of the system is operating a vehicle based on the user context data may cause the at least one processor to: identify at least one of a velocity of the user, an acceleration of the user, and head motions made by the user based on the captured user motion data; and determine that the user of the system is operating a vehicle based on one or a combination of at least one of a velocity of the user, an acceleration of the user, and head motions made by the user.

The processor-executable instructions which when executed by the at least one processor cause the at least one processor to determine that the user of the system is operating a vehicle based on one or a combination of at least one of a velocity of the user, an acceleration of the user, and head motions made by the user may cause the at least one processor to perform at least one of: determining that a velocity of the user exceeds a velocity threshold; determining that an acceleration of the user exceeds an acceleration threshold; determining that the user's head is frequently directed towards at least one of straight ahead, towards a rear-view mirror of a vehicle, towards a side-view mirror of a vehicle, or towards a side window of a vehicle.

The at least one user context sensor may include a user eye-tracking system, the user context data may include captured user eye data from the user eye-tracking system, and the processor-executable instructions which when executed by the at least one processor cause the at least one processor to determine that the user is operating a vehicle based on the user context data may cause the at least one processor to: analyze at least one of movement patterns of at least one eye of the user, gaze direction of the user, and a blink frequency of the user based on the captured user eye data; and determine that a user of the system is operating a vehicle based on one or a combination of the at least one of movement patterns of at least one eye of the user, gaze direction of the user, and blink frequency of the user based on the captured user eye data.

The processor-executable instructions which when executed by the at least one processor cause the at least one processor to analyze at least one of movement patterns of at least one eye of the user, gaze direction of the user, and a blink frequency of the user based on the captured user eye data may cause the at least one processor to identify that the user's gaze is frequently directed towards at least one of straight ahead, towards a rear-view mirror of a vehicle, towards a side-view mirror of a vehicle, or towards a side window of a vehicle.

The at least one user context sensor may include at least one location sensor, the user context data may include captured user location data from the at least one location sensor, and the processor-executable instructions which when executed by the at least one processor cause the at least one processor to determine that the user of the system is operating a vehicle based on the user context data may cause the at least one processor to: determine at least one of a velocity of the user or an acceleration of the user based on the captured user location data; and determine that the user of the system is operating a vehicle based on one or a combination of at least one of a velocity of the user and an acceleration of the user.

The processor-executable instructions which when executed by the at least one processor cause the at least one processor to determine that the user of the system is operating a vehicle based on one or a combination of at least one of a velocity of the user and an acceleration of the user may cause the at least one processor to: determine that a velocity of the user exceeds a velocity threshold; or determine that an acceleration of the user exceeds an acceleration threshold.

The user context data from the at least one user context sensor may include at least two of: captured audio data from a microphone included in the at least one user context sensor; captured visual data from a camera included in the at least one user context sensor; captured user eye data from a user eye-tracking system included in the at least one user context sensor; captured user motion data from an inertial measurement unit included in the at least one user context sensor; and captured user location data from a location sensor included in the at least one user context sensor.

The processor-executable instructions which when executed by the at least one processor cause the at least one processor to determine that the user is operating a vehicle based on the user context data may further cause the at least one processor to: identify at least one recently used or currently used software application installed on the non-transitory processor-readable medium of the system; determine that the at least one recently used or currently used software application is relevant to operating a vehicle.

The processor-executable instructions which when executed by the at least one processor cause the at least one processor to determine that the at least one recently used or currently used software application is relevant to operating a vehicle may cause the at least one processor to determine that the recently used or currently used software application is a mapping or directional guidance software application.

The processor-executable instructions which when executed by the at least one processor cause the at least one processor to determine that the user is operating a vehicle based on the user context data may further cause the at least one processor to determine that the system is in communication with at least one electronic device integrated with a vehicle.

The processor-executable instructions which when executed by the at least one processor cause the at least one processor to determine that the user is operating a vehicle based on the user context data may cause the at least one processor to determine that the user is operating a car, van, truck, bus, tractor, scooter, moped, motorcycle, airplane, helicopter, boat, ship, vessel, bicycle, or unicycle.

The processor-executable instructions which when executed by the at least one processor cause the at least one processor to determine that the user is operating a vehicle based on the user context data may cause the at least one processor to determine that the user is operating a vehicle including a car, van, bus, tractor, or truck, by causing the at least one processor to: determine a seat of the vehicle occupied by the user based on the user context data; determine a global location of the system based on location data from a location sensor included in the system or based on location settings stored in the non-transitory processor-readable medium; determine an expected seat to be occupied by a driver of the vehicle based on the global location of the system; and determine that the seat of the vehicle occupied by the user corresponds to the expected seat to be occupied by a driver of the vehicle.

The processor-executable instructions which when executed by the at least one processor cause the at least one processor to determine that the user is operating a vehicle based on the user context data may cause the at least one processor to determine that the user is operating a vehicle including a bicycle or unicycle, by causing the at least one processor to: receive user heart rate data or user breathing data from at least one user activity sensor; and determine that a user has an elevated heart rate based on the user heart data or elevated breathing based on the user breathing data.

The processor-executable instructions which when executed by the at least one processor cause the at least one processor to determine that the user is operating a vehicle based on the user context data may cause the at least one processor to: analyze the user context data to identify representations of features indicating that the user is not operating a vehicle; and determine that a user is operating a vehicle if the user context data does not include representations of features indicating that the user is not operating a vehicle.

The processor-executable instructions when executed by the at least one processor may further cause the system to continuously capture, by the at least one user context sensor, the user context data.

The processor-executable instructions when executed by the at least one processor may further cause the system to instantaneously capture, by the at least one user context sensor, the user context data.

The processor-executable instructions when executed by the at least one processor may further cause the system to periodically capture, by the at least one user context sensor, the user context data as intermittent user context data samples.

The processor-executable instructions when executed by the at least one processor may further cause the system to capture, by the at least one user context sensor, the user context data in response to the at least one processor receiving a user input.

The processor-executable instructions which when executed by the at least one processor cause the system to restrict presentation of the at least one user interface to the user may cause the system to completely disable presentation of the at least one user interface to the user.

The processor-executable instructions which when executed by the at least one processor cause the system to restrict presentation of the at least one user interface to the user may cause the system to disable presentation of at least one user interface which is not related to presenting vehicle operation related information.

The processor-executable instructions which when executed by the at least one processor cause the system to restrict presentation of the at least one user interface to the user may cause the system to disable presentation of at least one user interface which is not related to presenting at least one of: a map, directional guidance, travel information, speed information, acceleration information, fuel consumption information, toll information, traffic information, weather information, or a clock display.

The processor-executable instructions which when executed by the at least one processor cause the system to restrict presentation of the at least one user interface to the user may cause the system to disable presentation of at least one user interface for at least one software application which is not related to presenting vehicle operation assistance information.

The processor-executable instructions which when executed by the at least one processor cause the system to restrict presentation of the at least one user interface to the user may cause the system to disable presentation of at least one visual user interface.

The processor-executable instructions which when executed by the at least one processor cause the system to restrict presentation of the at least one user interface to the user may cause the at least one processor to: generate, by the at least one processor, a summary of content of the at least one user interface; and present, by the system, the summary of content of the at least one user interface.

The at least one user interface may be a visual user interface, and the processor-executable instructions which when executed by the at least one processor cause the system to restrict presentation of the at least one user interface to the user may cause the system to reduce a display size of the at least one user interface.

The at least one user interface may be a visual user interface, and the processor-executable instructions which when executed by the at least one processor cause the system to restrict presentation of the at least one user interface to the user may cause the system to modify a display position of the at least one user interface.

The at least one user interface may be a vibratory user interface, and the processor-executable instructions which when executed by the at least one processor cause the system to restrict presentation of the at least one user interface to the user may cause the system to reduce a vibration intensity and/or a vibration duration of the at least one user interface.

The at least one user interface may be a vibratory user interface, and the processor-executable instructions which when executed by the at least one processor cause the system to restrict presentation of the at least one user interface to the user may cause the system to modify a vibration pattern and/or a vibration frequency of the at least one user interface.

The processor-executable instructions when executed by the at least one processor may further cause the system to: after the system restricts presentation of the at least one user interface to the user, receive, by the at least one processor, an unlock input from a user; after the at least one processor receives the unlock input from a user, unrestrict, by the system, presentation of the at least one user interface to the user.

The processor-executable instructions when executed by the at least one processor may further cause the system to: after the system restricts presentation of the at least one user interface to the user, receive, by the at least one processor, additional user context data from the at least one user context sensor; determine, by the at least one processor, that the user is not operating a vehicle based on the additional user context data; after the at least one processor determines that the user is no longer operating a vehicle, unrestrict, by the system, presentation of the at least one user interface to the user.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 13 illustrates an exemplary scenario in which a user can be determined as operating a vehicle even if the user is operating a non-motorized vehicle, according to at least one illustrated implementation.

FIGS. 17A, 17B, and 17C illustrate exemplary vehicles for which the user can be determined as operating a vehicle in accordance with the present systems, devices, and methods.

DETAILED DESCRIPTION

In the following description, certain specific details are set forth in order to provide a thorough understanding of various disclosed implementations and embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or "one embodiment" or "an embodiment" means that a particular feature, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for controlling operation of wearable heads-up displays while a user is operating a vehicle.

Figure 1A:
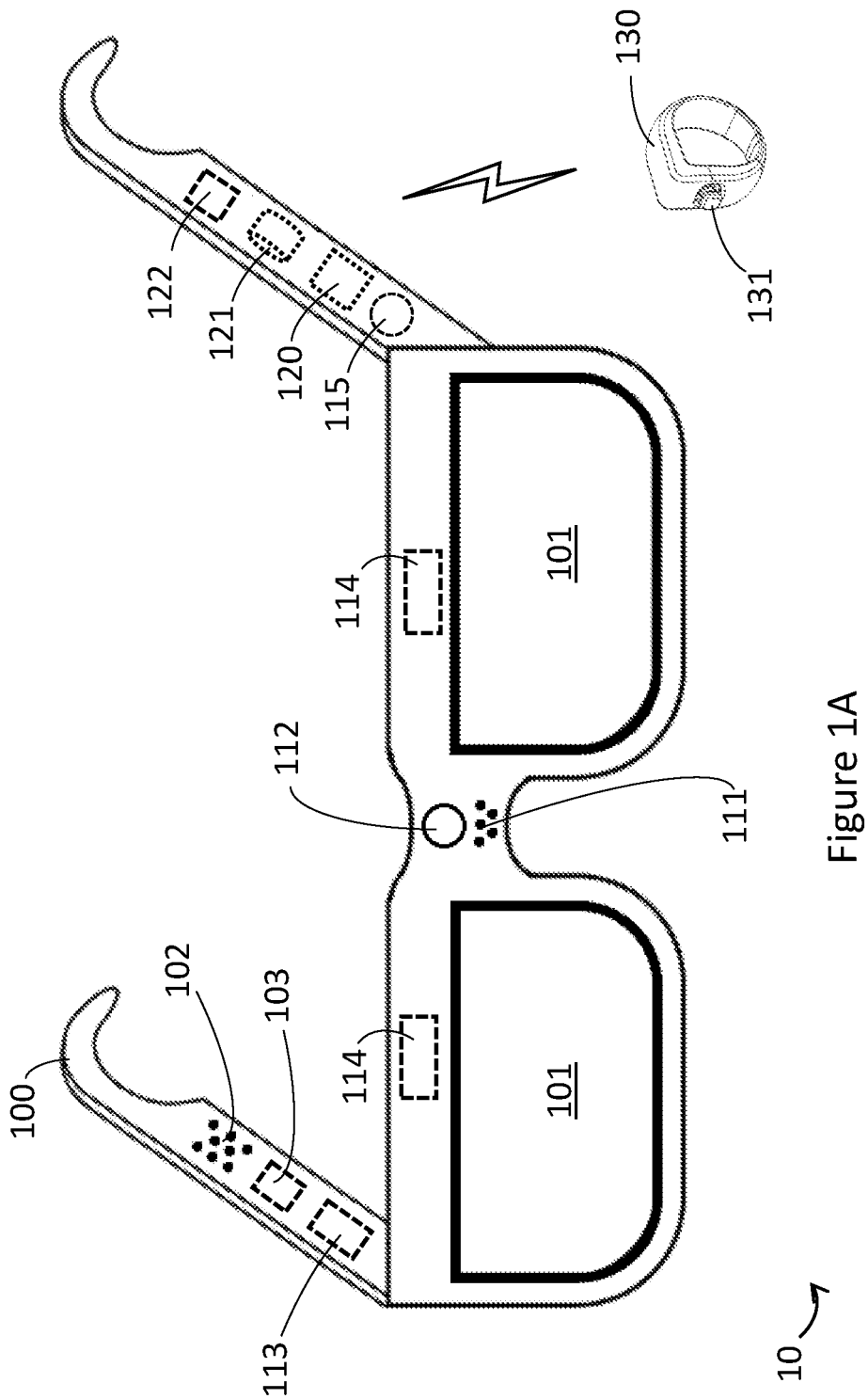
FIG. 1A is an isometric view of an exemplary wearable heads-up display ("WHUD") which can be used to determine whether a user is operating a vehicle and restrict presentation of at least one user interface according to the present systems, devices, and methods.

FIG. 1A illustrates an exemplary wearable heads-up display ("WHUD") system 10 which can be used in the present systems, devices, and methods. FIG. 1A includes many structures which can be included on a WHUD system as used in the present systems, devices, and methods, but one skilled in the art will appreciate that each of the illustrated structures in FIG. 1A is not required to achieve the present systems, devices, and methods, as will be discussed in more detail below. WHUD systems as employed in the present systems, devices and method can be based on, for example, the WHUDs disclosed in U.S. Non-Provisional patent application Ser. No. 15/145,576, U.S. Non-Provisional patent application Ser. No. 15/167,458, or U.S. Non-Provisional patent application Ser. No. 15/046,254.

WHUD system 10 as shown in FIG. 1A includes a WHUD 100, which includes multiple output devices which can be used to present information to a user. The presentation of information could be user initiated, for example when the user provides input to interact with a software application, or the presentation of information could be system initiated, for example when the system presents a notification to the user. The output devices can include, for example, display 101, speaker 102, haptic output interface 103, and any other output device as appropriate for a particular application. A WHUD in accordance with the present systems, devices, and methods can optionally include a plurality, all, or a combination of these output devices as shown in FIG. 1A, but only requires a single output device, such as a single display 101, a single speaker 102, or a single haptic output interface 103. Further, a WHUD in accordance with the present systems, devices, and methods can also include a plurality of any or all of the described output devices, such as a plurality of displays 101, a plurality of speakers 102, and/or a plurality of haptic output interfaces 103.

WHUD 100 as shown in FIG. 1A includes multiple sensors, which can be used to capture input which can indicate a context of the user, and which can be used to capture input from the user which provides instructions to the WHUD 100. These sensors can include microphone 111, camera 112, inertial measurement unit ("IMU") 113, eye-tracking system 114, location sensor 115, and any other sensor as appropriate for a particular application. A WHUD in accordance with the present systems, devices, and methods can optionally include a plurality, all, or a combination of these sensors as shown in FIG. 1A, but only requires a single sensor, such as a single microphone 111, a single camera 112, a single inertial measurement unit 113, a single eye-tracking system 114, or a single location sensor 115. Further, a WHUD in accordance with the present systems, devices, and methods can also include a plurality of any or all of the described sensors, such as a plurality of microphones 111, a plurality of cameras 112, a plurality of inertial measurement units 113, a plurality of eye-tracking systems 114, and/or a plurality of location sensors 115. Since the above described sensors can be used to capture and measure information indicating context of a user of the system, throughout this specification the term "user context sensor" can refer to any of the above described sensors, or any other sensors which can be carried by a WHUD system in accordance with the present invention, as appropriate for a given application. However, one skilled in the art will appreciate that the above described sensors can be more than just "user context sensors", in that the above described sensors can perform functions beyond just capturing user context, such as capturing user instructions, for example.

WHUD 100 as shown in FIG. 1A also includes at least one processor 120 and a non-transitory processor-readable medium 121 communicatively coupled to the at least one processor 120. The at least one processor 120 can be any suitable component which can execute instructions or logic, including but not limited to a micro-controller, microprocessor, multi-core processor, integrated-circuit, ASIC, FGPA, programmable logic device, or any appropriate combination of these components. The non-transitory processor-readable medium 121 can be any suitable component which can store instructions, logic, or programs, including but not limited to non-volatile or volatile memory, read only memory (ROM), random access memory (RAM), FLASH memory, registers, magnetic hard disk, optical disk, or any combination of these components. The non-transitory processor-readable medium 121 can store processor executable instructions which, when executed by the at least one processor 120, cause the WHUD 100 to implement the present systems, devices, and methods. Further, each of the output devices and sensors can be communicatively coupled to the at least one processor 120. That is, the at least one processor 120 is communicatively coupled to at least display 101, speaker 102, haptic output interface 103, microphone 111, camera 112, inertial measurement unit 113, eye-tracking system 114, and location sensor 115.

Optionally, WHUD 100 can include wireless communication hardware, such as a wireless receiver, a wireless transmitter, and/or a wireless transceiver, for communicating with peripheral devices and/or external servers and content providers. FIG. 1A illustrates an exemplary wireless transceiver 122.

Optionally, WHUD system 10 can include a user input mechanism communicatively coupled to WHUD 100, such as control ring 130 as illustrated in FIG. 1A. Control ring 130 includes a control pad 131 which can receive a user input. Further, although not illustrated in the FIG. 1A, control ring 130 also includes a wireless transmitter, and may optionally include at least one processor and a non-transitory processor-readable medium. Control ring 130 could for example be one of the rings disclosed in U.S. Provisional Patent Application Ser. No. 62/607,816, U.S. Provisional Patent Application Ser. No. 62/607,819, or U.S. Provisional Patent Application Ser. No. 62/671,248.

Control ring 130 in use is worn on a finger of a user, and the user can provide input to the WHUD 100 via the control ring 130. In the case of FIG. 1A, the control pad 131 is a pressable joystick, which allows the user to input directional commands by applying force for example by tilting the joystick, as well as a confirm command by pressing the joystick inwards (e.g., depressing). Control ring 130 may or may not include a haptic output interface to provide haptic feedback. Control ring 130 communicates the user input to the WHUD 100 by the wireless transmitter on the control ring 130. The WHUD 100 receives the user input with a wireless receiver thereon, such as wireless transceiver 122 illustrated in FIG. 1A. Control ring 130 advantageously provides a convenient input mechanism which can be used quickly and inconspicuously.

One skilled in the art will recognize that the above hardware description is merely an exemplary hardware arrangement, and many different systems could be employed within the context of the present disclosure. For example, control ring 130 and WHUD 100 do not necessarily need to communicate wirelessly, but instead control ring 130 could communicate with the WHUD 100 via a wired connection. Further, control ring 130 is not limited to a ring worn a finger of the user, but could also be any other type of control device, such as for example a band worn on a user's arm or a control pad held in a user's hand. Further still, control pad 131 could be replaced by any appropriate input mechanism known in the art, such as tactile buttons, a trackpad, a touch-sensitive area, and/or a gesture detection system such as electromyography sensors, mechanomyography sensors, and/or an inertial measurement unit, as non-limiting examples. Exemplary EMG armband and gesture identification systems are described in at least U.S. Non-Provisional patent application Ser. No. 14/155,087, U.S. Non-Provisional patent application Ser. No. 14/155,107, PCT Patent Application PCT/US2014/057029, U.S. Non-Provisional patent application Ser. No. 15/282,535, U.S. Pat. Nos. 9,299,248, 9,367,139, and/or 9,389,694.

Alternatively, user inputs could be input directly to WHUD 100, without the need for a control ring at all. For example, WHUD 100 could include at least one button, a plurality of buttons, a trackpad, a joystick, a touch-sensitive area or another user input mechanism by which a user can provide input directly to WHUD 100. As another example, WHUD 100 may receive user input directly as voice commands through microphone 111.

Certain elements of FIG. 1A are drawn in dashed lines, to indicate that these devices or structures are not normally visible at the current perspective of WHUD 100 as shown in FIG. 1A, because the dashed elements are enclosed within a housing of the WHUD 100, or are occluded by other features such as the support structure or housing of WHUD 100. However, one skilled in the art will appreciate that these devices or structures do not necessarily have to be enclosed in the housing or behind other features of WHUD 100, but can be carried external to the housing or partially external as appropriate for a given application. Further, one skilled in the art will appreciate that although the output devices and sensors are shown at certain locations of the support structure of WHUD 100, one skilled in the art will appreciate that any of the output devices and sensors can be relocated to any location on the support structure as appropriate for a particular application.

Figure 1B:
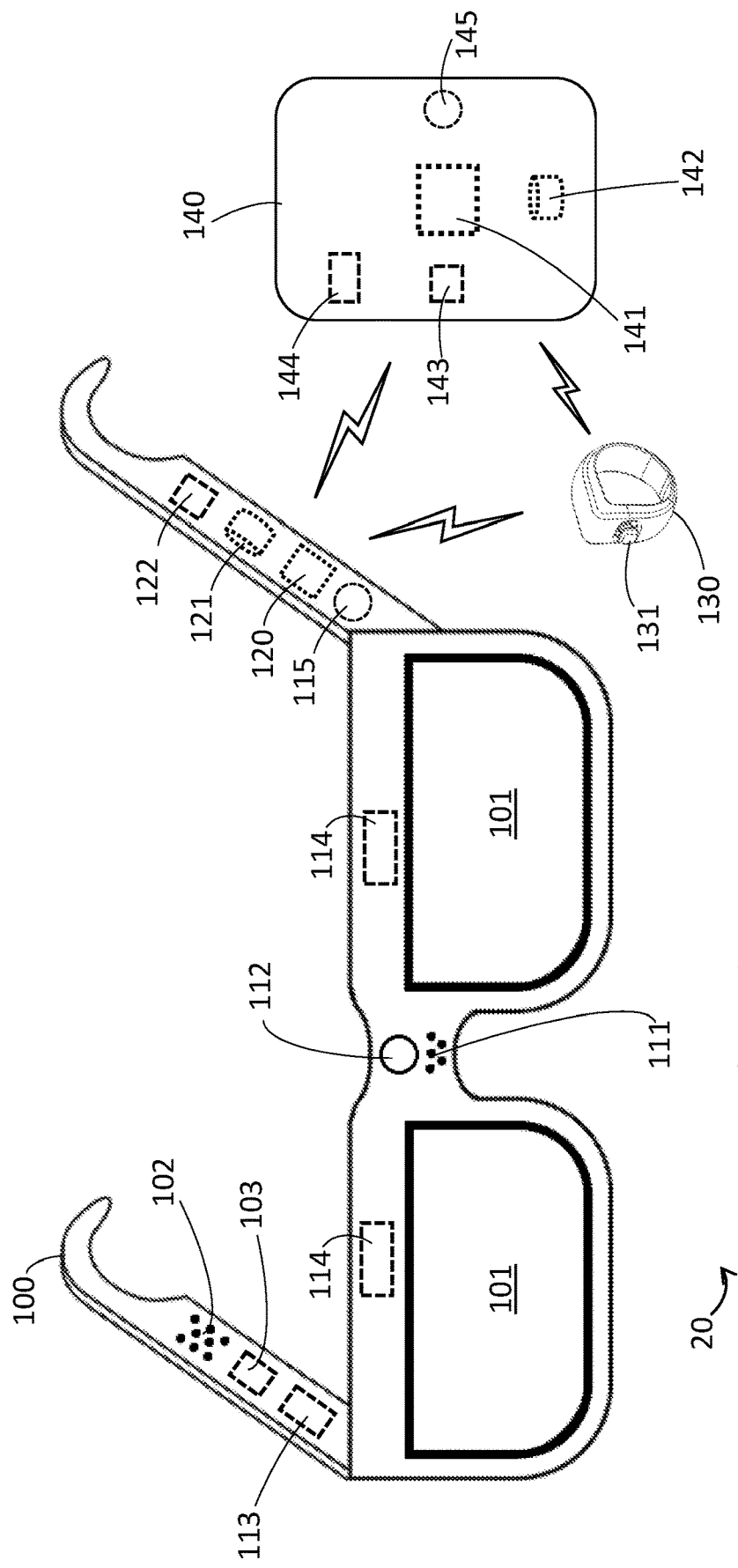
FIG. 1B is an isometric view of an exemplary WHUD and a peripheral device, which together constitute a WHUD system which can be used to determine whether a user is operating a vehicle and restrict presentation of at least one user interface according to the present systems, devices, and methods.

FIG. 1B illustrates another exemplary system which includes a WHUD system 20 which is similar in at least some respects to WHUD system 10 shown in FIG. 1A. One skilled in the art will appreciate that at least some of the description regarding the system illustrated in FIG. 1A is applicable to the system illustrated in FIG. 1B.

One difference between the system of FIG. 1B and the system of FIG. 1A is that WHUD system 20 of FIG. 1B includes a peripheral device 140 communicatively coupled to WHUD 100. Peripheral device 140 can include some combination of at least one processor 141, a non-transitory processor-readable storage medium 142, a wireless transceiver 143, an inertial measurement unit 144, and a location sensor 145. Each of the non-transitory processor-readable storage medium 142, the wireless transceiver 143, inertial measurement unit 144, and location sensor 145 can be communicatively coupled to the at least one processor 141. The at least one processor 141 can be any suitable component which can execute instructions or logic, including but not limited to a micro-controller, microprocessor, multi-core processor, integrated-circuit, ASIC, FGPA, programmable logic device, or any appropriate combination of these components. The non-transitory processor-readable medium 142 can be any suitable component which can store instructions, logic, or programs, including but not limited to non-volatile or volatile memory, read only memory (ROM), random access memory (RAM), FLASH memory, registers, magnetic hard disk, optical disk, or any combination of these components. The non-transitory processor-readable medium 142 can store processor executable instructions which, when executed by the at least one processor 141, cause the peripheral device 140 to implement at least some of the present systems, devices, and methods. One skilled in the art will appreciate that wireless transceiver 143 could also be implemented as a separate wireless receiver and wireless transmitter. Peripheral electronic device 140 can for example be a smartphone, PDA, tablet, cellular telephone, smartwatch, wearable computer, or any other suitable portable electronic device.

One skilled in the art will appreciate that WHUD 100 illustrated in FIG. 1B can be identical to WHUD 100 illustrated in FIG. 1A and described in the corresponding description, though this is not necessarily the case. One use for peripheral device 140 is to provide an additional device for performing some of the functionality that would otherwise be performed by the WHUD 100. This would allow some of the hardware of WHUD 100 to instead be carried by peripheral device 140 to make WHUD 100 lighter and/or smaller, or would allow some hardware to be carried by peripheral device 140 which is in addition to similar hardware in WHUD 100 such that the system as a whole can be more powerful. As one example, at least some of the sensing and processing performed by WHUD system 20 can be performed by the peripheral device 140 instead of the WHUD 100. In this example, WHUD 100 could be designed to not include the at least one processor 120, non-transitory processor-readable storage medium 121, IMU 113, and location sensor 115. The at least one processor 141 on peripheral device 140 could process and render image data to send to the WHUD 100 via wireless transceiver 143 and wireless transceiver 122, such that the WHUD 100 need only display the pre-rendered data. The at least one processor 141 could also analyze captured user motion data from IMU 144 on peripheral device 140 and/or user location data from location sensor 145 on peripheral device 140, in order to determine position, speed, acceleration, and movement direction of a user. Such a system would advantageously reduce the amount of hardware which is required on the WHUD, thus reducing bulk, weight, and power consumption of the WHUD. The reduced power consumption also allows for the WHUD to use a smaller battery, further reducing bulk and weight. One skilled in the art will appreciate that the above example is merely illustrative, and that any components of the WHUD could be removed and instead carried by peripheral device 140 as appropriate for a given application. One skilled in the art will also appreciate that WHUD 100 could be implemented as described in FIG. 1A without modification to the hardware thereof, but communicatively coupled to a peripheral device 140 which carries components which are redundant and/or complimentary to components carried by WHUD 100. Additionally, one skilled in the art will appreciate that the exemplary implementation shown in FIG. 1B is not limiting as to what sensors could be included in peripheral device, and any appropriate sensor could be added to peripheral device 140 for a given application. For example, peripheral device could carry a microphone or a temperature sensor, among other additional sensor types.

One skilled in the art will appreciate that control ring 130 does not necessarily need to communicate directly with WHUD 100. Specifically, in the implementation where the peripheral device 140 processes and renders image data to send to WHUD 100 for display, control ring 130 could send inputs from a user to the peripheral device 140 instead of to WHUD 100. Peripheral device 140 may process the received inputs and alter the rendering of image data to be sent to WHUD 100 based on the received inputs if needed.

Although FIG. 1B shows the control ring 130 and peripheral device 140 as being separate devices, one skilled in the art will appreciate that it is within the scope of the present systems, devices, and methods for the control ring 130 and peripheral device 140 to be coupled together or even to be the same device. For example, the control ring 130 could be implemented as a band worn on a user's forearm during use, and the peripheral device 140 could also be attached to the same band. Alternatively, in addition to the previously described components, the control ring 130 could include at least one processor, a non-transitory processor-readable medium, wireless communication hardware, and any number of sensors. The control ring 130 could then perform processing instead of or in addition to WHUD 100, and/or could capture user context data instead of or in addition to WHUD 100, such that the control ring 130 effectively serves as the peripheral device 140.

One example of a system in which a peripheral device performs much of the processing for a WHUD is discussed in U.S. Non-Provisional patent application Ser. No. 14/704, 663.

Figure 2:
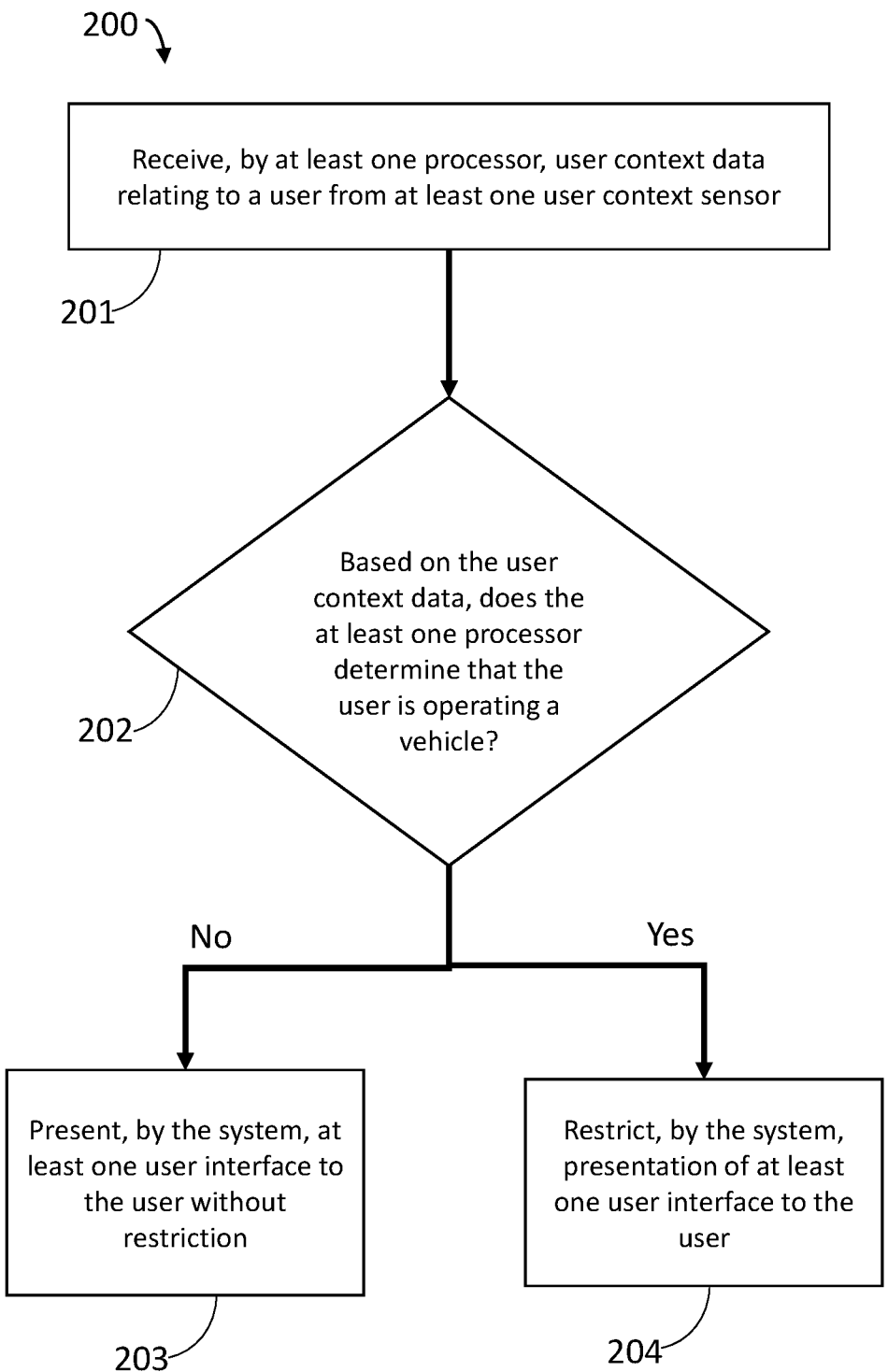
FIG. 2 is a flow diagram showing an exemplary method of determining whether a user operating a vehicle and restricting presentation of at least one user interface, according to at least one illustrated implementation.

FIG. 2 is a flow diagram showing a method 200 of controlling operation of a wearable display in accordance with the present systems, devices, and methods. Method 200 may be implemented using the systems illustrated in FIG. 1A or 1B, and reference numerals below refer to hardware components of WHUD system 10 and WHUD system 20 for ease of discussion. However, one skilled in the art will appreciate that method 200 may also be implemented on any hardware as appropriate for a given application. One skilled in the art will appreciate that any acts performed by hardware on WHUD 100 could also be performed by hardware on peripheral device 140, and likewise any acts performed by hardware on peripheral device 140 could also be performed by hardware on WHUD 100, as appropriate for a given application. One skilled in the art will appreciate that the present systems, devices, and methods could be implemented on a standalone WHUD 100, without the need for a peripheral device such as peripheral device 140.

Method 200 includes acts 201, 202, 203, and 204, but one skilled in the art will appreciate that in alternative implementations certain acts may be omitted and/or additional acts may be added. One skilled in the art will also appreciate that the illustrated order of the acts is shown for exemplary purposes only and may change in alternative implementations.

At 201, at least one processor 120/141 receives user context data relating to a user from at least one user context sensor, such as microphone 111, camera 112, IMU 113, eye-tracking system 114, location sensor 115, IMU 144, or location sensor 145. Act 201 is discussed in more detail below with reference to at least FIGS. 3, 7, 8, 9A, 9B, 11A-11F, 12A-12D, 13, 15A, 15B, and 16.

At 202, the at least one processor 120/141 determines whether the user of WHUD system 10/20 is operating a vehicle based on the user context data. "User context data" in the present systems, devices, and method refers to data which indicates a context of a user or can be analyzed to determine a context of a user. Further, "data" can include many data points, i.e., a plurality of data, but can also encompass a single point of data, i.e., datum. In the context of the present systems, devices, and methods, "operating a vehicle" generally refers to controlling a vehicle's motion, such as acceleration, speed, and movement direction. This could include driving a motorized vehicle such as a car, van, truck, bus, tractor, scooter, moped, motorcycle, airplane, helicopter, boat, ship or other vessel. "Operating a vehicle" can also include driving or controlling a vehicle which is not motorized, such as a bicycle or a unicycle. "Operating a vehicle" could also include controlling motion of certain components of the vehicle which may not necessarily result in motion of the vehicle as a whole, such as for example raising or lowering the bed or bucket of a dump-truck, raising or lowering the forks on a fork-lift, or manipulating the bucket on a backhoe or front-loader. Act 202 is discussed in more detail below with reference to FIGS. 3, 4A-4D, 5, 6A, 6B, 7, 8, 9A, 9B, 10A, 10B, 11A-11F, 12A-12D, 13, 14A-14C, 15A, 15B, 16, and 17.

Based on the outcome of act 202, the method proceeds to either act 203 or 204. If the at least one processor 120/141 determines that that the user is not operating a vehicle, act 203 is performed, in which the system presents at least one user interface to the user without restriction. If the at least one processor 120/141 determines that the user is operating a vehicle, act 204 is performed, in which the system restricts presentation of the at least one user interface to the user. Acts 203 and 204 are described in more detail below with reference to FIGS. 18, 19, 20A-20I, 21A-21E, 22, and 23.

In summary, method 200 essentially involves the WHUD system determining whether a user is operating a vehicle based on user context data, and restricting presentation of at least one user interface of the system when the user is operating a vehicle. This restriction can involve at least one or a combination of completely disabling presentation of all user interfaces to the user, restricting presentation of user interfaces to user interfaces associated with certain software applications, disabling presentation of visual user interfaces via a display, or any other restriction of presentation of at least one user interface as appropriate for a given application. Advantageously, restricting presentation of at least one user interface to the user when the at least one processor determines that the user is operating a vehicle prevents the user from being distracted by the WHUD system, and thus improves vehicular safety.

Detecting Vehicle Operation

FIGS. 3, 4A-4D, 5, 6A, 6B, 7, 8, 9A, 9B, 10A, 10B, 11A-11F, 12A-12D, 13, 14A-14C, 15A, 15B, 16, and 17 show many exemplary techniques for determining whether a user is operating a vehicle. The discussions relating to these figures make reference to WHUD systems, which can be substantially the same as WHUD systems 10 and 20 shown in FIGS. 1A and 1B. However one skilled in the art will appreciate that the below implementations need not include each of the output devices or sensors shown in FIGS. 1A and 1B, but can include only a single output device, a plurality of output devices, a single sensor, a plurality of sensors, or any combination thereof as appropriate for a given application.

Figure 3:
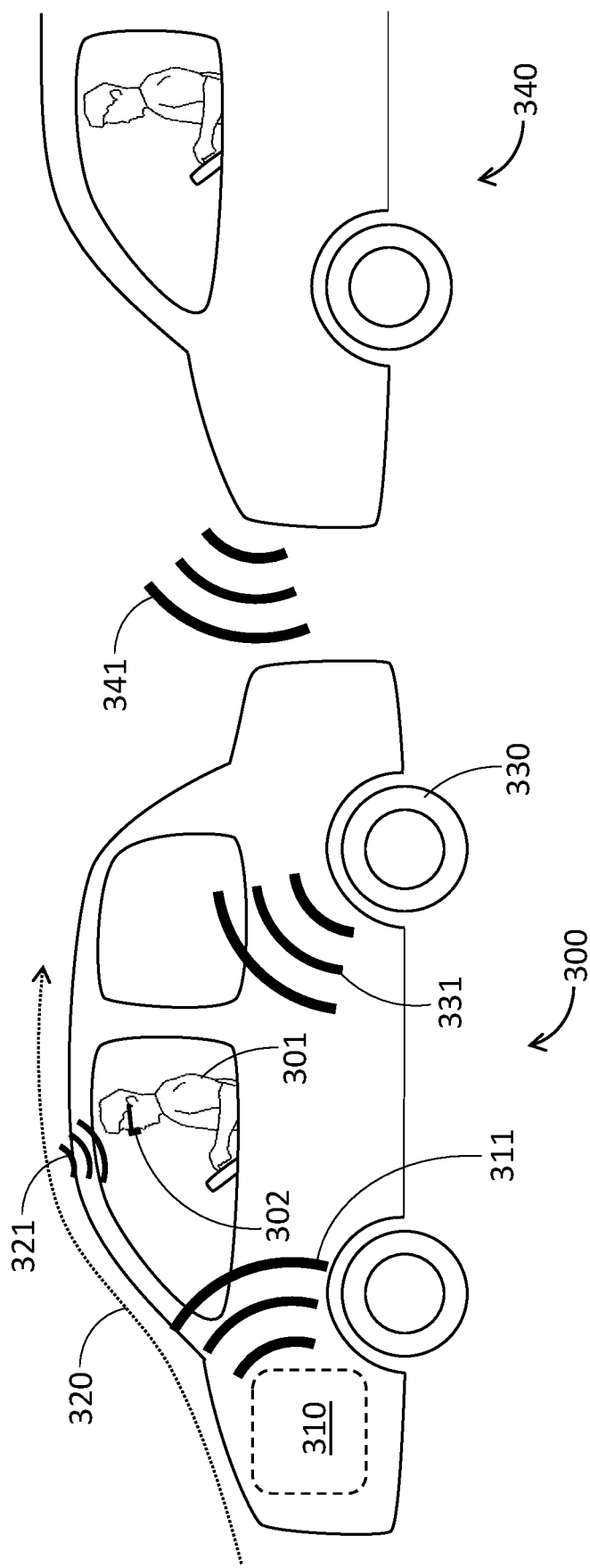
FIG. 3 illustrates an exemplary scenario in which sound/audio can be used to determine whether a user is operating a vehicle.

FIG. 3 shows an exemplary situation which includes a vehicle 300 being operated by a user 301 wearing a WHUD system 302. Although not explicitly illustrated, WHUD system 302 includes at least one microphone. In this implementation, the microphone of WHUD system 302 captures user context data in the form of captured audio data, which is analyzed by at least one processor 120/141 included in WHUD system 302 to determine whether the user is operating a vehicle.

In the case of FIG. 3, vehicle 300 includes an engine 310 which makes noise 311. The at least one microphone of WHUD system 302 can capture noise 311, and the at least one processor 120/141 of WHUD system 302 can identify noise 311 as being engine noise, and consequently determine that the user is operating a vehicle. The at least one processor 120/141 can analyze captured noise 311 in any number of ways using any number of features as appropriate for a given application. For example, the at least one processor 120/141 could analyze at least one or a combination of a volume pattern over time of the captured audio data, a volume spectrum of the captured audio data, a frequency pattern over time of the captured audio data, frequency spectrum of the captured audio data, content of the captured audio data, or any other appropriate feature of the captured audio data. As used herein, a volume spectrum of the captured audio data refers to a range of volumes included in the captured audio data, and a frequency spectrum refers to a range of frequencies included in the captured audio data. The at least one processor 120/141 can compare at least one feature of captured noise 311 to at least one known engine noise profile to determine a level of similarity between captured noise 311 and known engine noise. Accuracy of this comparison could be improved if the at least one processor 120/141 knows what type and or model of vehicle or vehicles the user typically operates, so that the at least one processor 120/141 can compare captured engine noise 311 to at least one known engine noise profile for the type and/or model of vehicle or vehicles which the user typically operates. Additionally, the at least one microphone of WHUD system 302 could include a directional microphone such as a microphone array, and the at least one processor 120/141 can analyze the captured audio data to determine a position and direction of the source of the engine noise 311. By determining a position and direction of the engine noise 311, the at least one processor can determine whether the position and direction of engine noise 311 is consistent with a position and direction of an engine relative to a driver in a typical vehicle, or in the vehicle which the user normally operates or owns.

Figure 4A:
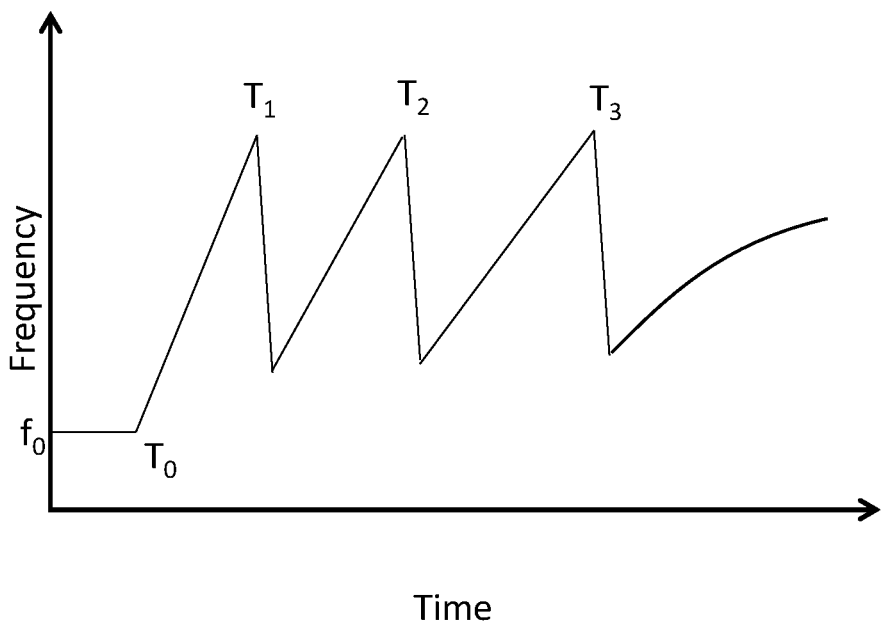
FIGS. 4A, 4B, 4C, 4D, 5, 6A, and 6B are exemplary frequency and volume over time plots which exemplify techniques for determining whether a user is operating a vehicle based on sound/audio, according to at least seven illustrated implementations.
Figure 4B:
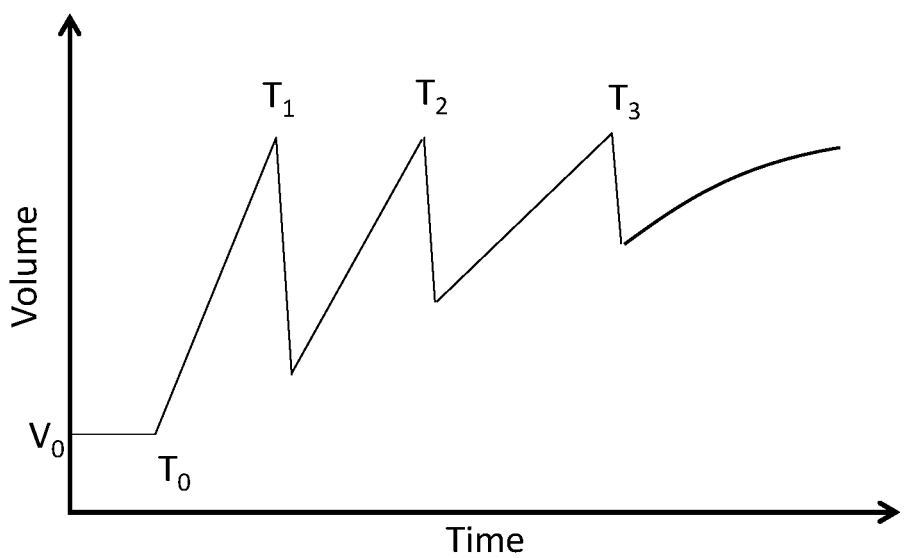

FIGS. 4A-4D illustrate exemplary frequency and volume curves for engine noise which can be analyzed to determine whether a user is in a vehicle. FIGS. 4A and 4B illustrate frequency and volume of noise over time when a user is in a vehicle having an engine with a transmission for shifting between discreet gear ratios, such as a vehicle with a manual or automatic transmission which shifts to higher gear ratios as the vehicle accelerates, in order to provide higher power in lower gear ratios and higher speed in higher gear ratios.

FIG. 4A illustrates a frequency of engine noise as a vehicle accelerates from idle through a plurality of gear ratios, and FIG. 4B illustrates a volume of engine noise as a vehicle accelerates from idle through the plurality of gear ratios. In particular, a vehicle is idle when the vehicle is turned on, but is not accelerating, such as when the vehicle transmission is set to "park" or "neutral", or when the clutch pedal and/or brake pedal is pressed. In the idle state, the vehicle engine should run at a constant rate of revolutions per minute (RPM), thus producing engine noise at a constant frequency $f_0$ and a constant volume $V_0$, but the transmission will be disconnected from the drive train such that the vehicle does not move. In FIGS. 4A and 4B, the vehicle is in the idle state until time $T_0$, at which point an operator of the vehicle causes the vehicle to accelerate, such as by releasing the clutch and/or brake pedal and pressing the gas pedal. As the vehicle accelerates, the RPM of the engine will increase, increasing the frequency and volume of engine noise until time $T_1$, at which point the transmission shifts to a higher gear ratio. When the engine shifts to a higher gear ratio, the RPM of the engine will suddenly drop, and consequently frequency and volume of the engine noise will also suddenly drop. Once the engine has switched to the higher gear ratio, the vehicle continues to accelerate, and the RPM of the engine, and consequently frequency of volume of engine noise, increase again until time $T_2$. At time $T_2$, the transmission again switches to a higher gear ratio causing a similar fluctuation in engine RPM and frequency and volume of engine noise as described regarding $T_1$. This process of switching gear ratios and resulting pattern of changes in engine RPM frequency of volume of engine noise can be repeated for each available gear ratio which a vehicle has, though FIGS. 4A and 4B only illustrate acceleration through four gear ratios in the interests of clarity. Once the vehicle has reached a desired speed, engine RPM and consequently frequency and volume of engine noise will plateau.

The exact frequencies and volumes of engine noise produced by a vehicle will be dependent on the specific vehicle, and the frequency and volume of engine noise for a given gear ratio can be the same as or different than the frequency and volume of engine noise for a different gear ratio. In the example of FIGS. 4A and 4B, the frequency and volume of engine noise at $T_1$, $T_2$, and $T_3$ can all be equal, or can be different, dependent on the specific vehicle, and even dependent on the driving and acceleration habits of the operator of the vehicle. Likewise, the frequency and volume of engine noise at the troughs between $T_1$, $T_2$, and $T_3$ can all be equal, or can be different.

Figure 4C:
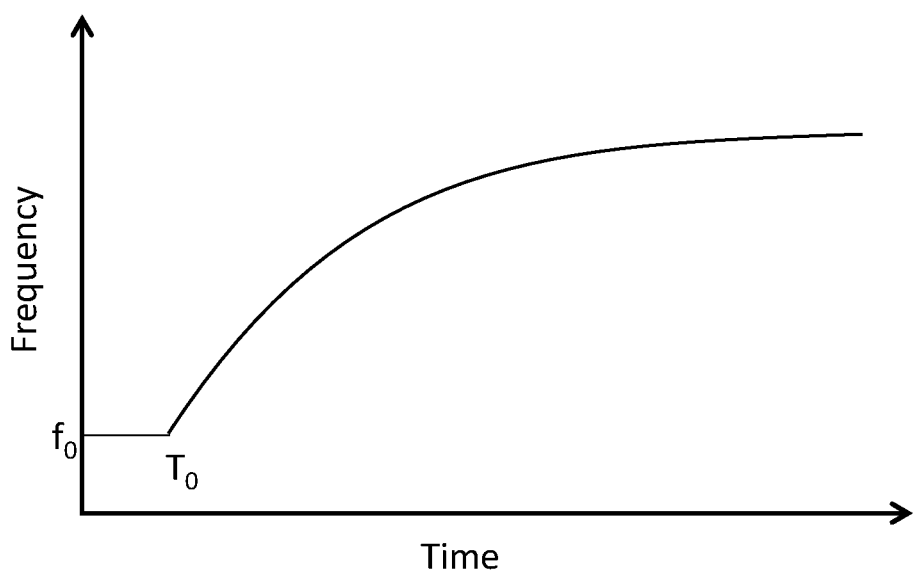
Figure 4D:
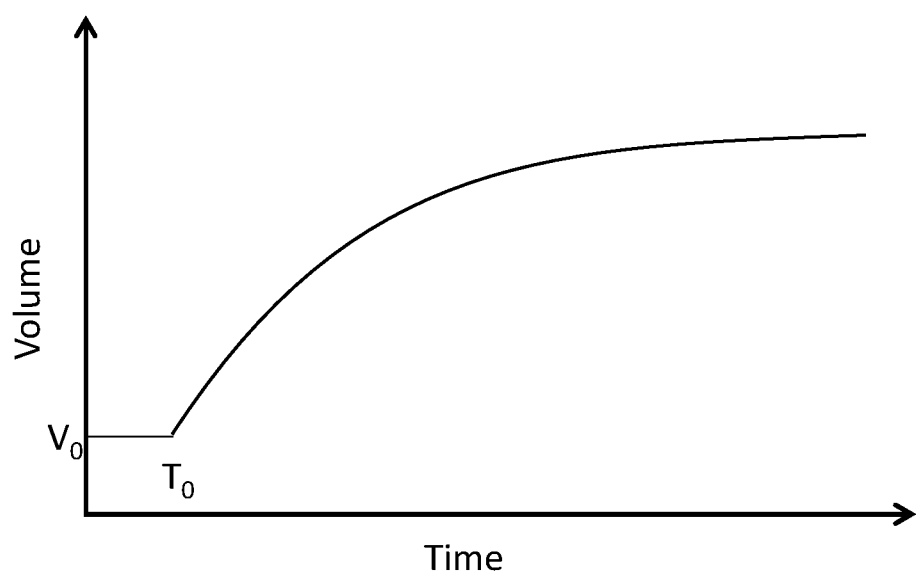

FIGS. 4C and 4D illustrate frequency and volume of noise over time when a user is in a vehicle having a continuously variable transmission, in which a gear ratio between the vehicle engine and the vehicle drivetrain is continuously adjusted and optimized, without having the same abrupt shifts between gear ratios as shown in FIGS. 4A and 4B. Similar to as described regarding FIGS. 4A and 4B above, in the example of FIGS. 4C and 4D, the vehicle is in an idle state until time $T_0$, such that the engine is running at a constant RPM, thus producing engine noise at a constant frequency $f_0$ and a constant volume $V_0$. At time $T_0$, an operator of the vehicle begins to accelerate, thus increasing the RPM of the engine and consequently frequency and volume of engine noise produced by the engine.

Returning to FIG. 3, air 320 moving across vehicle 300 can generate air resistance noise 321, caused by the resistance of air redirected by vehicle 300. Further, FIG. 3 also shows at least one wheel 330 of vehicle 300 which can generate wheel noise 331, which generally refers to noise generated by contact between at least one wheel 330 and ground being driven on, as well as noise generated by rotation of wheel 330. At least one microphone of WHUD system 302 can capture air resistance noise 321 and wheel noise 331, and the at least one processor 120/141 of WHUD system 302 can identify air resistance noise 321 as being caused by the resistance of air redirected by vehicle 300, and can identify wheel noise 331 as noise being caused by at least one wheel 330. The at least one processor 120/141 can analyze captured noise 321 and 331 in any number of ways as appropriate for a given application. For example, the at least one processor 120/141 can analyze captured noise 321 to determine whether captured noise 321 includes representations of noise commonly heard from resistance of air redirected by a vehicle, and/or the at least one processor 120/141 can analyze captured noise 331 to determine whether captured noise 331 includes representations of noise commonly heard from at least one wheel of a vehicle.

Figure 5:
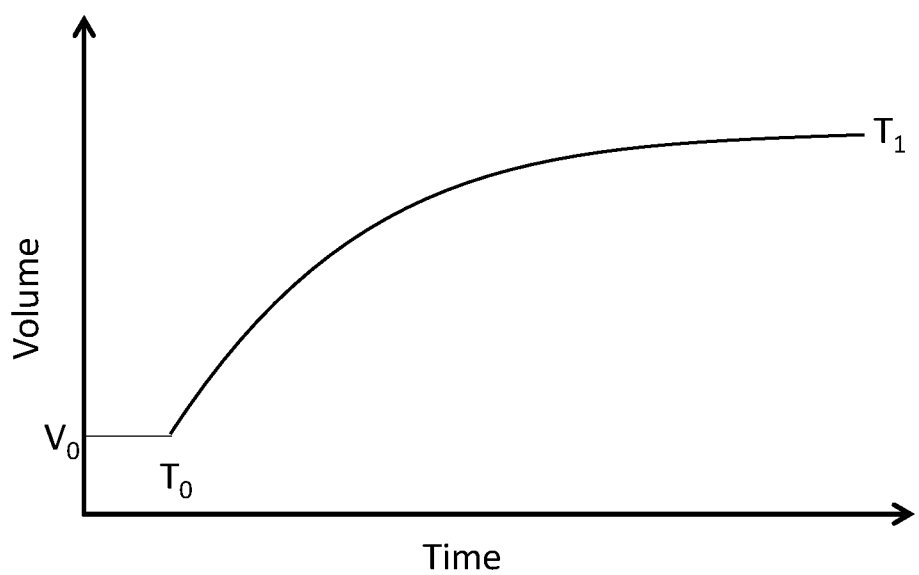

FIG. 5 illustrates an exemplary volume plot for an example of detecting a noise pattern created by air resistance or at least one wheel of a vehicle. In the example, at time $T_0$, the vehicle beings accelerating. Maximum acceleration occurs at time $T_0$, and gradually decreases until acceleration becomes 0 (i.e, velocity become constant) at time $T_1$. $V_0$ lume of captured noise 321 and 331 increases in proportion to velocity of the vehicle, since the noise caused by air resistance and at least one wheel increases in proportion to the velocity of the vehicle. Once velocity becomes constant, air resistance noise 321 and wheel noise 331 will also become approximately constant. However, even at a constant velocity, air resistance noise 321 can become louder or quieter as external air movement such as wind becomes stronger or weaker relative to the vehicle. Similarly, even at a constant velocity, wheel noise 331 can become louder or quieter if the vehicle transitions to a road which has a different surface material, such as when a vehicle transitions from a roughly paved road to a smoothly paved road or vice-versa, for example.

Returning to FIG. 3, at least one external vehicle 340 can generate noise 341, which can be captured by the at least one microphone of WHUD system 302, and the at least one processor 120/141 of WHUD system 302 can identify noise 341 as being noise caused by external traffic, and consequently determine that the user is operating a vehicle. The at least one processor 120/141 can analyze captured noise 341 in any number of ways as appropriate for a given application. For example, the at least one processor 120/141 can analyze captured noise 341 to determine whether captured noise 341 includes representations of noise commonly heard from vehicular traffic, such as noise from vehicle horns or emergency vehicle sirens, engine noise from other vehicles, air resistance noise caused by other vehicles, or any other appropriate noise generated by external traffic.

Figure 6A:
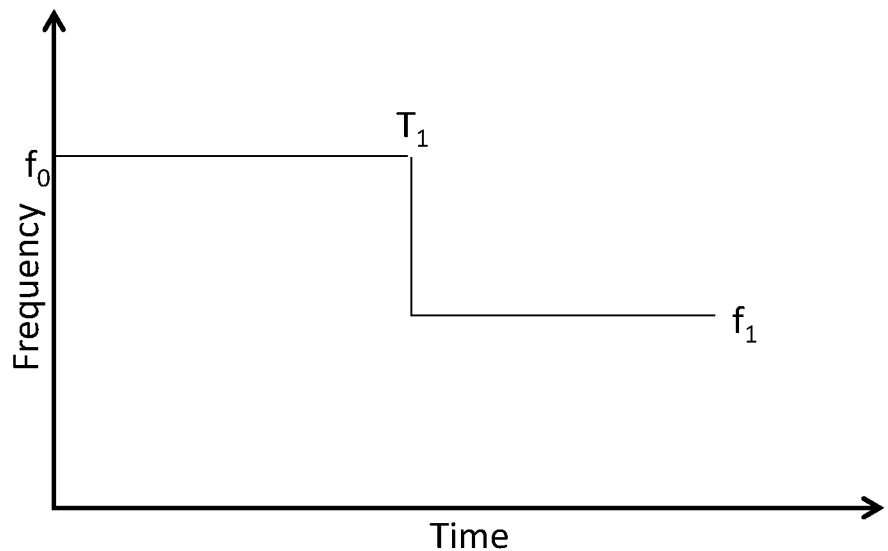
Figure 6B:
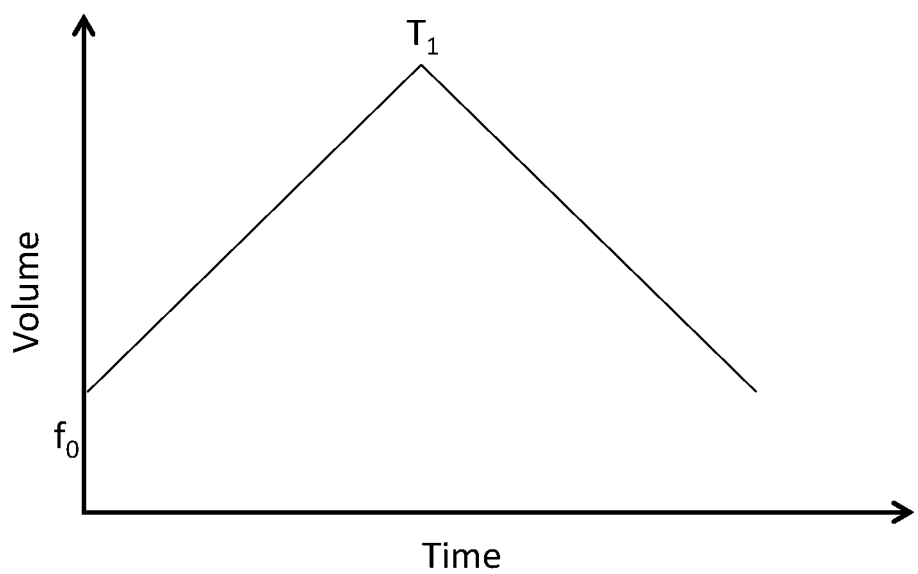

FIGS. 6A and 6B illustrate exemplary frequency and volume plots of an example of detecting a noise pattern created by traffic around a first vehicle. In the example of FIGS. 6A and 6B, a second vehicle approaches the first vehicle and passes the first vehicle at time $T_1$. Before time $T_1$, noise from the second vehicle, such as air resistance noise, engine noise, or siren noise, can be heard from the first vehicle at a first frequency $f_0$. As the second vehicle passes the first vehicle at time $T_1$, the frequency of noise from the second vehicle, as captured from the perspective of the first vehicle, will abruptly drop due to the phenomenon known as the Doppler Effect, in which a frequency of noise from a noise source will appear higher as the noise source moves towards a listener, and appear lower as the noise source moves away from the listener. Regarding volume, as the second vehicle approaches the first vehicle, volume of noise from the second vehicle as perceived from the perspective of the first vehicle will increase until time T1, such that noise from the second vehicle is at a maximum volume when the second vehicle is as close as it will be to the first vehicle. After the second vehicle passes the first vehicle at time $T_1$, volume of noise from the second vehicle as perceived from the perspective of the first vehicle will decrease as the second vehicle becomes further and further away.

One skilled in the art will appreciate that in the above example, the second vehicle approaching the first vehicle is intended in a relative sense, and is not limited to the second vehicle moving to be closer to the first vehicle. Rather, "approaching" simply means that the first vehicle and the second vehicle are becoming closer together, and can include a situation where the first vehicle is moving to be closer to the second vehicle, or a situation where both the first vehicle and the second vehicle are moving towards each other. Similar Frequency and Volume patterns to those shown in FIGS. 6A and 6B can be seen in these additional situations as well. Further, the above example can also apply to situations where the first vehicle is moving relative to at least one stationary object. In such an embodiment, sound from the first vehicle and/or ambient noise will reflect from the at least one stationary object, and the reflected sound as perceived from the first vehicle can have similar frequency and volume patterns as those shown in FIGS. 6A and 6B as the first vehicle moves towards and away from the at least one stationary object. Similar Frequency and $V_0$lume patterns to those shown in FIGS. 6A and 6B can be seen as a first vehicle moves towards and away from at least one stationary object.

The present systems, device, and methods may employ a camera and computer vision to determine whether a user is operating a vehicle. The camera can be mounted on a WHUD itself, such that visual data captured by the camera closely approximates what a user of the WHUD actually sees. Alternatively, a camera can be carried in any appropriate way, such as a body camera attached to a user's clothes, or a camera carried by an accessory such as a watch, ring, or necklace worn by the user. The system can include a single camera, or can include a plurality of cameras. The plurality of cameras can include multiple cameras positioned on the front of a WHUD, to provide slightly different views of a scene in front of a user, improving depth analysis. The plurality of cameras could include cameras aimed in different directions to capture more complete and/or panoramic visual data representing the environment around the user.

Figure 7:
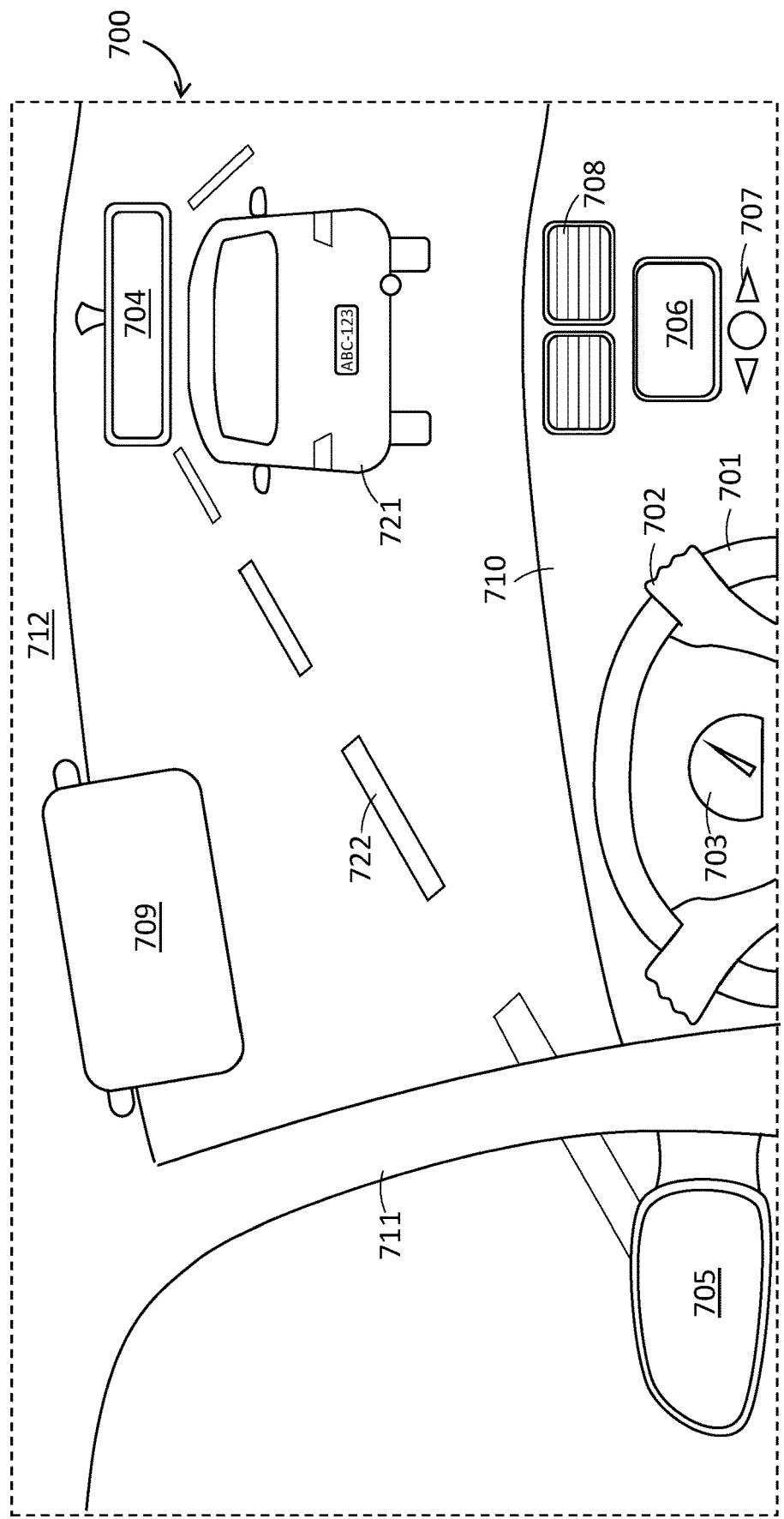
FIGS. 7, 8, 9A, and 9B are exemplary scenes as seen from the perspective of a camera on a WHUD system, to illustrate how captured visual data can be used to determine whether a user is operating a vehicle, according to at least four illustrated implementations.

FIG. 7 illustrates an example scene 700 as might be captured by a camera included on a WHUD system worn by a user operating a vehicle. At least one processor 120/141 included in the WHUD system can analyze visual data captured by the camera to detect vehicle features, vehicle accessories, or vehicle infrastructure represented in the visual data which indicate whether a user is operating a vehicle. For example, the at least one processor could identify equipment and features which can be found in a vehicle, such as a steering wheel 701 and at least one user hand 702 thereon, at least one information indicator 703, rear-view mirror 704, side-view mirror 705, display screen 706, controls 707, air vents 708, sun visor 709, dashboard 710, frame-pillar 711, roof 712, or any other vehicle interior feature as appropriate. Information indicator 703 could include for example a speedometer, engine RPM gauge, engine temperature gauge, odometer, fuel gauge, status indication lights, warning lights, vehicle information screen, or any other indicator appropriate for a given application. Display screen 706 could include for example a stereo display, a back-up camera display, a GPS or map display, an entertainment display, or any other display as appropriate. Controls 707 could include at least one user input interface for providing user control of any features of the vehicle, such as buttons, knobs, switches, levers, touch-sensitive inputs, or any other user interface as appropriate for a given application. The at least one processor 120/141 may also identify features external to the vehicle which can indicate whether a user of the WHUD system is operating a vehicle, such as at least one other vehicle 721, at least one road line 722, or any other appropriate external feature. The at least one other vehicle 721 could be identified by identifying features of the at least one other vehicle 721, such as a general vehicular shape of the other vehicle, a license plate, windows, wheels, mirrors, at least one exhaust pipe, and indicator lights, or any other appropriate features. Indicator lights of the other vehicle could include taillights, brake lights, turn signals, back-up lights, headlights, or any other appropriate lights. One skilled in the art will appreciate that the present systems, devices, and methods can utilize identification of the above described features external to the vehicle to determine whether the user is operating a vehicle, regardless of the type of vehicle the user is driving. That is, features external to the vehicle are independent of the vehicle, and thus can be identified to determine whether a user is operating a vehicle in any of the implementations discussed herein.

Figure 8:
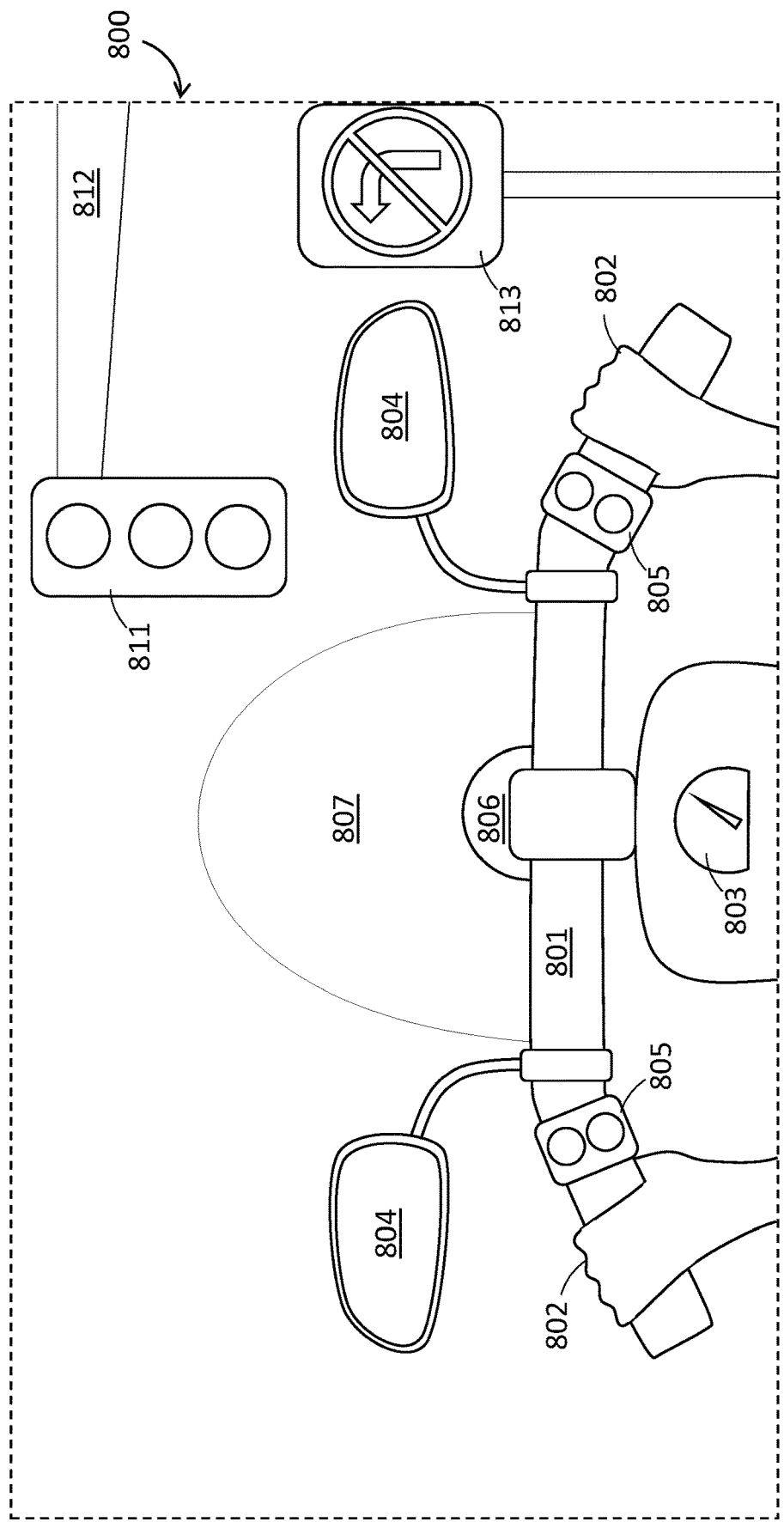

Although the above discussed figures generally show the present systems, devices, and methods as being utilized in a passenger car, one skilled in the art will appreciate that the present systems, devices, and methods are applicable to any appropriate vehicle, including but not limited to vans, trucks, buses, tractors, scooters, mopeds, motorcycles, airplanes, helicopters, boats, ships, other vessels, bicycles, and unicycles. FIG. 8 illustrates an example scene 800 as might be captured by a camera included on a WHUD system worn by a user operating a motorcycle. At least one processor 120/141 included in the WHUD system can analyze visual data captured by the camera to detect features represented in the visual data which indicate whether a user is operating a vehicle. For example, the at least one processor 120/141 could identify equipment and features which can be found on a motorcycle or similar vehicle, such as handlebars 801 and at least one user hand 802 thereon, at least one information indicator 803, at least one side-view mirror 804, controls 805, headlight 806, windscreen 807, or any other vehicle feature as appropriate. Information indicator 803 could include for example a speedometer, engine RPM gauge, engine temperature gauge, odometer, fuel gauge, status indication lights, warning lights, vehicle information screen, or any other indicator appropriate for a given application. Controls 805 could include at least one user input interface for providing user control of any features of the vehicle, such as buttons, knobs, switches, levers, touch-sensitive inputs, or any other user interface as appropriate for a given application. In addition, the at least one processor may also identify features external to the vehicle which can indicate whether a user of the WHUD system is operating a vehicle, such as those described above with reference to FIG. 7, in addition to traffic light 811, light post 812, and road sign 813. One skilled in the art will appreciate that these additional features external to the vehicle are independent of the vehicle, and thus can be identified to determine whether a user is operating a vehicle in any of the implementations discussed herein.

Figure 9A:
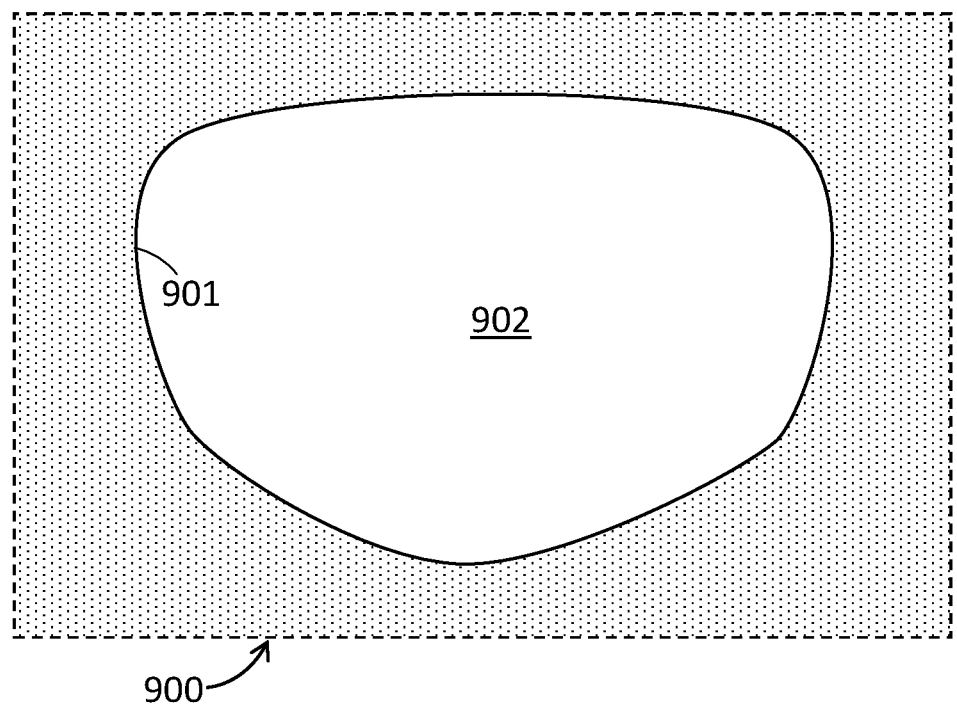
Figure 9B:
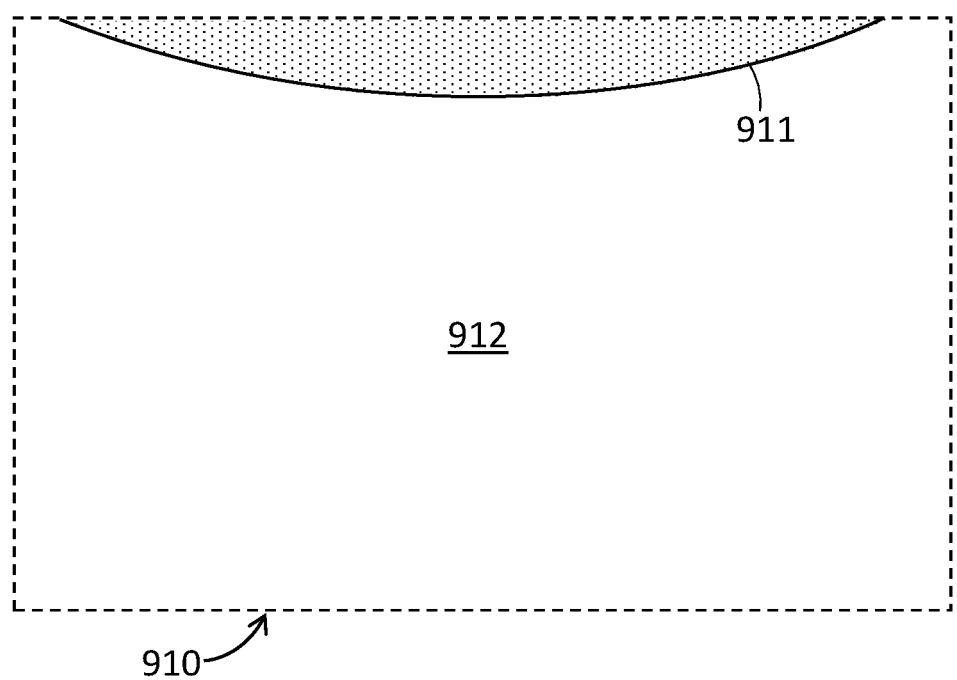

FIGS. 9A and 9B illustrate exemplary scenes which might be captured by a camera on a WHUD system when a user is wearing a helmet, such as in the case where a user is operating a motorcycle, scooter, moped, bicycle, or unicycle. FIG. 9A shows a scene 900 where a user is where a full helmet, where the helmet covers the user's entire head, as is typically worn when a user is operating a motorcycle. At least one processor of the WHUD system can identify an edge of the helmet 901 which surrounds an opening 902 which enables to the to see outside of the helmet. Opening 902 may have a transparent or translucent visor or shield thereover, which may or may not be removable. FIG. 9B shows a scene 910 where a user is wearing a partial helmet, where the helmet covers only a portion of the user's head, such as only the top or only the top and back of the user's head, as is typically worn when a user is operating a scooter, moped, bicycle, or unicycle. At least one processor 120/141 of the WHUD system can identify an edge 911 of the helmet, where the user can still see their environment 912 underneath edge 911. The helmet of FIG. 9B may optionally include a transparent or translucent visor which extends down over the user's face when worn. Such a visor may or may not be removable.

Figure 10A:
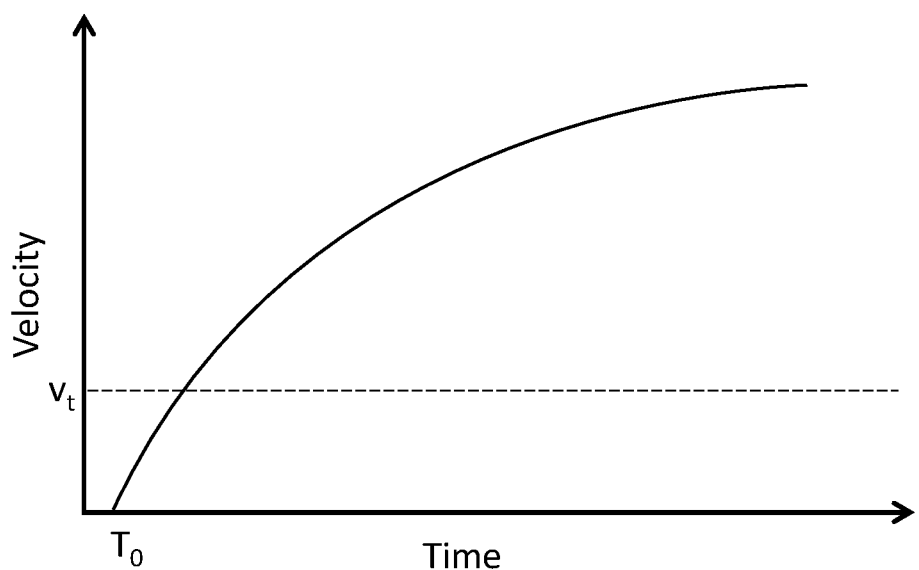
FIGS. 10A and 10B are exemplary velocity and acceleration over time plots which exemplify techniques for determining whether a user is operating a vehicle based on velocity, acceleration, or inertial data, according to at least two illustrated implementations.
Figure 10B:
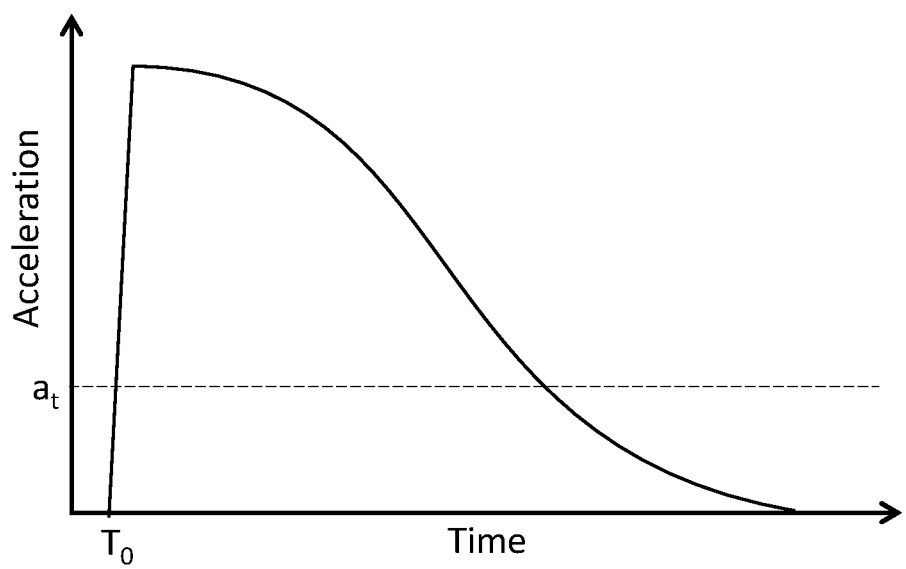

At least one IMU included in a WHUD system may capture user motion data, which can be analyzed by at least one processor 120/141 of the WHUD system to determine whether a user is in a vehicle. For example, FIGS. 10A and 10B illustrate cases where an IMU of the WHUD system captures user velocity data and user acceleration or inertial data, and the at least one processor 120/141 determines whether a user is operating a vehicle based on at least one of the captured user velocity data and the captured user acceleration or inertial data. In the case of FIG. 10A, the at least one processor 120/141 can compare captured velocity data to a velocity threshold $v_t$, and determine that the user is in a vehicle if the velocity exceeds a velocity threshold. One skilled in the art will appreciate that user velocity data alone can be analyzed to determine whether a user is in a moving vehicle. In the case of FIG. 10B, the at least one processor 120/141 can compare the captured acceleration data to an acceleration threshold at, and determine that the user is in a vehicle if the user acceleration exceeds the acceleration threshold. However, if the user is operating a vehicle at a constant velocity above the velocity threshold, the acceleration will be below the acceleration threshold, and thus determining whether the user is operating a vehicle based solely on user acceleration data may not reliably indicate whether a user is operating a vehicle. In this regard, utilizing user acceleration data could be used a complement to determining whether a user is in a vehicle based on user velocity data. For example, a user may accelerate very quickly, but there may still be some time before the velocity threshold is reached, and thus there may be a delay in determining that a user is in a vehicle if only user velocity data is used. By analyzing the user acceleration data in addition to the user velocity data, the at least one processor 120/141 could make a more immediate determination that the user is in a vehicle based on the user acceleration data, but could also more reliably determine that the user is in a vehicle when the user is driving at an approximately constant velocity.

The acceleration threshold and the velocity threshold discussed above could be set to correspond to or exceed human limits, such that the acceleration threshold represents an acceleration which is not physically possible by a human without the assistance of a vehicle, and the velocity threshold represents a velocity which is not physically possible by a human without the assistance of a vehicle. Alternatively, the velocity threshold could be set at a value which is generally not exceeded by humans. As an example, the velocity threshold could be set at 10 km/h, since most humans will not exceed this velocity unless they are riding a vehicle or running. Similarly, the acceleration threshold could be set at a value which is generally not exceed by humans without the assistance of a vehicle.

In addition to or as an alternative to comparing an instantaneous user velocity or acceleration to a threshold, the at least one processor 120/141 could monitor user motion data over time, and determine whether the user is in a vehicle based on user motion patterns over time. As an example, if a user is driving in a residential neighborhood with many stop signs and/or slow zones, the user may never exceed the velocity threshold or the acceleration threshold. However, the at least one processor 120/141 may determine that the user makes frequent stops, followed by accelerations, with consistent velocity therebetween. Based on this determination, the at least one processor 120/141 may determine that the user's motion pattern is similar to a vehicular motion pattern, and consequently determine that the user is riding a vehicle.

As an alternative to or in addition to using an IMU to capture user motion data, a WHUD system can include a location sensor, such as a GPS sensor. The location sensor can provide user position data over time to at least one processor 120/141 of the WHUD system, and the at least one processor 120/141 can determine at least a user velocity and/or user acceleration based on changes in user position over time. The determined user velocity and/or user acceleration can be used to determine whether the user is riding a vehicle using the same techniques discussed with reference to FIGS. 10A and 10B.

Captured user motion can include more than just user acceleration data and user velocity data. For example, an IMU in a WHUD system can capture user head motion data, which indicates movements of the user's head. At least one processor 120/141 in the WHUD system can analyze this user head motion data to determine whether the user is making gestures which correspond to gestures made by a user when operating a vehicle. FIGS. 11A to 11F illustrate several exemplary gestures in this regard.

Figure 11A:
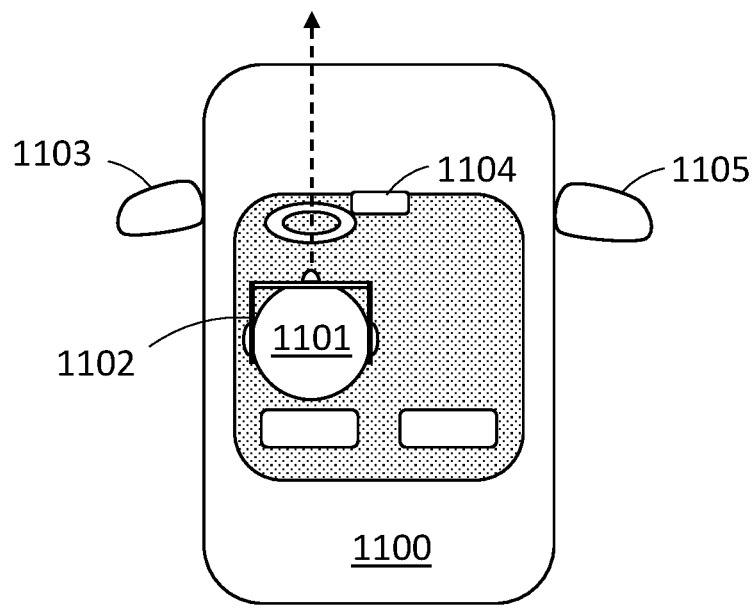
FIGS. 11A, 11B, 11C, 11D, 11E, and 11F illustrate exemplary scenarios in which user motion data can be used to determine whether a user is operating a vehicle based on user head movement, according to at least six illustrated implementations.
Figure 11B:
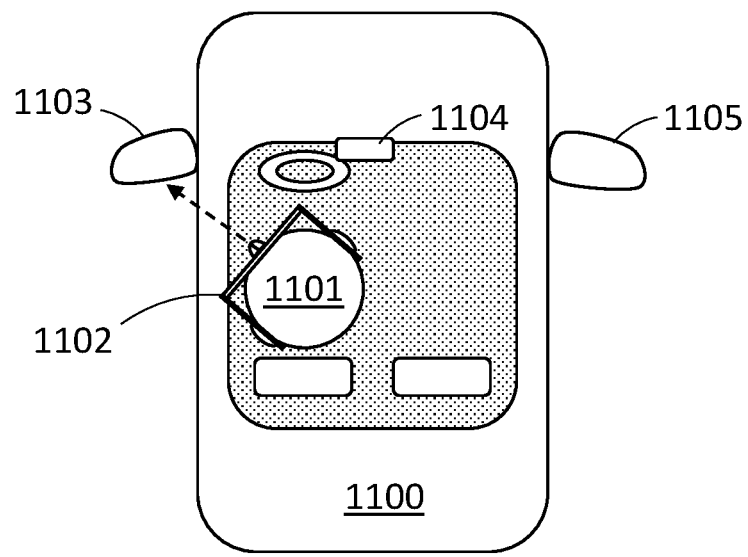
Figure 11C:
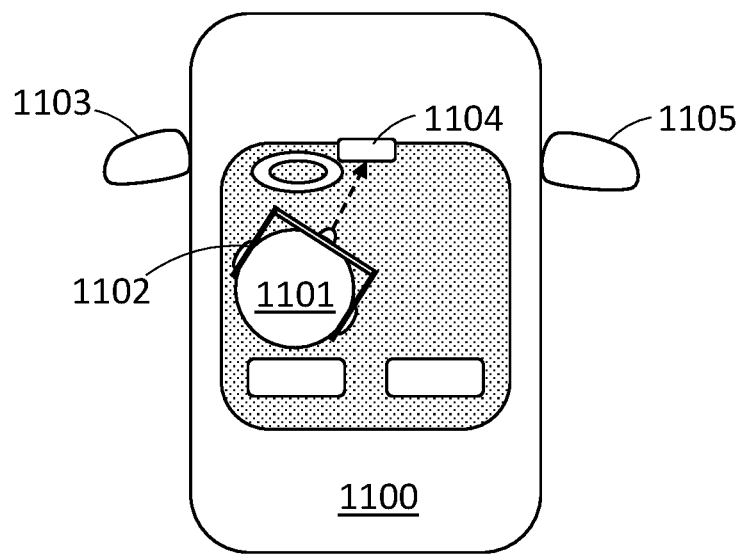
Figure 11D:
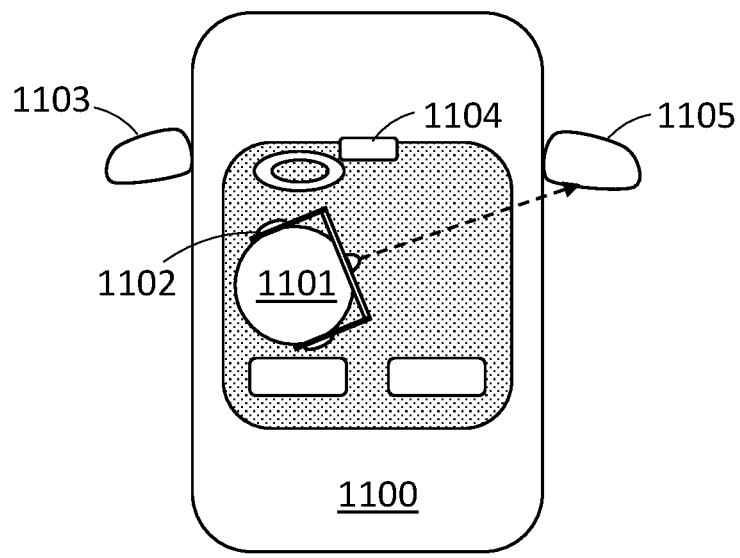
Figure 11E:
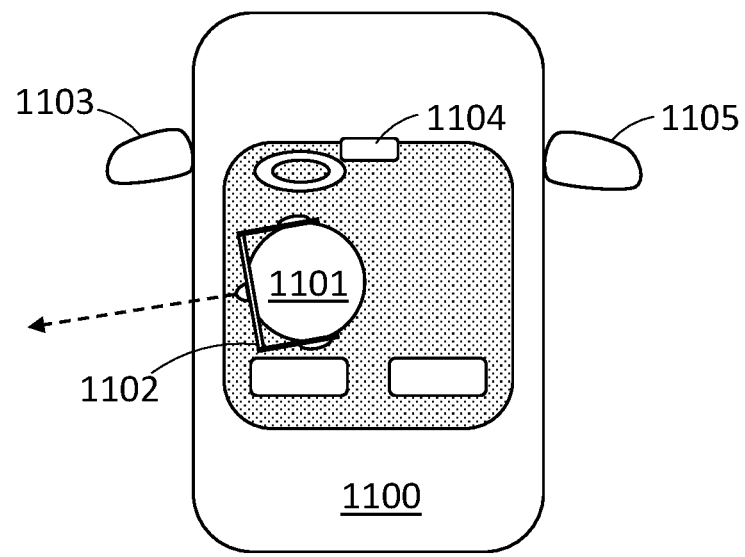
Figure 11F:
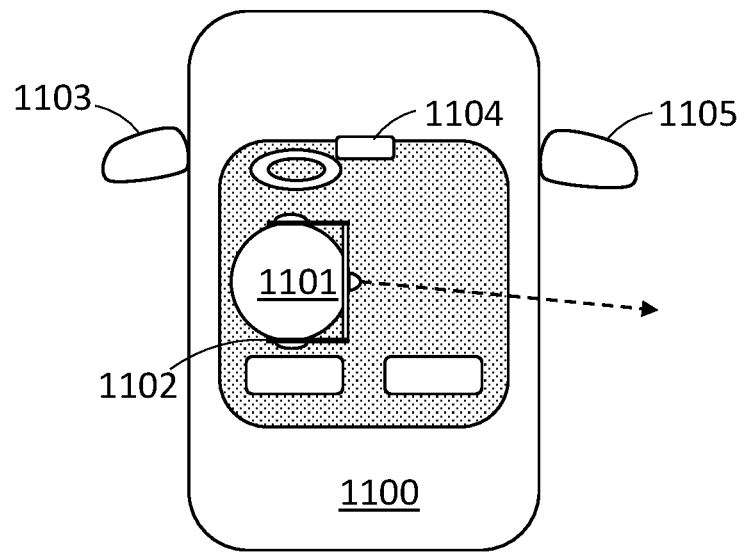

FIG. 11A shows a vehicle 1100 being operated by a user 1101, who is wearing WHUD system 1102 and is gazing out a front windshield of vehicle 1100. Most drivers will spend a majority of their time operating a vehicle in this position. FIGS. 11B, 11C, and 11D show the user 1101 gazing towards a left side-view mirror 1103, a rear-view mirror 1104, and a right side-view mirror 1105, respectively. An IMU of the WHUD system 1102 may capture user head motion data of user 1101, and at least one processor 120/141 of the WHUD system 1102 may identify when the user 1101 moves their head to gaze at one of mirrors 1103, 1104, or 1105. This identification can be based on predicted or predetermined positions of each mirror relative to the user's head, which can be determined based on any one or a combination of a height of user 1101, a make and model of a vehicle which the user 1101 owns or typically drives, preset generalizations about where vehicle mirrors are typically located, captured visual data from a camera on the WHUD system 1102 which includes a representation of at least one of the mirrors, or any other appropriate criteria. Further, FIG. 11E shows a case where user 1101 is looking back through a side window to check the left side of vehicle 1100, such as when a driver checks their blind spot before changing lanes. FIG. 11F similarly shows user 1101 looking through a side window to check a right side of vehicle 1100. The at least one processor 120/141 could determine that user 1101 is operating vehicle 1100 if the user gazes in any one of the directions shown in FIGS. 11B to 11F, but this may result in the at least one processor 120/141 incorrectly determining that the user is operating vehicle 1100 if the user 1101 happens to look in any one of the above directions while performing a different task. Thus, it may be more effective for the at least one processor 120/141 to analyze the user head motion data over time, and identify when a gaze direction pattern of the user 1101 correlates to a gaze direction pattern for a user operating a vehicle. As an example, the at least one processor 120/141 could tabulate each time user 1101 glances in any of the directions shown in FIGS. 11B to 11F, and determine that the user 1101 is operating vehicle 1100 if the frequency of these glances exceeds a threshold. As another example, the at least one processor 120/141 could identify that the user 1101 is looking straight ahead as shown in FIG. 11A a majority of the time, and makes frequent glances in the directions shown in FIGS. 11B-11F, before returning to gazing straight ahead. Such a pattern corresponds to movements made by many drivers when operating a vehicle, and thus could be used to determine that user 1101 is operating vehicle 1100.

Figure 12A:
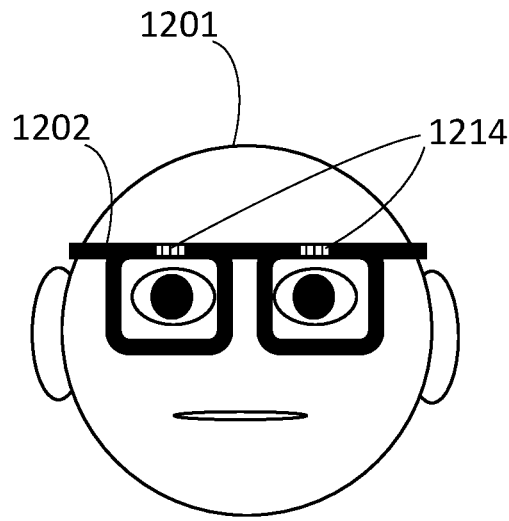
FIGS. 12A, 12B, 12C, and 12D illustrate exemplary scenarios in which user eye data can be used to determine whether a user is operating a vehicle based on user eye movement, according to at least four illustrated implementations.
Figure 12B:
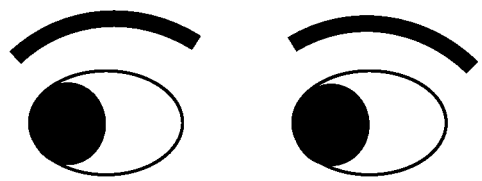
Figure 12C:
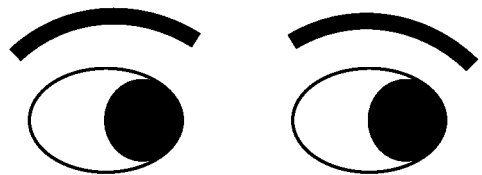
Figure 12D:
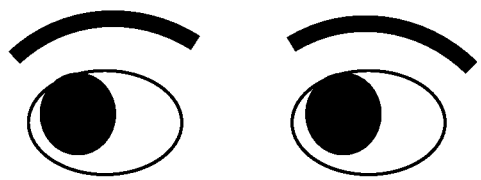

FIG. 12A shows a user 1201 wearing a WHUD system 1202 which has an eye-tracking system 1214 carried thereon. Exemplary configurations for eye-tracking can be found in for example U.S. Non-Provisional patent application Ser. No. 15/167,458, U.S. Non-Provisional patent application Ser. No. 15/827,667, and U.S. Provisional Patent Application Ser. No. 62/658,436. Eye-tracking system 1214 can capture user eye data of user 1201, and at least one processor 120/141 of WHUD system 1202 can analyze the captured user eye data to determine whether a user is operating a vehicle. In one implementation, a similar technique to that describe above with reference to FIGS. 11A to 11F can be utilized. Specifically, a user's gaze direction can be monitored, and the at least one processor 120/141 can determine that user 1201 is operating a vehicle by determining that user 1201 is gazing at a mirror or out a side window of a vehicle. FIGS. 12B, 12C, and 12D show examples of a user's eye gazing towards a right side-view mirror, a left side-view mirror, and a rear-view mirror, respectively. Similarly to as discussed above, determining that a user is operating a vehicle when a user gazes at a vehicle mirror a single time can be prone to incorrectly determining that user 1201 is operating a vehicle, and thus it can be preferable to monitor gaze direction of user 1201 over time to determine whether movement patterns of the eyes of user 1201 correlate to eye movement patterns which indicate that user 1201 is operating a vehicle. Similarly to as discussed above, in one example the at least one processor 120/141 could tabulate each time user 1201 glances towards any of the mirrors or side windows of a vehicle, and determine that the user 1201 is operating a vehicle if the frequency of these glances exceeds a threshold. Again similarly to as discussed above, in another example the at least one processor 120/141 could identify that the user 1201 is looking straight ahead a majority of the time, and makes frequent glances in the directions of a vehicle's mirrors or side windows, before returning to gazing straight ahead, which implies that user 1201 is operating a vehicle. In addition to the above, the at least one processor 120/141 could analyze the captured user eye data to determine a blink frequency of a user. A low blink frequency can indicate that user 1201 is focused, such as when operating a vehicle, which can be used to more accurately determine whether user 1201 is operating a vehicle.

In addition, eye tracking could be used to detect alertness and impairment of a user. For example, if a user closes their eyes abnormally frequently, and/or closes their eyes for excessively long periods, the at least one processor 120/141 could determine that the user is impaired. Impairment could include fatigue, sleepiness, drug use, or alcohol use, as examples.

Additionally, eye tracking could also be used to monitor a user's driving competence, to provide subsequent feedback to the user for improvement. As an example, eye tracking could be used to monitor whether a user regularly checks their mirrors, or could be used to monitor whether a user checks their blind spots before turning/lane changing. Feedback based on these metrics could be provided to the user to help them improve their driving.

The present systems, devices, and methods are not limited to application in motor vehicles, but can also be used with non-motorized vehicles, such as bicycles, unicycles, or any other non-motorized vehicle as appropriate. FIG. 13 illustrates an example in which the present systems, devices, and methods are utilized in the case of a bicycle 1300 being operated by a user 1301 wearing a WHUD system 1302. WHUD system 1302 can include any one or any combination of the sensors discussed above with regards to FIGS. 1A and 1B, though each sensor is not explicitly shown in FIG. 13 to avoid obscuring the other features shown therein. Further, WHUD system 1302 can include, or can be communicatively coupled to, additional devices such as wristband 1303 and chest strap 1304, which can include further sensors, as will be discussed in more detail below.

The techniques by which the present systems, devices, and methods determine whether a user is operating a vehicle can be broad enough to detect different properties associated with operating different vehicles. For example, operating a bicycle can be physically strenuous, resulting in heavy breathing and elevated heartrate for the operator. Wristband 1303 and/or chest strap 1304 could include at least one heart monitor which captures user heart data, which can be analyzed by at least one processor 120/141 of WHUD system 1302 to determine that the user 1301 has an elevated heart rate, and is thus undergoing physical exertion. Similarly, chest strap 1304 could include a breathing monitor which captures user breathing data, and/or a microphone in WHUD system 1302 could capture audio data which includes a representation of user breathing noise 1311. The at least one processor 120/141 of WHUD system 1302 could analyze this user breathing data and/or user breathing noise 1311 to determine that user 1301 is breathing hard, and is thus undergoing physical exertion. By determining that user 1301 is undergoing physical exertion, the at least one processor 120/141 of WHUD system 1302 may determine that user 1301 is operating a non-motorized vehicle, such as a bicycle.

FIG. 13 also shows air/wind 1320 which creates air resistance noise 1321 upon contacting user 1301 and WHUD system 1302. At least one microphone of WHUD system 1302 can capture air resistance noise 1321, and at least one processor 120/141 of WHUD system 1302 can analyze the captured air resistance noise. Compared to air resistance noise 321 shown in FIG. 3 with reference to an enclosed vehicle 300, air resistance noise 1321 shown in FIG. 13 will be louder, since air/wind 1320 will contact directly with WHUD system 1302 because bicycle 1300 does not enclose user 1301. Similarly, air resistance noise captured by a microphone of a WHUD system can be louder when a user is operating any open-air vehicle, such as a moped, scooter, motorcycle, convertible, or topless car. Thus, air resistance noise can be a particularly significant factor in the determination by the at least one processor 120/141 of whether a user is operating a vehicle if the vehicle is an open-air vehicle.

FIG. 13 also shows at least one wheel 1330 which creates wheel noise 1331, similar to wheel noise 331 shown in FIG. 3. On skilled in the art will appreciate that the discussions regarding at least one wheel 330 and wheel noise 331 above are also applicable to at least one wheel 1330 and wheel noise 1331 as shown in FIG. 13. Because bicycle and unicycle tires are often narrower than tires used for motorized vehicles, a frequency of noise 1331 from at least one wheel 1330 may be higher than a frequency of noise 331 from at least one wheel 330.

Figure 14A:
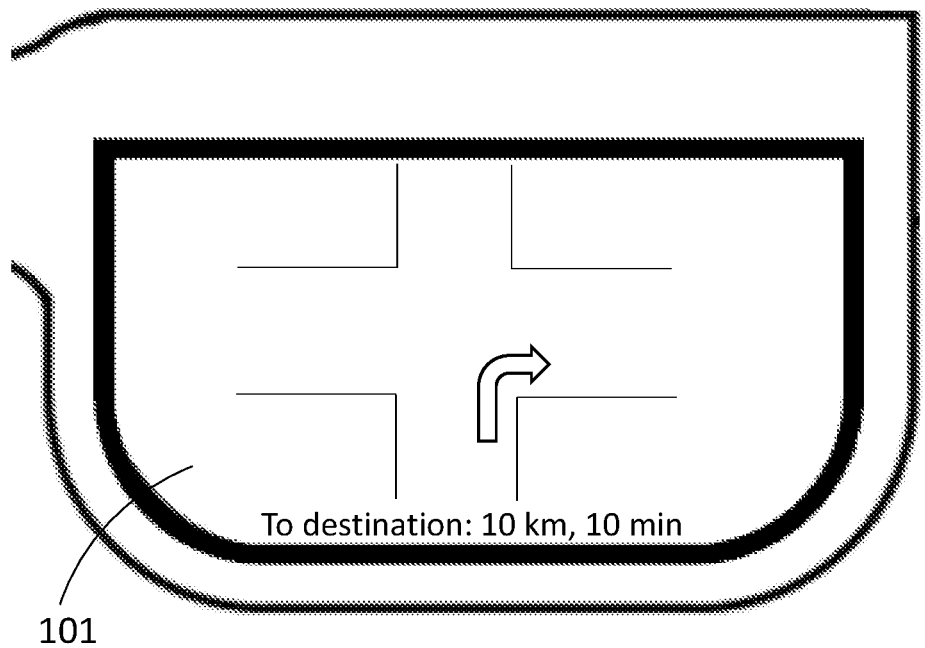
FIGS. 14A, 14B, and 14C illustrate exemplary user interfaces and software applications which can be relevant to operating a vehicle, according to at least three illustrated implementations.
Figure 14B:
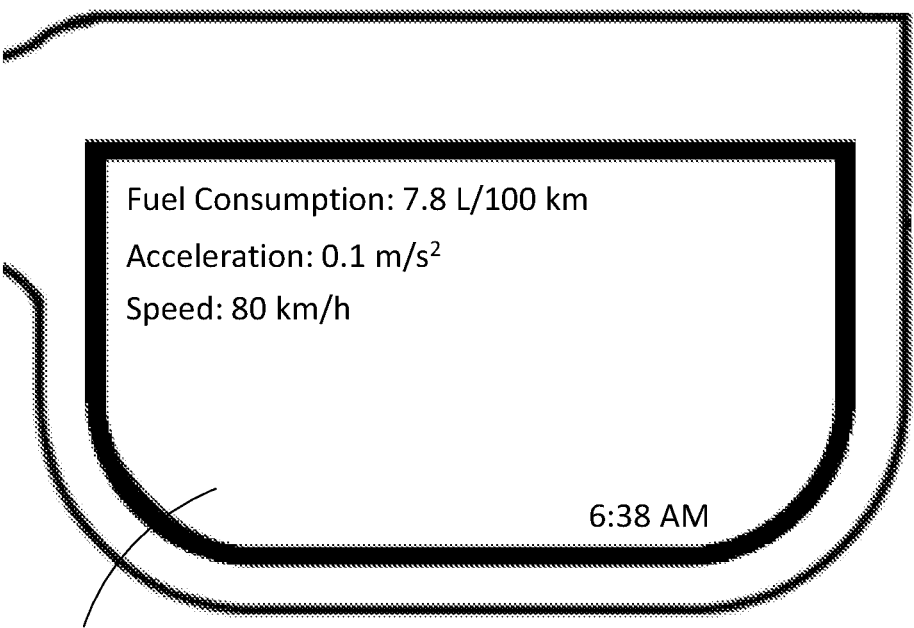
Figure 14C:
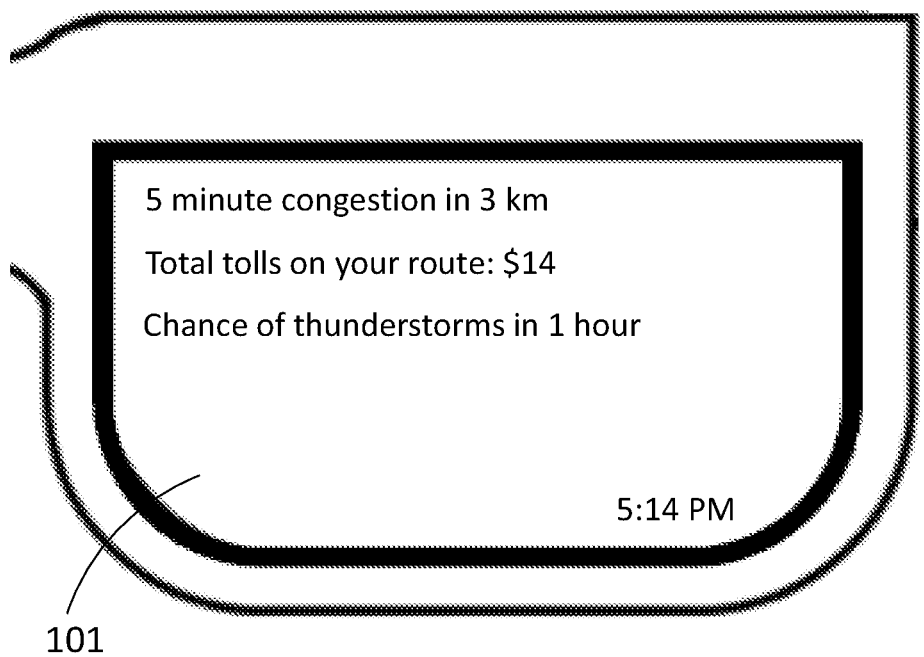

The present systems, devices, and methods may allow for at least one processor 120/141 to determine whether a user is operating a vehicle based on software applications currently being used or recently used by a user. In this regard, FIGS. 14A to 14C show exemplary user interfaces of potential vehicle-related software applications. FIG. 14A illustrates a display 1401 of a WHUD system showing a user interface for a mapping and directional guidance application, which could be used by a user to search for and/or received directional guidance from one place to another. At least one processor 120/141 of the WHUD system could determine that, since the user is currently receiving directional guidance and map information from the WHUD system, the user is currently operating a vehicle. Depending on the mapping and directional guidance application, there may even be different modes for walking, bicycling, driving, public transit, flying, or other appropriate modes of transportation, where the directional guidance provided differs depending on the selected mode of transportation. The at least one processor 120/141 may determine that the user is operating a vehicle only if the user is receiving directional guidance which is applicable to vehicle operation, such as driving or bicycling directional guidance. FIGS. 14B and 14C illustrate a display 1401 of a WHUD system showing user interfaces which present status information to a user, in this case fuel consumption, acceleration, speed, traffic, toll, time, and weather information. One skilled in the art will appreciate that the above listed status information is merely exemplary, and that a user interface could present any appropriate status information to a user. At least one processor 120/141 of the WHUD may determine that, if the user is using a software application which presents vehicle operation related information to a user, the user is operating a vehicle. Vehicle operation related information could include for example fuel consumption information, acceleration information, speed information, traffic information, toll information, or any other appropriate information related to operating a vehicle.

Additionally, at least one processor 120/141 of a WHUD system can not only determine if a user is operating a vehicle based on the software applications a user is currently using, as described above, but can also determine if a user is operating a vehicle based on a history of the user. For example, if the user uses a software application to check the current traffic between their home and their workplace, the at least one processor 120/141 may determine that shortly thereafter the user will be operating a vehicle. As another example, if a user sends a text message to their spouse which says "Driving home", the at least one processor may determine that shortly thereafter the user will be operating a vehicle. As another example, if a user searches for traffic information for a future time, the at least one processor 120/141 may determine that the user may be operating a vehicle during the future time. As another example, if a user consistently drives to work at a certain time of day, the at least one processor 120/141 may determine that the user will typically be operating a vehicle during at this time of day every weekday.

One skilled in the art will appreciate that although FIGS. 14A to 14C show visual user interfaces, the present systems, devices, and methods can include software applications which utilize other forms of user interfaces, such as audio interfaces like a speaker or speakers, for example.

The present systems, devices, and methods may allow for at least one processor to determine whether a user is operating a vehicle based on at least one processor 120/141 of a WHUD system determining that the WHUD system is in communication with at least one electronic device integrated with a vehicle. For example, a user may connect their WHUD system to a speaker system of a vehicle to listen to music while they drive. As another example, a user may connect their WHUD system to at least one processor included in a vehicle to provide map, location, and/or directional information to the vehicle. At least one processor 120/141 of the WHUD system may recognize that a connection such as those above is made, and consequently determine that the user is operating a vehicle. Such a connection could be a wired connection, or a wireless connection such as Bluetooth®, ZigBee®, WiFi®, or any other appropriate wireless connection.

Determination of whether a user is operating a vehicle is not limited to analyzing a single property of the user context data, nor limited to analyzing user context data from a single user context sensor. Rather, determining whether a user is operating a vehicle can involve the at least one processor analyzing a combination of any or all of the properties of the user context data, as well as a combination of user context data from any or all of the user context sensors. Several exemplary combinations are discussed below, but one skilled in the art will appreciate that these combinations are only exemplary, and that the present systems, devices, and methods encompass any combined analysis of the above described properties of the user context data, as well as any combination of user context data provided from any of the different types of user context sensors, as appropriate for a given application. For convenience, the terminology "properties" of the user context data as discussed herein should be interpreted broadly, to include not only properties of user context data from a single sensor (such as volume of captured audio data or frequency of captured audio data, for example), but also to include user context data from different user context sensors (such as user velocity in captured user motion data or vehicle features in captured visual data).

Figure 15A:
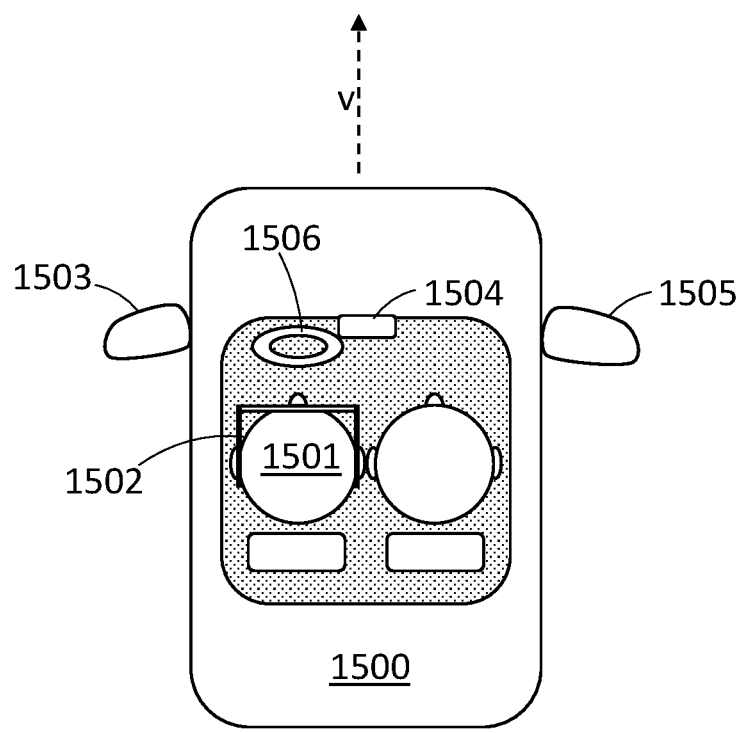
FIGS. 15A and 15B illustrate exemplary scenarios in which user context data from different sources can be used in combination to determine whether a user is operating a vehicle, according to at least two illustrated implementations.
Figure 15B:
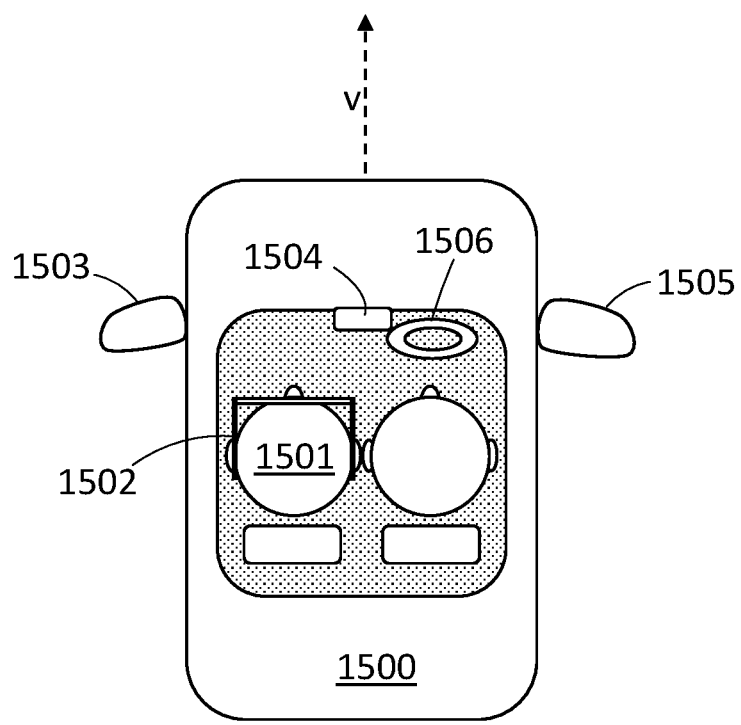

FIGS. 15A and 15B illustrate examples where user context data from multiple sensors may be used to determine whether a user is operating a vehicle. In these figures, vehicle 1500 carries a user 1501 who is wearing WHUD system 1502. At least one processor 120/141 of the WHUD system 1502 can determine a velocity v of user 1501 based on user motion data from the IMU and/or user position data from the location sensor. The at least one processor 120/141 may then determine that user 1501 is riding in a vehicle by determining that the velocity v of user 1501 exceeds a velocity threshold. However, just because a user is riding a vehicle does not necessarily mean that the user is operating the vehicle. For example a user may just be a passenger of a vehicle being operated by someone else. In view of this, the at least one processor 120/141 can use additional user context data to more accurately determine whether user 1501 is actually operating the vehicle. For example, the at least one processor may analyze captured visual data from a camera included in WHUD system 1502 in order to identify vehicle features which may indicate whether user 1501 is in an operator's position of the vehicle 1500. In the case of FIGS. 15A and 15B, the at least one processor 120/141 could analyze captured visual data to determine whether there is a steering wheel 1506 in front of user 1501, which would indicate that user 1501 is operating vehicle 1500. In FIG. 15A, there is a steering wheel 1506 in front of the user 1501, and the user is operating vehicle 1500. In FIG. 15B, there is no steering wheel 1506 in front of user 1501, and user 1501 is not operating vehicle 1500. However, in certain circumstances, it may not be possible for a camera to capture visual data which could include a steering wheel. Such a circumstance may arise if for example the camera is positioned on a top of the WHUD system 1502, such that a field of view of the camera is too high to capture steering wheel 1506. In such cases, the at least one processor 120/141 can analyze the captured visual data to identify other vehicle features, such as left side-view mirror 1503, rear-view mirror 1504, right side-view mirror 1505, or any other appropriate vehicle features. As an example, the at least one processor 120/141 could determine that any one or a combination of left side-view mirror 1503, rear-view mirror 1504, and right side-view mirror 1505 are angled towards the head of user 1501, indicating that user 1501 is operating vehicle 1500. As another example, the at least one processor 120/141 could determine based on the captured visual data where in the vehicle 1500 the user is positioned. The at least one processor 120/141 could also determine where the user is currently positioned in the world, and access a database which stores information indicating where an operator's position typically is for vehicles in the world region where the user is currently located. For example, the at least one processor 120/141 could determine that user 1501 is seated in a left side of vehicle 1500. The at least one processor 120/141 could also analyze user location data to determine whether the user is in a region where left-hand drive vehicles are typically used such as the United States or Canada (FIG. 15A), or the user is in a region where right-hand drive vehicles are typically used such as the United Kingdom or Japan (FIG. 15B). User location data could be received from a location sensor included in the WHUD system, or could be retrieved from a location or region setting stored on a processor-readable storage medium of the WHUD system.

The techniques discussed with regards to FIGS. 15A and 15B are not limited to applications in cars, but can also include any other appropriate vehicle. For example, if a user is riding a motorcycle, at least one processor 120/141 of a WHUD system may identify motorcycle features in captured visual data from a camera included in the WHUD system, such as handlebars for example. The at least one processor 120/141 may also identify whether there is another person in front of the user, and if not, determine that the user is at the front of the motorcycle, and is thus operating the motorcycle.

Figure 16:
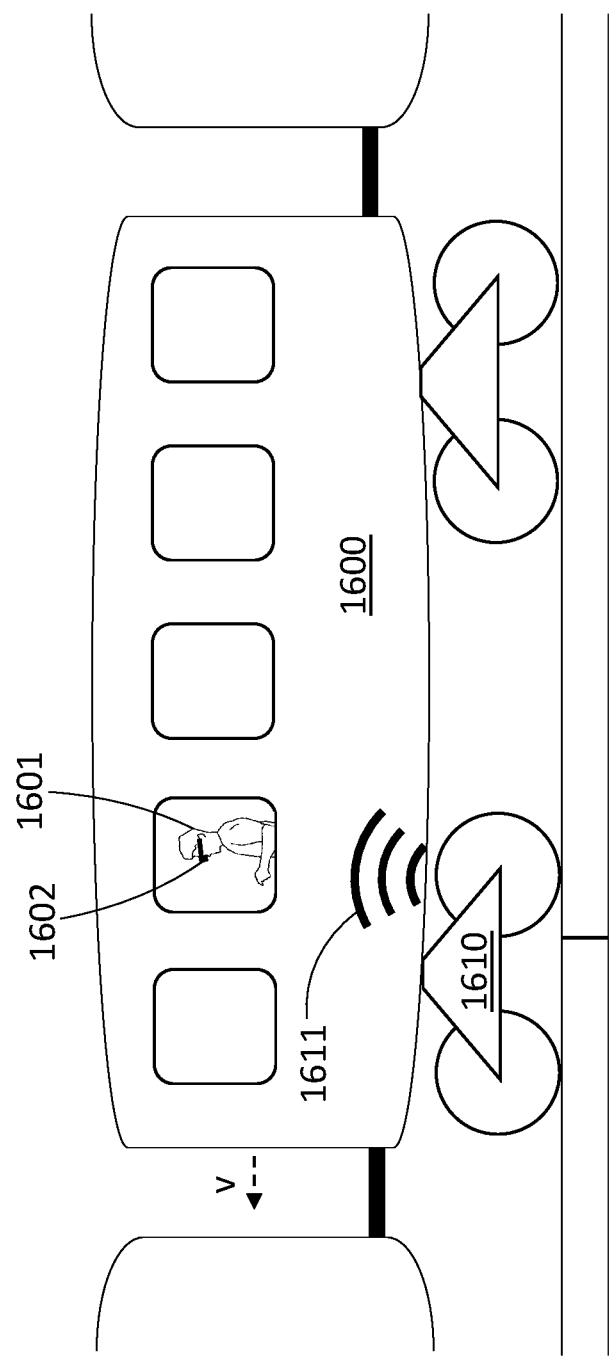
FIG. 16 illustrates an exemplary scenario in which user context data can be used to determine that a user is not operating a vehicle, according to at least one illustrated implementation.

FIG. 16 illustrates another example where user context data from multiple sensors may be used to determine whether a user is operating a vehicle. In this example, train 1600 carries a user 1601 who is wearing WHUD system 1602. WHUD system 1602 can include an IMU sensor and/or a location sensor, and at least one processor 120/141. The at least one processor 120/141 can determine that the user 1601 is riding a vehicle by determining that a velocity v of user 1601 exceeds a threshold based on user motion data from the IMU and/or user position data from the location sensor. WHUD system 1602 can further include a microphone, which captures audio data which includes train wheel noise 1611 generated by train wheel assembly 1610. The at least one processor 120/141 can analyze the captured audio data to determine that the user is riding a train by identifying audio patterns typically generated by a train. For example, trains typically create periodic, repetitive thumping patterns as the train's wheel go over joints in the train track. The at least one processor 120/141 could identify such a thumping pattern in the captured audio data, and determine that the user 1601 is riding a train. Subsequently, the at least one processor 120/141 could determine that user 1601 is not likely to be operating a vehicle, because trains typically carry a large number of passengers with a very small number of train operators.

In addition to the above examples, user context data from any combination of user context sensors can be analyzed by the at least one processor 120/141 to determine whether a user is operating a vehicle. Further, although FIGS. 1A and 1B show exemplary WHUD systems carrying user context sensors including all of microphone 111, camera 112, IMU 113, eye-tracking system 114, and location sensor 115, one skilled in the art will appreciate that this is merely to illustrate that each of these sensors can be implemented in a single WHUD system in combination, but that not each of these sensors is necessary to achieve the present systems, devices, and methods. For example, a WHUD system could carry the following sensors: only a microphone and a camera; only a microphone and an IMU; only a microphone and an eye-tracking system; only a microphone and a location sensor; only a camera and an IMU; only a camera and an eye-tracking system; only a camera and a location sensor; only an IMU and an eye-tracking system; only an IMU and a location sensor; only a microphone, a camera, and an IMU; only a microphone, a camera, and an eye-tracking system; only a microphone, a camera, and a location sensor; only a microphone, an IMU, and an eye-tracking system; only a microphone, an IMU, and a location sensor; only a microphone, an eye-tracking system, and a location sensor; only a camera, an IMU, and an eye-tracking system; only a camera, an IMU, and a location sensor only a camera, an eye-tracking system, and a location sensor; only an IMU, an eye-tracking system, and a location sensor; only a microphone, a camera, an IMU, and an eye-tracking system; only a microphone, a camera, an IMU, and a location sensor; only a microphone, a camera, an eye-tracking system, and a location sensor; only a microphone, an IMU, an eye-tracking system, and a location sensor; only a camera, an IMU, an eye-tracking system, and a location sensor; and each of a microphone, a camera, an IMU, an eye-tracking system, and a location sensor. Further, even if a WHUD system carries all of the above mentioned sensors, determination of whether a user is operating a vehicle could be limited to analysis by at least one processor of user context data from only a subset of the available user context sensors, such as the combinations listed above.

Several exemplary implementations of how to perform combined analysis using a plurality of different properties from at least one or a plurality of different user context sensors are discussed below.

In a first implementation, the combined analysis can be structured such that if any one individual property of the user context data provided by any one sensor indicates that the user may be operating a vehicle, the at least one processor determines that the user is operating a vehicle. For example, if at least one processor 120/141 of a WHUD system determines that a user velocity exceeds a threshold based on user motion data from an IMU or user location data from a location sensor, the at least one processor 120/141 could determine that the user is operating a vehicle, regardless of any other user context data received from any user context sensors in the WHUD. This implementation is advantageously very efficient, in that the at least one processor 120/141 needs to perform a minimal amount of work to determine whether a user is operating a vehicle. However, this implementation can be prone to false positives, in which the at least one processor 120/141 determines that the user is operating a vehicle even if they aren't, since the determination can be based on a single property of the user context data.

In a second implementation, the combined analysis can structured as a checklist, such that each property of a selected set of properties must indicate that a user is operating a vehicle in order for the at least one processor to conclusively determine that the user is operating a vehicle. For example, a WHUD system may include at least one processor 120/141, an IMU, a microphone, and a camera. The at least one processor may analyze captured user motion data from the IMU, captured audio data from the microphone, and captured visual data from the camera. In order for the at least one processor 120/141 to determine that the user is operating a vehicle, the at least one processor 120/141 may be required to determine that each of the following criteria are met: a user velocity exceeds a velocity threshold based on the user motion data; the captured audio data includes at least a representation of vehicle engine noise; and the captured video data includes a representation of at least one of a side-view mirror and a rear-view mirror. This implementation advantageously mitigates false positives, by requiring a number of criteria to be fulfilled before the at least one processor 120/141 will conclusively determine that the user is operating a vehicle. However, if too many properties are required to indicate that the user is operating a vehicle, this implementation may fail to identify many cases where a user is operating a vehicle.

In a third implementation, the combined analysis can structured such that a threshold number of properties of a selected set of properties must indicate that a user is operating a vehicle in order for the at least one processor to conclusively determine that the user is operating a vehicle. For example, a WHUD system may include at least one processor 120/141, an IMU, a microphone, a camera, and a user eye-tracking system. The at least one processor 120/141 may analyze captured user motion data from the IMU, captured audio data from the microphone, captured visual data from the camera, and captured user eye data from the user eye-tracking system. In order for the at least one processor 120/141 to determine that the user is operating a vehicle, the at least one processor 120/141 may be required to determine that at least two of the following criteria are met: a user velocity exceeds a velocity threshold based on the user motion data; the captured audio data includes at least a representation of air resistance noise; the captured video data includes a representation of a steering wheel in front of a user; and the captured used eye data includes a representation of a user eye movement pattern in which the user frequently glances towards predicted vehicle mirror positions. This implementation advantageously mitigates false positives, by requiring a number of criteria to be fulfilled before the at least one processor 120/141 will conclusively determine that the user is operating a vehicle, while also allowing some flexibility but not requiring that each and every property indicate that a user is operating a vehicle. One skilled in the art will appreciate that the threshold number of properties could be set at any value, and the exemplary value of two is merely for illustrative purposes. For example, if ten different properties were being analyzed by the at least one processor 120/141, the threshold could be set at any number between 1 and 10.

In a fourth implementation, confidence scoring can be used to weight each property of a selected set of properties, to determine a level of confidence that a user is operating a vehicle. Specifically, at least one processor 120/141 of a WHUD system may calculate a confidence score, which is increased for each analyzed property that indicates a user may be operating a vehicle. The at least one processor 120/141 may also lower the confidence score for each analyzed property which indicates that the user may not be operating a vehicle. The at least one processor may not adjust the confidence score for each analyzed property which does not indicate either that the user is operating a vehicle or is not operating a vehicle. Further, increases and decreases to the confidence score do not necessarily need to be balanced between different properties. Instead, the at least one processor may weight certain properties higher than others, such that an adjustment to the confidence score based on a first property can be of greater magnitude than an adjustment to the confidence score based on a second property different from the first property. As an example, the at least one processor could assign a high weight to properties which indicate that a steering wheel is positioned in front of a user, and could assign a lower weight to properties which indicate that the user is not gazing towards predicted vehicle mirror positions, such that the magnitude of adjustment to the confidence score based on the properties which indicate that a steering wheel is positioned in front of a user will be higher than the magnitude of adjustment to the confidence score based on the properties which indicate that the user is not gazing towards predicted vehicle mirror positions. As a result, if the at least one processor 120/141 were to determine that a steering wheel is positioned in front of the user, but the user does not gaze towards predicted vehicle mirror positions, the at least one processor 120/141 may still increase the confidence score that the user is operating a vehicle, since the properties indicating a steering wheel is positioned in front of the user are weighted higher than the properties which indicate that the user is not gazing towards predicted vehicle mirror positions. Further still, adjustments to the confidence score can be roughly weighted, or can be weighted based on a gradient. In implementations where rough weighting is used, the at least one processor 120/141 can make a simple determination for each property of whether the property indicates that the user is operating a vehicle, indicates that the user is not operating a vehicle, or indicates neither. Based on this determination, the at least one processor 120/141 can either increase the confidence score by a set amount if the property indicates that the user is operating a vehicle, decrease the confidence score by a set amount if the property indicates that the user is not operating a vehicle, or leave the confidence score unchanged if the property indicates neither. Alternatively, in implementations where a gradient is used, the at least one processor 120/141 can make a determination of how strongly a given property implies that a user is operating a vehicle. For example, instead of applying a static velocity threshold, the at least one processor 120/141 could determine that a higher user velocity more strongly indicates that the user may be operating a vehicle compared to a low user velocity, and thus an increase to a confidence score that the user is operating a vehicle will be proportional to a user velocity. For example, a user velocity of 100 km/h may significantly increase a confidence score that the user is operating a vehicle, whereas a user velocity of 10 km/h may only slightly increase the confidence score that the user is operating a vehicle. Further, the at least one processor 120/141 can also decrease the confidence score using a gradient, by determining how strongly a given property implies that a user is not operating a vehicle. For example, the at least one processor 120/141 could determine that if a user velocity is too low, a confidence score that the user is operating a vehicle can be decreased, and the amount of this decrease can be proportional to how low the confidence score is. For example, if a user velocity is 1 km/h, the at least one processor 120/141 may significantly decrease a confidence scored that the user is operating a vehicle, whereas if the user velocity is 3 km/h, the at least one processor 120/141 may only slightly decrease the confidence score that the user is operating a vehicle. Using rough weighting wherein a given property is determined as increasing the confidence score, decreasing the confidence score, or not changing the confidence score, and adjusting the confidence score by a set value accordingly, is simple and requires less processing power. On the other hand, weighting the confidence score using gradients is more processor intensive, but will also provide more accurate determinations.

Ideally, all of the user context sensors of a WHUD system can capture user context data continuously and provide this continuous user context data to at least one processor, such that the at least one processor can make the most informed determinations possible. However, on many devices, this will not be practical, because continuously capturing and analyzing the user context data will consume battery life very quickly, thus reducing operational time of the device as well as potentially causing the device to become hot and uncomfortable for the user. To address this issue, it would be helpful to have user context sensors of a WHUD system selectively active at appropriate times, to minimize operation time, thus reducing power consumption.

One implementation could be to have one, all, or a set of the user context sensors activate and capture data at periodic intervals as intermittent user context data samples. For example, every 1 minute, any one or a combination of a microphone, camera, IMU, eye-tracking system, and location sensor included in a WHUD system can activate and capture 1 second of data. At least one processor 120/141 of the WHUD system can analyze this 1 second of data from each user context sensor to determine whether a user is operating a vehicle. Further, each sensor does not necessarily need to capture the same amount of data. For example, the microphone could capture 2 seconds of audio data, the camera could capture a single instant of visual data as a still image, the IMU could capture 5 seconds of user motion data, the eye-tracking system could capture 3 seconds of user eye data, and the location sensor could capture 10 seconds of user location data. The above described periodic interval and amounts of captured data are merely exemplary, and any length of periodic interval or amount of data could be captured as is appropriate for a given application. In general, the exact periodic interval and amount of data to capture should strike a balance between optimizing accuracy of the at least one processor determining whether the at least one user is operating a vehicle, and obtaining a desirable operational battery life of the WHUD system.

Alternatively or additionally, one low power user context sensor could continuously capture user context data, and could activate at least one other user context sensor in response to capturing user context data which may indicate that a user is operating a vehicle. For example, an IMU of a WHUD system could continuously capture user motion data, and at least one processor 120/141 of the WHUD system could determine based on the captured user motion data that if a user velocity and/or user acceleration exceeds a threshold, at least one other user context sensor in the WHUD system should be activated to capture additional user context data similarly to as described above. The at least one processor 120/141 can then analyze the additional user context data to increase accuracy of a determination of whether the user is operating a vehicle.

Alternatively or additionally, one, all, or a set of the user context sensors can activate and capture user context data in response to the at least one processor receiving user input. Activation of user context sensors and collection data could be similar as described above.

Figure 17A:
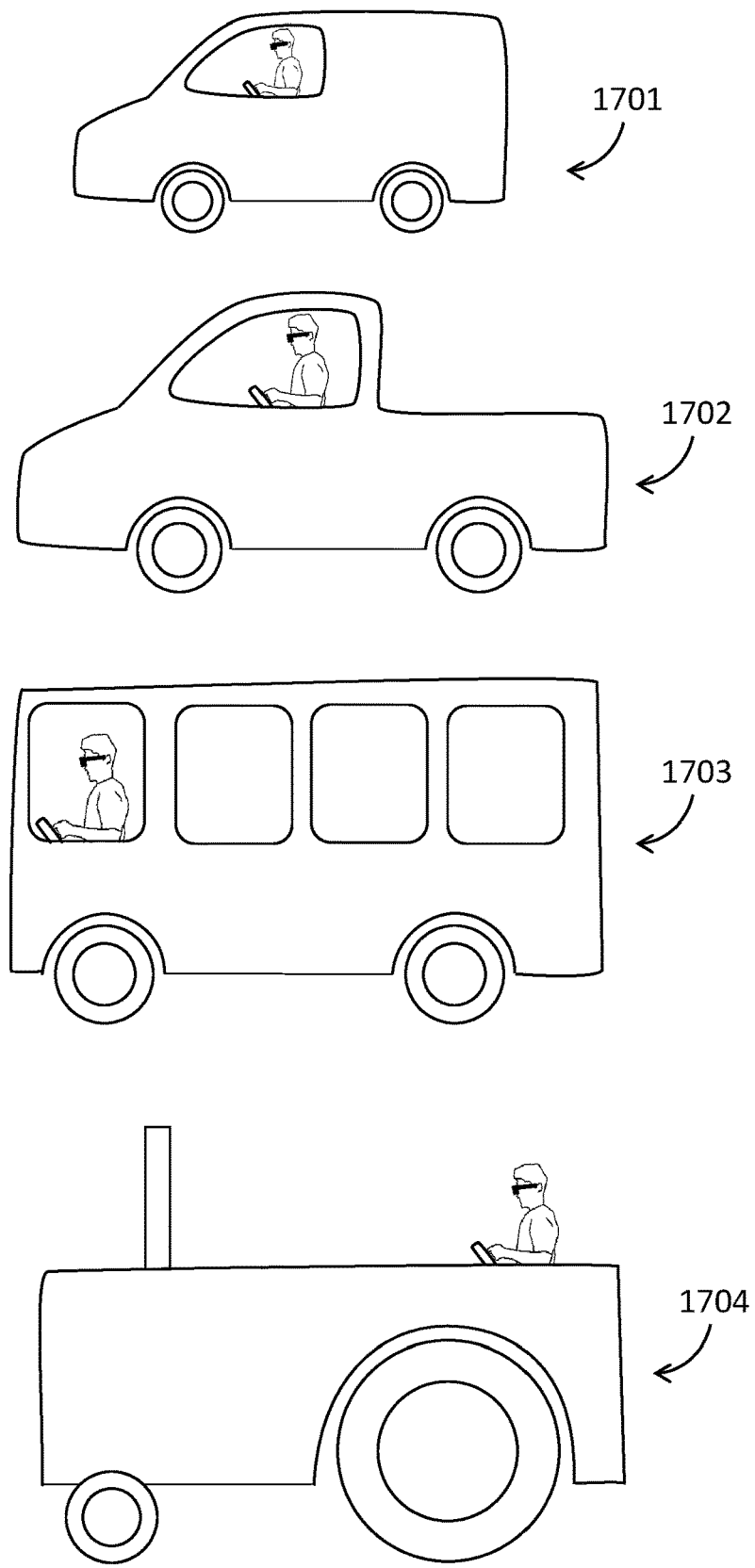
Figure 17C:
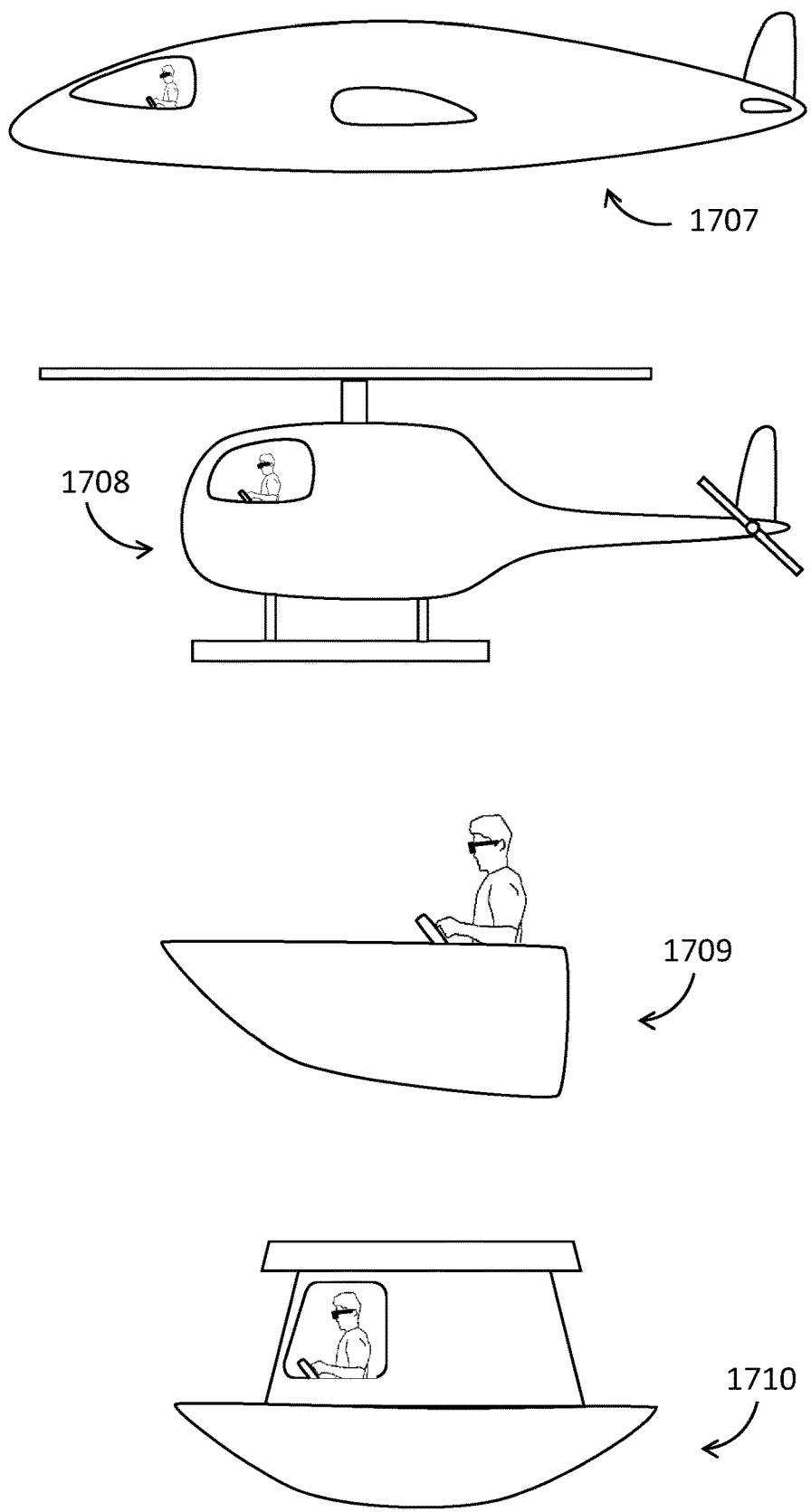

The above discussion describes and illustrates several exemplary vehicles which a user can be operating/riding in the context of the present systems, devices, and methods. However, the present systems, devices, and methods can be utilized to determine whether a user is operating any type of vehicle. The above discussion illustrates cars, motorcycles, and trains as examples. In addition to these examples, FIGS. 17A-17C illustrate several more exemplary vehicles for which the present systems, methods, and devices can be employed. FIGS. 17A and 17B show other land-based vehicles including a van 1701, a truck 1702, a bus 1703, a tractor 1704, a moped/scooter 1705, and a unicycle 1706. Further, the present systems, devices, and methods can also be employed in non-land-based vehicles such as those shown in FIG. 17C, which includes an airplane 1707, a helicopter 1708, a boat 1709, and a ship 1710. The subject systems, devices, and methods can be utilized for any given vehicle or vessel.

The subject systems, devices, and methods can be optimized or broadened for use with different vehicle types. Analysis of any of the user context data from any user context sensor can be optimized or broadened to include analysis pertaining to at least one different vehicle type.

For example, compared to the vehicles shown in FIGS. 3 and 13, different vehicles may have different associated engine noise, air resistance noise, wheel noise, and environmental noise, or may lack any of these noises altogether.

For example, a car engine, a tractor engine, an airplane engine, a boat engine, or an engine from any other vehicle type may produce drastically different noise. Similarly, water-based or air-based vehicles may produce no wheel noise, but may produce different air resistance noise compared to land-based vehicles. Additionally, water-based vehicles may produce water resistance noise not produced by air-based or land-based vehicles. Further, land-based, water-based, and air-based vehicles can be operated in different environments which can have drastically different environmental noise. Consequently, determination of whether a user is operating a vehicle based on captured audio data from a microphone of a WHUD system could be optimized or broadened to include noise analysis of different vehicle types.

As another example, compared to the vehicles shown in FIGS. 7 and 8, different vehicles may have different interior features, or even different exterior features if the vehicle is generally operated in a different environment. Consequently, determination of whether a user is operating a vehicle based on captured visual data from a camera of a WHUD system could be optimized or broadened to include analysis of features associated with different vehicle types. For example, van 1701, truck 1702, bus 1703, and tractor 1704 may have different positions for, or lack entirely, vehicle features like a steering wheel, at least one information indicator, a rear-view mirror, a side-view mirror, a display screen, controls, an air vent, a sun visor, a dashboard, a frame-pillar, a roof, or any other vehicle feature. As another example, moped/scooter 1705 may have different positions for, or lack entirely, some or all of the features illustrated in FIG. 8 such as handlebars, at least one information indicator, at least one side-view mirror, controls, a headlight, a windscreen, or any other vehicle feature as appropriate. As another example, some vehicles may have completely different vehicle control schemes, vehicle interior features, and even vehicle exterior features. For example, a vehicle like a unicycle may have no features visible to a camera of a WHUD system, and therefore at least one processor may be required to rely on user context data other than vehicle interior features to determine if a user is operating a unicycle. As another example, airplane 1707 or helicopter 1708 may have a single joystick or multiple joysticks instead of a steering wheel, and may have significantly different positions for, or lack entirely, many other features including controls and mirrors. Boat 1709 and ship 1710 may similarly have completely different features to the vehicles discussed above. Determination of a whether a user is operating a vehicle could be optimized for or broadened to include analysis of different vehicle features associated with different vehicle types.

As another example, user motion data and user location data, including user acceleration data, user velocity data, user inertial data, and user position data captured by an IMU and/or a location sensor in a WHUD system could be different depending on the type of vehicle a user is riding/operating. For example, tractor 1704 may travel significantly slower than a car. As another example, airplane 1707 and helicopter 1708 can have significantly more variation in vertical motion compared to land-based vehicles. Determination of whether a user is operating a vehicle could be optimized or broadened to include these different user motion patterns.

As another example, user eye data captured by an eye tracking system in a WHUD system could be different depending on the type of vehicle a user is riding/operating. For example, in airplane 1707, a user may generally gaze forward, and frequently check information indicators in the airplane 1707, different from the mirror and window directions illustrated in FIGS. 11A-11F. Determination of whether a user is operating a vehicle could be optimized or broadened to include recognition of different gaze patterns.

Restricting User Interface Presentation

With reference to the method of FIG. 2, determining whether a user is operating a vehicle, as in act 202, determines whether a WHUD system will present a user interface to a user without restriction as in act 203, or restrict presentation of at least one user interface to the user as in act 204. Restricting presentation of at least one user interface to the user can involve restricting system-initiated interactions, such as silencing notifications which would otherwise be presented to the user. Restricting presentation of at least one user interface to the user can also involve restricting user-initiated interactions, such as blocking user interaction with the WHUD system. Examples of how presentation of at least one user interface is restricted are discussed below with reference to FIGS. 18 and 19.

Figure 18:
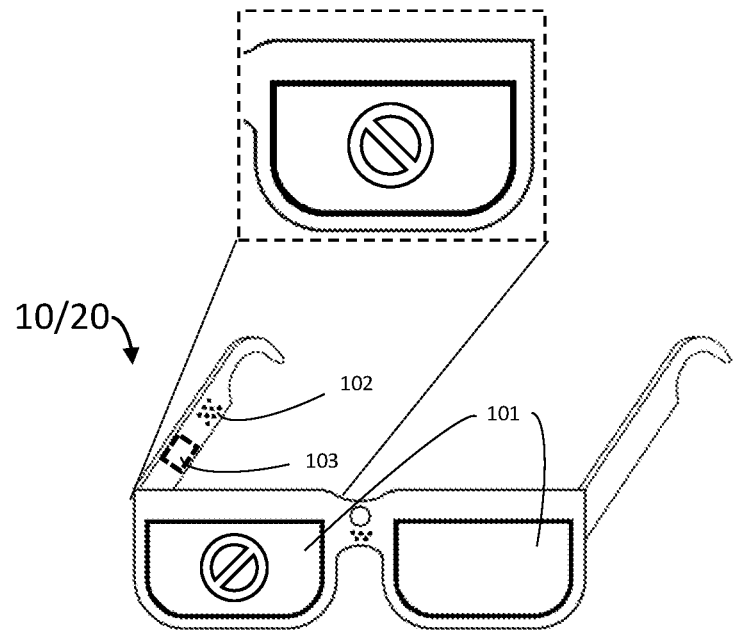
FIG. 18 illustrates an exemplary implementation in which presentation of at least one user interface can be restricted by disabling presentation of the at least one user interface.

FIG. 18 illustrates an exemplary WHUD system 10/20 where restricting presentation of at least one user interface comprises completely disabling presentation of the at least one user interface from any output device of WHUD system 10/20, including at least one user interface from display 101, speaker 102, and haptic output interface 103. For example, all user interfaces to be presented on each output device of WHUD system 10/20 could be completely disabled, such that no output device provides any output to the user. Completely disabling presentation of user interfaces is advantageously very safe, in that a user is completely prevented from being distracted by anything that would otherwise be presented by a WHUD system. Alternatively, presentation of most user interfaces can be completely disabled, except for a restricted replacement user interface. The restricted replacement user interface could include an icon, image, text, symbol or other indication presented on display 101 to inform the user that they cannot interact with WHUD system 10/20, such as an image of a car to inform the user that the WHUD system has determined that the user is operating a vehicle. The restricted replacement interface could be presented continuously, periodically, and/or in response to user input. Advantageously, presenting a restricted replacement user interface can remind the user that their focus should be directed towards driving, and can also prevent user frustration, by making the user aware that the WHUD system 10/20 cannot be used at the present time. If no replacement user interface is presented, it is possible that a user may think that the WHUD system 10/20 is malfunctioning, and may become frustrated and focus more on trying to interact with WHUD system 10/20.

Figure 19:
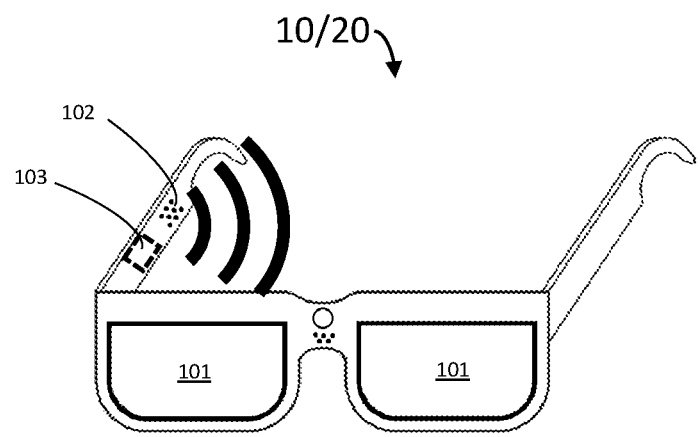
FIG. 19 illustrates an exemplary implementation in which presentation of at least one user interface can be restricted by disabling presentation of visual user interfaces via a display.

FIG. 19 illustrates an exemplary WHUD system 10/20 where restricting presentation of at least one user interface comprises disabling at least one user interface from being presented by at least one, but not all, of the output devices available on WHUD system 10/20. In the example of FIG. 19, user interfaces that would be presented on display 101 can be completely disabled, but user interfaces presented by speaker 102 and/or haptic output 103 can remain enabled. Further, user interfaces which would be presented by display 101 could be converted to be presented by speaker 102 and/or haptic output 103. For example, if a user receives a new message, instead of displaying the message on display 101, WHUD system 10/20 could read the message to the user via speaker 102. Alternatively, WHUD system 10/20 could output a pattern of vibrations to the user via haptic output interface 103 to inform the user that they have received a message.

Restricting presentation of at least one user interface may also comprise restricting presentation of user interfaces to only include presentation of user interfaces which assist the user in operating the vehicle. This could include for example restricting presentable user interfaces on a per-software application basis, such that only user interfaces from a defined subset of software applications approved for use by a user while operating a vehicle can be presented, and user interfaces from software applications which are not included in in the defined subset of software applications are disabled from being presented. As another example, user interfaces could be restricted on a per-interface basis, where only certain user interfaces which are related to providing vehicle operation assistance information can be presented, and user-interfaces which are not focused on providing vehicle operation assistance information are disabled from being presented. FIGS. 14A to 14C illustrate several exemplary interfaces and software applications which could be presented even while a user is operating a vehicle in the above examples. Particularly, FIGS. 14A to 14C illustrate a display 101 presenting a map, directional guidance, fuel consumption information, acceleration information, speed information, time information, traffic information, toll information, and weather information. Software applications not related to presenting such vehicle operation assistance information, and/or individual user interfaces not related to presenting vehicle operation assistance information could be disabled from presentation to a user while the user is operating a vehicle. One skilled in the art will appreciate that the presented information types shown in FIGS. 14A to 14C are exemplary, and any other information which assists a user in operating a vehicle can be presented as appropriate for a given application. Providing information which assists a user in operating a vehicle can increase safety. For example, by providing directional guidance to a user, the user will be more aware of their route, and consequently can avoid sudden trajectory changes which can lead to collisions. Additionally, providing fuel consumption information, acceleration information, speed information, traffic information, toll information, weather information, and time information can prevent the user from having to look elsewhere for this information, such as on the dashboard or display screen mounted in the car, and thus the user's eyes can remain directed towards the road.

Figure 20A:
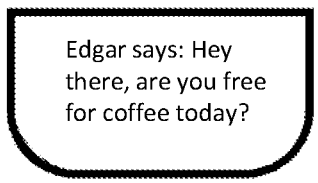
FIGS. 20A, 20B, 20C, 20D, 20E, 20F, 20G, 20H, and 20I illustrate exemplary implementations in which presentation of at least one visual user interface can be restricted by reducing and/or moving display area of the at least one user interface, according to at least five illustrated implementations.
Figure 20B:
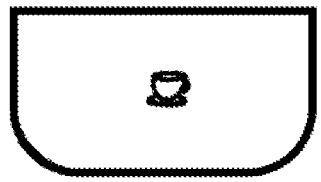
Figure 20C:
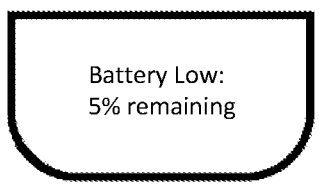
Figure 20D:
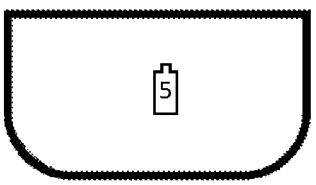

Restricting presentation of at least one user interface may also comprise modifying presentation of at least one user interface, to present the at least one user interface in a way that the at least one user interface will be less distracting to the user. FIGS. 20A-20I illustrate several examples in this regard. FIGS. 20A-20D illustrate implementations in which a visual user interface is presented to a user via a display 101. FIG. 20A illustrates an example of presentation of a user interface without restriction: a text message is received, and display 101 presents the sender and the full text content of the message to a user of WHUD system 10/20. The presented user interface in FIG. 20A is large and intrusive, and may block at least a portion of the user's vision while they are operating a vehicle. FIG. 20B illustrates the same situation, but with content of the notification presented in a restricted user interface. In the case of FIG. 20B, the at least one processor 120/141 generates a convenient visual summary representative of the content of the message, but smaller in display size and easier for the user to quickly interpret, and display 101 displays the visual summary. Thus, the user interface of FIG. 20B will be less intrusive to the user. Similar to FIG. 20A, FIG. 20C also illustrates an example of presentation of a user interface without restriction: the at least one processor 120/141 identifies that a notification should be presented warning the user that the battery of WHUD system 10/20 is low, and display 101 presents a large and intrusive full text warning to the user. FIG. 20D illustrates the same situation, but with the content of the warning notification presented in a restricted user interface. In the case of FIG. 20D, the at least one processor 120/141 generates a convenient visual summary representative of the content of the battery level warning notification, but smaller in display size and easier for the user to quickly interpret, and display 101 displays the visual summary. Exemplary systems, devices, and methods for generating visual summaries of notifications are described in at least U.S. Provisional Patent Application No. 62/577,081. Essentially, the examples of FIGS. 20A and 20C show cases where a user interface is presented to a user by display 101 in an unrestricted format when the at least one processor 120/141 determines that the user is not operating a vehicle, and the examples of FIGS. 20B and 20D show cases where a user interface is presented to a user by display 101 according to a restricted format different from the unrestricted format (i.e., a visual summary) when the at least one processor 120/141 determines that the user is operating a vehicle.

Figure 20E:
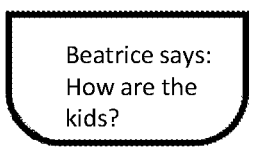
Figure 20F:
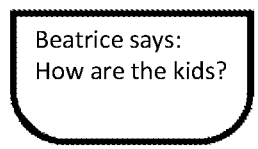
Figure 20G:
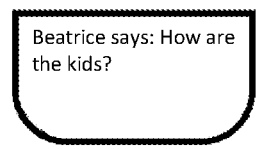
Figure 20H:
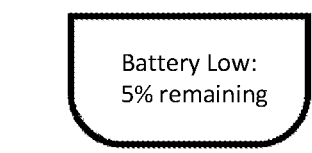
Figure 20I:

FIGS. 20E-20I show implementations of the present systems, devices, and methods for reducing distraction caused by visual presentation of at least one user interface. FIG. 20E shows a presentation of at least one user interface according to an unrestricted format. In FIG. 20E, the at least one user interface is presenting in a somewhat obtrusive manner: large and in the middle of the display. FIG. 20F shows an exemplary user interface as presented according to a restricted format. In FIG. 20F, the at least one user interface is presented at the top of the display, in order to be less obtrusive to the user. FIG. 20G further expands on this concept, by also reducing the display size of the at least one user interface. FIG. 20H shows another exemplary user interface presented according to an unrestricted format, wherein the user interface is presented in the middle of the display with a large display size. FIG. 20I shows an exemplary restricted presentation format different from the unrestricted presentation format of FIG. 20H, wherein the user interface is not only moved to a different position on the display, but the content of the user interface is also summarized into a convenient visual summary, similar to as discussed above with regards to FIGS. 20A-20D.

Advantageously, by moving the displayed user interface to a different portion of the display, shrinking the display size of the user interface, and/or generating a visual summary of content of the user interface allows user interfaces to be presented in a less obtrusive manner, thereby causing less distraction to the user when the user is operating a vehicle. Further, although FIGS. 20F, 20G, and 20I illustrate that user interface can be displayed at the top and bottom-right of the display, one skilled in the art will appreciate that that the user interface can be displayed at any region of the display, as appropriate for a given application, on a given set of hardware, for a given user. The specific location at which a user interface is presented could even be determined by a user setting, if appropriate.

Figure 21A:
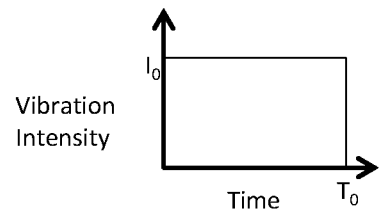
FIGS. 21A, 21B, 21C, 21D, and 21E illustrate exemplary implementations in which presentation of at least one vibratory user interface can be restricted by reducing vibration intensity or duration, and/or by modifying vibration pattern or frequency, according to at least four illustrated implementations.
Figure 21B:
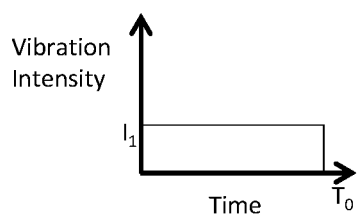
Figure 21C:
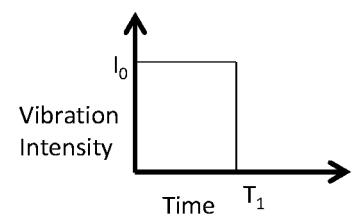
Figure 21D:
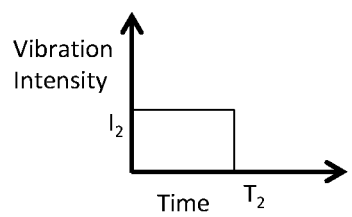
Figure 21E:
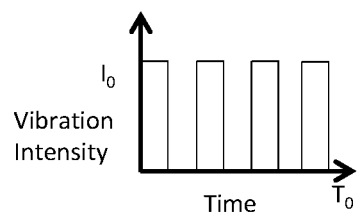

FIGS. 21A-21E illustrate implementations in which at least one user interface is to be presented according to a vibratory presentation format. In these examples, a user interface is presented to a user of WHUD system 10/20 by speaker 102, haptic output interface 103, or any other vibratory output interface. The term vibratory output interface used herein encompasses at least one or both of speaker 102 and haptic output interface 103. In FIG. 21A, at least one user interface is presented by one of the vibratory output interfaces according to an unrestricted presentation format as in act 203 of method 200 in FIG. 2, the unrestricted presentation format being a vibration having a vibration intensity $I_0$ and a duration $T_0$. In the present systems, devices, and methods, "vibration intensity" refers to the amount of force or strength involved in a vibration. A higher vibration intensity means that a vibration will be stronger or more aggressive, and thus be felt or heard more strongly by a user. Conversely, a lower vibration intensity means that a vibration will be weaker and less aggressive, and thus will be heard or felt less strongly by a user. FIGS. 21B-21E illustrate examples of a restricted presentation format different from the unrestricted presentation format, as in act 204 of method 200 in FIG. 2. In each of FIGS. 21B-21E, the restricted presentation format is an alternate vibratory representation having a shorter duration than the unrestricted presentation format, having a vibration intensity less than the unrestricted presentation format, or having a vibration pattern different from the unrestricted presentation format. FIG. 21B illustrates an alternate vibratory representation having a vibration intensity $I_1$ which is less than vibration intensity $I_0$ of the unrestricted presentation format, and having a vibration duration $T_0$ which is the same as the vibratory duration $T_0$ of the unrestricted presentation format. FIG. 21C illustrates an alternate vibratory representation having a vibration intensity $I_0$ which is the same as the vibration intensity $I_0$ of the unrestricted presentation format, and having a vibration duration $T_1$ which is shorter than the vibration duration $T_0$ of the unrestricted presentation format. FIG. 21D illustrates an alternate vibratory representation having a vibration intensity $I_1$ which is less than vibration intensity $I_0$ of the unrestricted presentation format, and having a vibration duration $T_1$ which is shorter than the vibration duration $T_0$ of the unrestricted presentation format. FIG. 21E illustrates an alternate vibratory representation having a pattern which is a series of pulsed vibrations, as opposed to the continuous vibration of FIG. 21A. Additionally, if the unrestricted presentation format is a haptic presentation format, the alternate vibratory representation can be an audio sound. Conversely, if the unrestricted presentation format is an audio presentation format, the alternate vibratory representation can be haptic. Further still, if the unrestricted presentation format is an audio jingle, the alternate vibratory representation can be an alternative jingle. Additionally, the alternate vibratory representation can be a different frequency from the unrestricted presentation format. By altering the intensity, duration, pattern, and/or frequency of a vibratory output interface, a user interface can be presented in a less intrusive and less distracting manner to the user, while still presenting a user interface to the user.

One skilled in the art will appreciate that although restricting presentation of at least one user interface to the user as described above could comprise completely disabling all functionality of a WHUD system 10/20, this is not necessarily the case. Rather, even if presentation of at least one user interface to the user is restricted, WHUD system 10/20 may still continue performing background tasks that do not require interacting from the user. For example, WHUD system 10/20 could perform software updates while the user is operating a vehicle. As another example, WHUD system 10/20 could continue to capture and analyze user context data to determine whether the user is still operating a vehicle at a later time.

Figure 22:
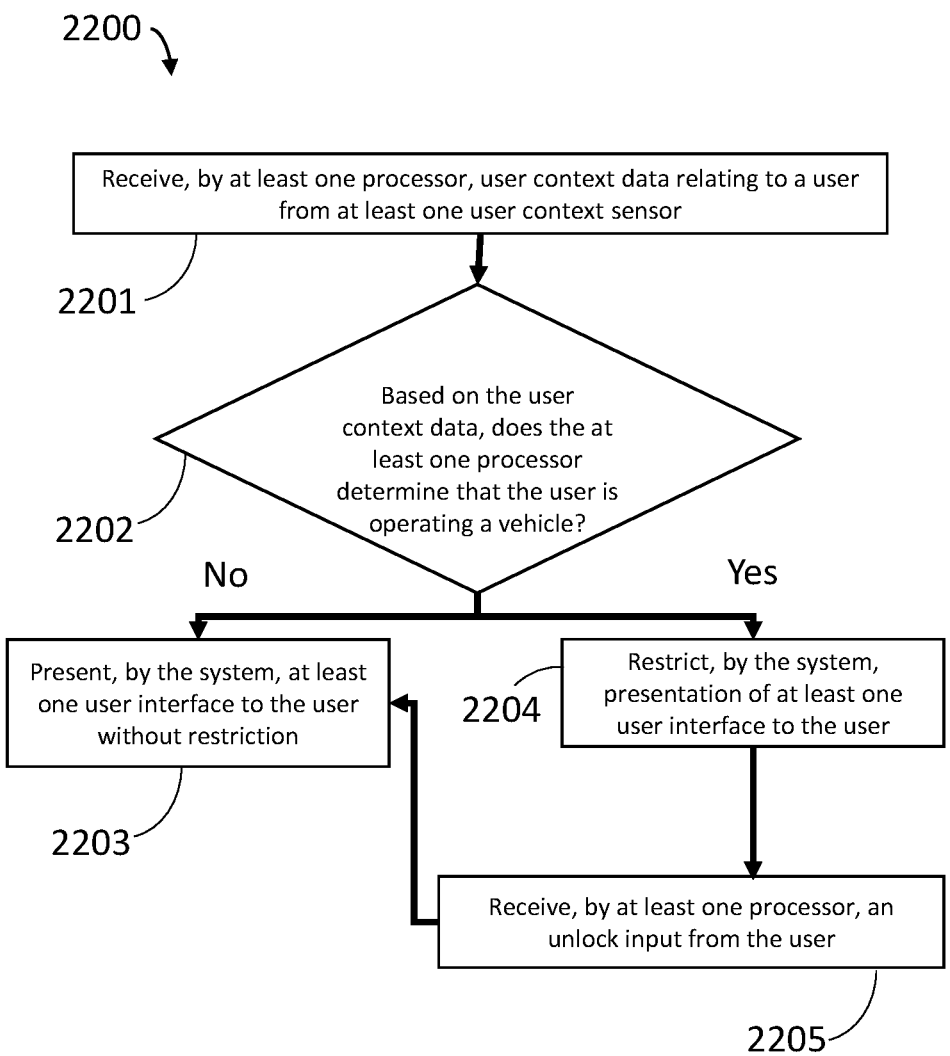
FIGS. 22 and 23 are flow chart diagrams which illustrate methods for unrestricting presentation of at least one user interface in accordance with at least two illustrated implementations of the subject systems, devices, and methods.

FIG. 22 is a flow diagram showing a method 2200 of controlling operation of a wearable display in accordance with the present systems, devices, and methods.

Method 2200 may be implemented using the systems illustrated in FIG. 1A or 1B, and reference numerals below refer to hardware components of WHUD 100 and peripheral device 140 for ease of discussion. However, one skilled in the art will appreciate that method 2200 may also be implemented on any hardware as appropriate for a given application. One skilled in the art will appreciate that any acts performed by hardware on WHUD 100 could also be performed by hardware on peripheral device 140, and likewise any acts performed by hardware on peripheral device 140 could also be performed by hardware on WHUD 100, as appropriate for a given application. One skilled in the art will appreciate that the present systems, devices, and methods could be implemented on a standalone WHUD 100, without the need for a peripheral device such as peripheral device 140.

Method 2200 includes acts 2201, 2202, 2203, 2204, and 2205, but one skilled in the art will appreciate that in alternative implementations certain acts may be omitted and/or additional acts may be added. One skilled in the art will also appreciate that the illustrated order of the acts is shown for exemplary purposes only and may change in alternative implementations.

Method 2200 is similar to method 200 in FIG. 2 in at least some respects. In particular, the descriptions relating to acts 201, 202, 203, and 204 are also applicable to acts 2201, 2202, 2203, and 2204, respectively, and will not be repeated in the interests of brevity. One difference between method 2200 of FIG. 22 and method 200 of FIG. 2 is that method 2200 adds additional act 2205.

At 2205, at least one processor 120/141 receives at least one unlock input from a user. The at least one unlock input is an instruction from the user which indicates that the user wishes to override the restriction of presentation of at least one user interface applied in act 2204. The unlock input should preferably be a distinct user input and/or combination of user inputs which is unlikely to be input accidentally. For example, the unlock input could be a number of successive clicks, such as three clicks, on a user input device such as control pad 131 on control ring 130, or on an input interface carried directly by WHUD 100. As another example, the unlock input could be a pattern of different inputs, such as a pattern of directional inputs like up-up-down-down-left-right, on an input interface. As another example, the unlock input could be a specific voice command received by microphone 111, such as "I confirm that I am a passenger. Unlock." As another example, the unlock input could comprise a pattern of head movements captured by IMU 113, such as nod-shake-nod-shake. The unlock input could also comprise a combination of different inputs, such as requiring both the successive clicks and head movements described above. One skilled in the art will appreciate that the above described unlock inputs are exemplary, and the unlock input could comprise any appropriate input or combination of inputs received by any of the user input sensors of WHUD system 10/20.

In response to receiving an unlock input from the user, the system can unrestrict presentation of the at least one user interface to the user, such that the system presents the at least one user interface to the user without restriction as in act 2203. That is, if the unlock input is received, WHUD system 10/20 can revert to normal, as if the at least one processor 120/141 did not determine that the user is operating a vehicle. In summary, if the at least one processor 120/141 receives an unlock input from the user, unrestricted access to the WHUD system 10/20 is restored, and the user may interact with WHUD system 10/20 as normal. This is advantageous for enabling the user to override false determinations that they are operating a vehicle. For example, if the at least one processor 120/141 determines that the user is operating a vehicle solely by determining that the user is moving at a velocity above a velocity threshold, the at least one processor 120/141 can falsely determine that the user is operating a vehicle even if the user is only a passenger in a vehicle being operated by someone else. By providing the unlock input, the user can correct this determination and use the WHUD system 10/20 as normal.

However, a reckless user may choose to provide the unlock input even when they are operating a vehicle, in order to interact with the WHUD system 10/20 while they are driving. If WHUD system 10/20 is sufficiently sophisticated, and at least one processor 120/141 can make very certain and consistent determinations of when a user is operating a vehicle, it may be desirable to remove the unlock input functionality, such that a user cannot override the restrictions on presentation of at least one user interface. This could make WHUD systems safer, by taking the decision about whether or not it is safe to interact with WHUD system 10/20 out of the hands of users.

Figure 23:
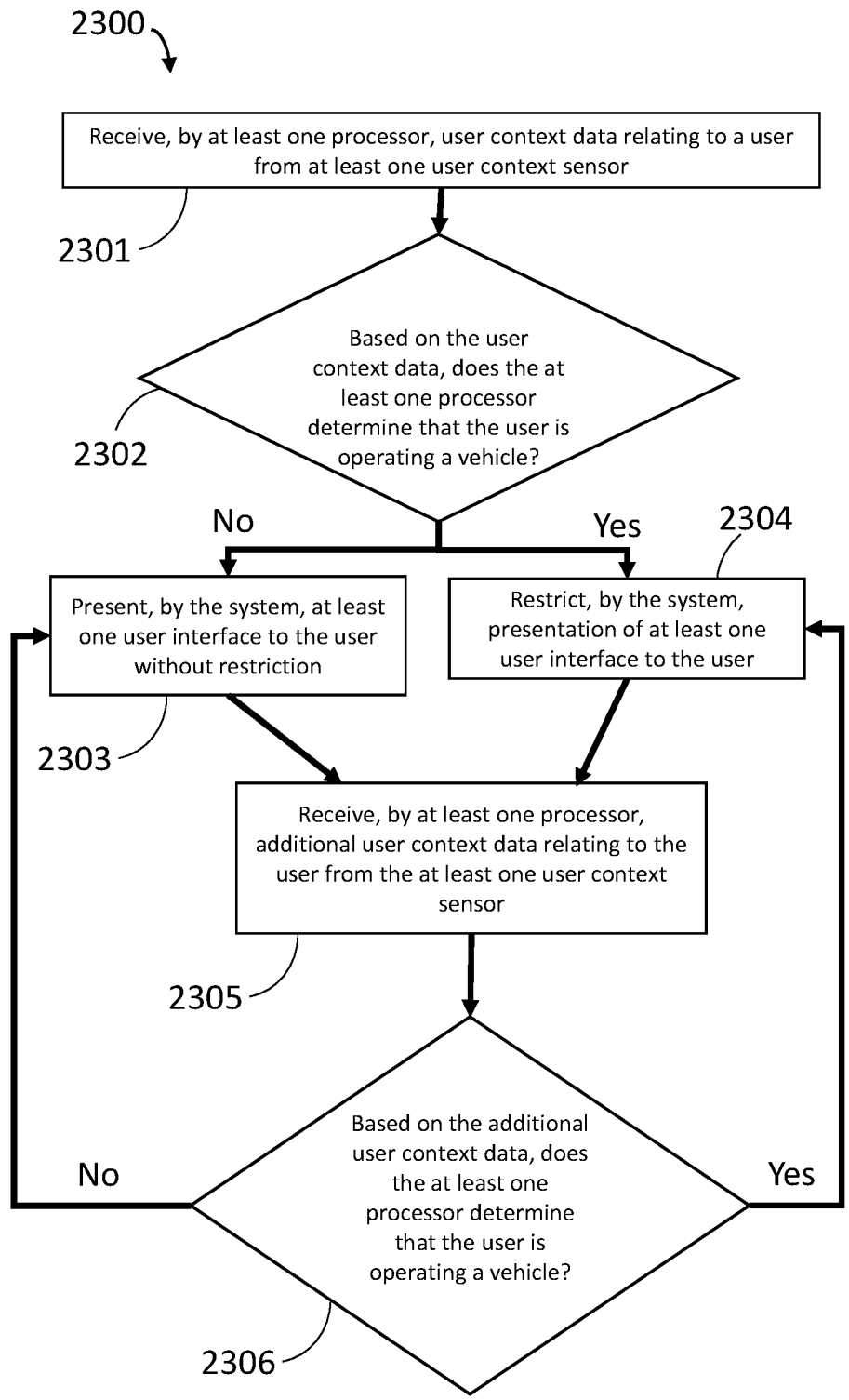

FIG. 23 is a flow diagram showing a method 2300 of controlling operation of a wearable display in accordance with the present systems, devices, and methods.

Method 2300 may be implemented using the systems illustrated in FIG. 1A or 1B, and reference numerals below refer to hardware components of WHUD 100 and peripheral device 140 for ease of discussion. However, one skilled in the art will appreciate that method 2300 may also be implemented on any hardware as appropriate for a given application. One skilled in the art will appreciate that any acts performed by hardware on WHUD 100 could also be performed by hardware on peripheral device 140, and likewise any acts performed by hardware on peripheral device 140 could also be performed by hardware on WHUD 100, as appropriate for a given application. One skilled in the art will appreciate that the present systems, devices, and methods could be implemented on a standalone WHUD 100, without the need for a peripheral device such as peripheral device 140.

Method 2300 includes acts 2301, 2302, 2303, 2304, 2305, and 2306, but one skilled in the art will appreciate that in alternative implementations certain acts may be omitted and/or additional acts may be added. One skilled in the art will also appreciate that the illustrated order of the acts is shown for exemplary purposes only and may change in alternative implementations.

Method 2300 is similar to method 200 in FIG. 2 in at least some respects. In particular, the descriptions relating to acts 201, 202, 203, and 204 are also applicable to acts 2301, 2302, 2303, and 2304, respectively, and will not be repeated in the interests of brevity. One difference between method 2300 of FIG. 23 and method 200 of FIG. 2 is that method 2300 adds additional acts 2305 and 2306.

Act 2305 can be performed after both act 2303 and 2304, and involves that at least one processor 120/141 receiving additional user context data relating to the user from the at least one user context sensor. That is, after the WHUD system 10/20 either restricts or does not restrict presentation of at least one user interface to the user, at least one user context sensor will capture additional user context data. In act 2306, the at least one processor 120/141 analyzes the additional user context data, and determines whether the user is operating a vehicle. If the at least one processor 120/141 determines that the user is not driving a vehicle, the system unrestricts presentation of the at least one user interface to the user, such that the at least one user interface to the user as in act 2303. If the at least one processor 120/141 determines that the user is operating a vehicle, the system restricts presentation of at least one user interface to the user. In effect, acts 2305 and 2306 create a loop where the at least one processor 120/141 can continuously or periodically receive additional context data, determine whether the user is operating a vehicle, and update whether the system should present at least one user interface to a user without restriction or restrict presentation of at least one user interface to the user.

The loop of acts 2303/2304, 2305 and 2306 can be repeated and/or be performed in response to a user input. For example, the loop can be repeated continuously, such that additional user context data is constantly being received by the at least one processor 120/141, enabling the at least one processor 120/141 to make quick and responsive determinations regarding whether the user is operating a vehicle, and thus improving the response speed for performing acts 2303 and 2304. As another example, the loop can be repeated periodically, such as every second, every ten seconds, every minute, every two minutes, every five minutes, every ten minutes, or any other length of time as appropriate for a given application. Repeating the loop periodically will provide slower response times compared to repeating the loop continuously, but will advantageously reduce power consumption of WHUD system 10/20, by reducing the amount of time and frequency that user context sensors and the at least one processor 120/141 must be active. A shorter period time will provide faster response times, at the cost of higher power consumption, whereas a longer period time will result in lower response times, but with the benefit of reduced power consumption. As another example, the loop can be repeated in response to user input. That is, every time the user attempts to use WHUD system 10/20, the at least one processor 120/141 can receive additional user context data from at least one user context sensor as in act 2305, and determine whether the user is operating a vehicle based on the additional user context data as in act 2306. By performing acts 2305 and 2306 in response to user input, power consumption of WHUD system 10/20 can be reduced by only activating user context sensors and the at least one processor 120/141 when the user affirmatively attempts to use WHUD system 10/20. However, this could prevent non-user initiated interactions with WHUD system 10/20 from being initiated until the user provides input to WHUD system 10/20. For example, a user may receive a new message while operating a vehicle, but WHUD system 10/20 could restrict presentation of the new message because the at least one processor 120/141 determined that the user is operating a vehicle. If WHUD system 10/20 only performs acts 2305 and 2306 after receiving a user input, the user may not be notified of the new message until the next time they attempt to access WHUD system 10/20, which might be a long time after the message was actually received. To address this issue, it would be possible to perform the loop of acts 2305, 2306, and 2303/2304 both periodically and in response to user input. For example, the loop could be performed every time the user provides user input to WHUD system 10/20, as well as once every five minutes. This will enable the WHUD system 10/20 to be accessible immediately after the user stops operating the vehicle if the user provides input to the WHUD system 10/20, while also allowing system-initiated interactions to be presented a short time after the user stops operating a vehicle even if the user does not provide input to WHUD system 10/20.

One skilled in the art will appreciate that it is within the scope of the present systems, devices, and methods to implement the techniques described with reference to both FIGS. 22 and 23 within a single WHUD system. Specifically, it would be possible to unrestrict presentation of at least one user interface to a user in response to either an unlock input from a user, or at least one processor determining that the user is not operating a vehicle based on additional user context data.

In some implementations, one or more optical fiber(s) may be used to guide light signals along some of the paths illustrated herein.

The devices described herein may include one or more on-board power sources (e.g., one or more battery(ies)), a wireless transceiver for sending/receiving wireless communications, and/or a tethered connector port for coupling to a computer and/or charging the one or more on-board power source(s).

The devices described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, U.S. Non-Provisional patent application Ser. No. 15/282,535, U.S. Pat. Nos. 9,299,248, 9,367,139, and/or 9,389,694.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the following are incorporated in their entirety by reference herein: U.S. Non-Provisional patent application Ser. No. 15/145,576, U.S. Non-Provisional patent application Ser. No. 15/167,458, U.S. Non-Provisional patent application Ser. No. 15/046,254, U.S. Pat. Nos. 9,299,248, 9,367,139, 9,389,694, U.S. Non-Provisional patent application Ser. No. 14/155,087, U.S. Non-Provisional patent application Ser. No. 14/155,107, PCT Patent Application PCT/US2014/057029, U.S. Non-Provisional patent application Ser. No. 15/282,535, U.S. Non-Provisional patent application Ser. No. 14/704,663, U.S. Provisional Patent Application No. 62/577,081, U.S. Provisional Patent Application Ser. No. 62/607,816, U.S. Provisional Patent Application Ser. No. 62/607,819, U.S. Provisional Patent Application Ser. No. 62/671,248, U.S. Non-Provisional patent application Ser. No. 15/167,458, U.S. Non-Provisional patent application Ser. No. 15/827,667, U.S. Provisional Patent Application Ser. No. 62/658,436, and U.S. Provisional Patent Application Ser. No. 62/750,060. Aspects of the embodiments can be modified, if necessary, to employ systems, circuits and concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up ("WHUD") for presenting at least one user interface to a user wearing the WHUD, the WHUD comprising:
   at least one processor;
   at least one user context sensor communicatively coupled to the at least one processor; and
   a non-transitory processor-readable medium communicatively coupled to the at least one processor, wherein the non-transitory processor-readable medium stores processor-executable instructions that, when executed by the at least one processor, cause the WHUD to:
      receive user context data from the at least one user context sensor;
      determine a seat of a vehicle occupied by the user based on the user context data;
      determine a global location of the WHUD based on location data from a location sensor included in the WHUD or based on location settings stored in the non-transitory processor-readable medium;
      determine an expected seat to be occupied by a driver of the vehicle based on the global location of the WHUD;
      determine that the user is operating the vehicle based on the seat of the vehicle occupied by the user corresponding to the expected seat to be occupied by a driver of the vehicle;
      responsive to determining that the user is operating the vehicle, restrict, by the WHUD, presentation of the at least one user interface to the user, wherein restriction of the presentation of the at least one user interface includes disabling presentation of the at least one user interface to the user;
      after the WHUD restricts presentation of the at least one user interface to the user, receive, by the at least one processor, an unlock input from a user; and
      after the at least one processor receives the unlock input from a user, unrestrict, by the WHUD, presentation of the at least one user interface to the user.

2. A method at a wearable heads-up ("WHUD") for presenting at least one user interface to a user wearing the WHUD, the method comprising:
   receiving user context data from at least one user context sensor of the WHUD, the user context data including captured user eye data from a user eye-tracking system of the WHUD;
   determining that the user is operating a vehicle based at least on a combination of a gaze direction of the user, movement patterns of at least one eye of the user, or a blink frequency of the user indicated by the captured user eye data;
   responsive to determining that the user is operating the vehicle, restricting presentation of the at least one user interface to the user, wherein restriction of the presentation of the at least one user interface includes disabling presentation of the at least one user interface to the user;
   after restricting the presentation of the at least one user interface to the user, receiving an unlock input from a user; and
   after receiving the unlock input from a user, unrestricting presentation of the at least one user interface to the user.

3. A wearable heads-up ("WHUD") for presenting at least one user interface to a user wearing the WHUD, the WHUD comprising:
   at least one processor;
   at least one user context sensor including a user eye-tracking system communicatively coupled to the at least one processor; and
   a non-transitory processor-readable medium communicatively coupled to the at least one processor, wherein the non-transitory processor-readable medium stores processor-executable instructions that, when executed by the at least one processor, cause the WHUD to:
      receive user context data from the at least one user context sensor, the user context data including captured user eye data from the user eye-tracking system;
      determine, by the at least one processor, that the user is operating a vehicle based at least on a combination of a gaze direction of the user, movement patterns of at least one eye of the user, or a blink frequency of the user indicated by the captured user eye data;
      responsive to determining that the user is operating the vehicle, restrict, by the WHUD, presentation of the at least one user interface to the user, wherein restriction of the presentation of the at least one user interface includes disabling presentation of the at least one user interface to the user;
      after the WHUD restricts presentation of the at least one user interface to the user, receive, by the at least one processor, an unlock input from a user; and
      after the at least one processor receives the unlock input from a user, unrestrict, by the WHUD, presentation of the at least one user interface to the user.

4. The WHUD of claim 3, wherein the at least one user context sensor includes at least one microphone, the user context data includes captured audio data from the at least one microphone, and the processor-executable instructions which when executed by the at least one processor cause the at least one processor to determine that the user is operating the vehicle further based on causing the at least one processor to:
   analyze at least one of a volume spectrum of the captured audio data, a volume pattern in the captured audio data, a frequency spectrum of the captured audio data, a frequency pattern in the captured audio data, or content of the captured audio data; and
   determine that the user is operating the vehicle further based on one or a combination of the volume spectrum of the captured audio data, a volume pattern in the captured audio data, a frequency spectrum of the captured audio data, a frequency pattern in the captured audio data, or content of the captured audio data.

5. The WHUD of claim 3, wherein the at least one user context sensor includes at least one camera, the user context data includes captured visual data from the at least one camera, and the processor-executable instructions which when executed by the at least one processor cause the at least one processor to determine that the user is operating the vehicle further based on causing the at least one processor to:
   identify representations of vehicle features, vehicle accessories, or vehicle infrastructure in the captured visual data; and
   determine that the user is operating the vehicle further based on the identified representations of the vehicle features, vehicle accessories, or vehicle infrastructure.

6. The WHUD of claim 3, wherein the at least one user context sensor further includes at least one inertial measurement unit ("IMU"), the user context data further including captured user motion data from the at least one IMU, and the processor-executable instructions which when executed by the at least one processor cause the at least one processor to determine that the user of is operating the vehicle further based on causing the at least one processor to:
- identify at least one of a velocity of the user, an acceleration of the user, and head motions made by the user based on the captured user motion data; and
- determine that the user of the WHUD is operating the vehicle further based on one or a combination of at least one of a velocity of the user, an acceleration of the user, and head motions made by the user.

7. The WHUD of claim 6, wherein the processor-executable instructions which when executed by the at least one processor cause the at least one processor to determine that the user is operating the vehicle further based on one or a combination of at least one of a velocity of the user, an acceleration of the user, and head motions made by the user cause the at least one processor to perform at least one of:
- determining that a velocity of the user exceeds a velocity threshold;
- determining that an acceleration of the user exceeds an acceleration threshold; and
- determining that the user's head is frequently directed towards at least one of straight ahead, towards a rear-view mirror of the vehicle, towards a side-view mirror of the vehicle, or towards a side window of the vehicle.

8. The WHUD of claim 3, wherein the at least one user context sensor includes at least one location sensor, the user context data includes captured user location data from the at least one location sensor, and the processor-executable instructions which when executed by the at least one processor cause the at least one processor to determine that the user is operating the vehicle further based on causing the at least one processor to:
- determine at least one of a velocity of the user or an acceleration of the user based on the captured user location data; and
- determine that the user of the WHUD is operating the vehicle further based on one or a combination of at least one of a velocity of the user and an acceleration of the user.

9. The WHUD of claim 3, wherein the user context data from the at least one user context sensor includes at least two of:
- captured audio data from a microphone included in the at least one user context sensor;
- captured visual data from a camera included in the at least one user context sensor;
- captured user eye data from a user eye-tracking system included in the at least one user context sensor;
- captured user motion data from an inertial measurement unit included in the at least one user context sensor; and
- captured user location data from a location sensor included in the at least one user context sensor.

10. The WHUD of claim 3, wherein the processor-executable instructions which when executed by the at least one processor cause the at least one processor to determine that the user is operating the vehicle further based on causing the at least one processor to:
- identify at least one recently used or currently used software application installed on the non-transitory processor-readable medium of the WHUD; and
- determine that the at least one recently used or currently used software application is relevant to operating the vehicle.

11. The WHUD of claim 3, wherein the processor-executable instructions which when executed by the at least one processor cause the at least one processor to determine that the user is operating the vehicle cause the at least one processor to determine that the user is operating the vehicle including a bicycle or unicycle, by further causing the at least one processor to:
- receive user heart rate data or user breathing data from at least one user activity sensor; and
- determine that a user has an elevated heart rate based on the user heart rate data or elevated breathing based on the user breathing data.

12. The WHUD of claim 3, wherein the processor-executable instructions which when executed by the at least one processor cause the at least one processor to determine that the user is operating the vehicle further cause the at least one processor to:
- analyze the user context data to identify representations of features indicating that the user is not operating the vehicle; and
- determine that a user is operating the vehicle if the user context data does not include representations of features indicating that the user is not operating the vehicle.

13. The WHUD of claim 3, wherein the processor-executable instructions when executed by the at least one processor further cause the WHUD to capture, by the at least one user context sensor, the user context data in response to the at least one processor receiving a user input.

14. The WHUD of claim 3, wherein the processor-executable instructions which when executed by the at least one processor cause the WHUD to restrict presentation of the at least one user interface to the user cause the WHUD to disable presentation of at least one user interface which is not related to presenting at least one of: a map, directional guidance, travel information, speed information, acceleration information, fuel consumption information, toll information, traffic information, weather information, or a clock display.

15. The WHUD of claim 3, wherein the processor-executable instructions which when executed by the at least one processor cause the WHUD to restrict presentation of the at least one user interface to the user cause the at least one processor to:
- generate, by the at least one processor, a summary of content of the at least one user interface; and
- present, by the WHUD, the summary of content of the at least one user interface.

16. The WHUD of claim 3, wherein the at least one user interface is a visual user interface, and wherein the processor-executable instructions which when executed by the at least one processor cause the WHUD to restrict presentation of the at least one user interface to the user cause the WHUD to modify a display size and/or a display position of the at least one user interface.

17. The WHUD of claim 3, wherein the at least one user interface is a vibratory user interface, and wherein the processor-executable instructions which when executed by the at least one processor cause the WHUD to restrict presentation of the at least one user interface to the user cause the WHUD to reduce a vibration intensity and/or a vibration duration of the at least one user interface, or cause the WHUD to modify a vibration pattern and/or a vibration frequency of the at least one user interface.

18. The WHUD of claim 3, wherein the processor-executable instructions when executed by the at least one processor further cause the WHUD to:

after the WHUD restricts presentation of the at least one user interface to the user, receive, by the at least one processor, additional user context data from the at least one user context sensor;

determine, by the at least one processor, that the user is not operating the vehicle based on the additional user context data; and after the at least one processor determines that the user is no longer operating the vehicle, unrestrict, by the WHUD, presentation of the at least one user interface to the user.

* * * * *

UNITED STATES PATENT AND TRADEMARK OFFICE
CERTIFICATE OF CORRECTION

PATENT NO. : 11,595,878 B2
APPLICATION NO. : 16/661278
DATED : February 28, 2023
INVENTOR(S) : Terek Judi et al.

It is certified that error appears in the above-identified patent and that said Letters Patent is hereby corrected as shown below:

In the Claims

Column 49 Line 02, Claim 6, please correct "user of is" to be --user is--

Column 50 Line 01-02, Claim 11, please delete "cause the at least one processor to determine that the user is operating the vehicle" it is a duplicate phrase of the phrase preceding it Signed and Sealed this
Twenty-eighth Day of November, 2023

Katherine Kelly Vidal
*Director of the United States Patent and Trademark Office*